United States Patent [19]
Kanota et al.

[11] Patent Number: 5,832,169
[45] Date of Patent: *Nov. 3, 1998

[54] APPARATUS AND METHOD FOR RECORDING AND REPRODUCING A TELEVISION SIGNAL

[75] Inventors: Keiji Kanota, Kanagawa; Tadashi Ezaki, Tokyo; Masaki Oguro, Tokyo; Naofumi Yanagihara, Tokyo; Hiroshi Fukuda, Kanagawa, all of Japan

[73] Assignee: Sony Corporation, Tokyo, Japan

[ * ] Notice: The term of this patent shall not extend beyond the expiration date of Pat. No. 5,742,727.

[21] Appl. No.: 869,677

[22] Filed: Jun. 5, 1997

Related U.S. Application Data

[62] Division of Ser. No. 552,842, Nov. 3, 1995, Pat. No. 5,742,727.

[30] Foreign Application Priority Data

| Nov. 5, 1994 | [JP] | Japan | 6-295579 |
| Dec. 22, 1994 | [JP] | Japan | 6-336504 |
| Jun. 1, 1995 | [JP] | Japan | 7-158522 |

[51] Int. Cl.$^6$ .................................................. H04N 9/79
[52] U.S. Cl. ............................ 386/26; 386/37; 386/40
[58] Field of Search .................................. 386/1, 11, 26, 386/37, 40, 95, 131; 348/464, 466, 476, 477, 478, 479, 705, 441, 443, 445; H04N 5/92, 7/61, 7/10, 7/80, 7/87, 11/00, 11/20, 9/79

[56] References Cited

U.S. PATENT DOCUMENTS

| 4,845,562 | 7/1989 | Kolsov et al. | 386/123 |
| 4,879,606 | 11/1989 | Walter et al. | 348/493 |
| 5,257,107 | 10/1993 | Hwang et al. | 386/40 |
| 5,293,248 | 3/1994 | Berger et al. | 386/26 |
| 5,486,929 | 1/1996 | Heyl | 386/26 |

*Primary Examiner*—Thai Tran
*Attorney, Agent, or Firm*—Frommer Lawrence & Haug LLP; William S. Frommer

[57] ABSTRACT

The television signal recording/reproducing system digitally records and reproduces television signals composed of a luminance signal, a chrominance signal and a resolution compensation signal included in predetermined television scanning lines. The system includes a Y/C separating circuit for separating the luminance signal Y from the chrominance signal C. The luminance signal Y and the resolution compensation signal are combined onto a first signal line. A demodulating circuit demodulates the chrominance signal into a color difference signal and outputs the demodulated signal to a second signal line. A digital video signal recorder digitally process the signals on the first signal line separately from the signals on the second signal line and records the digitally processed signals. In this manner, the resolution compensation signal is processed with the luminance signal and the resolution compensation signal can be accurately recorded.

4 Claims, 53 Drawing Sheets

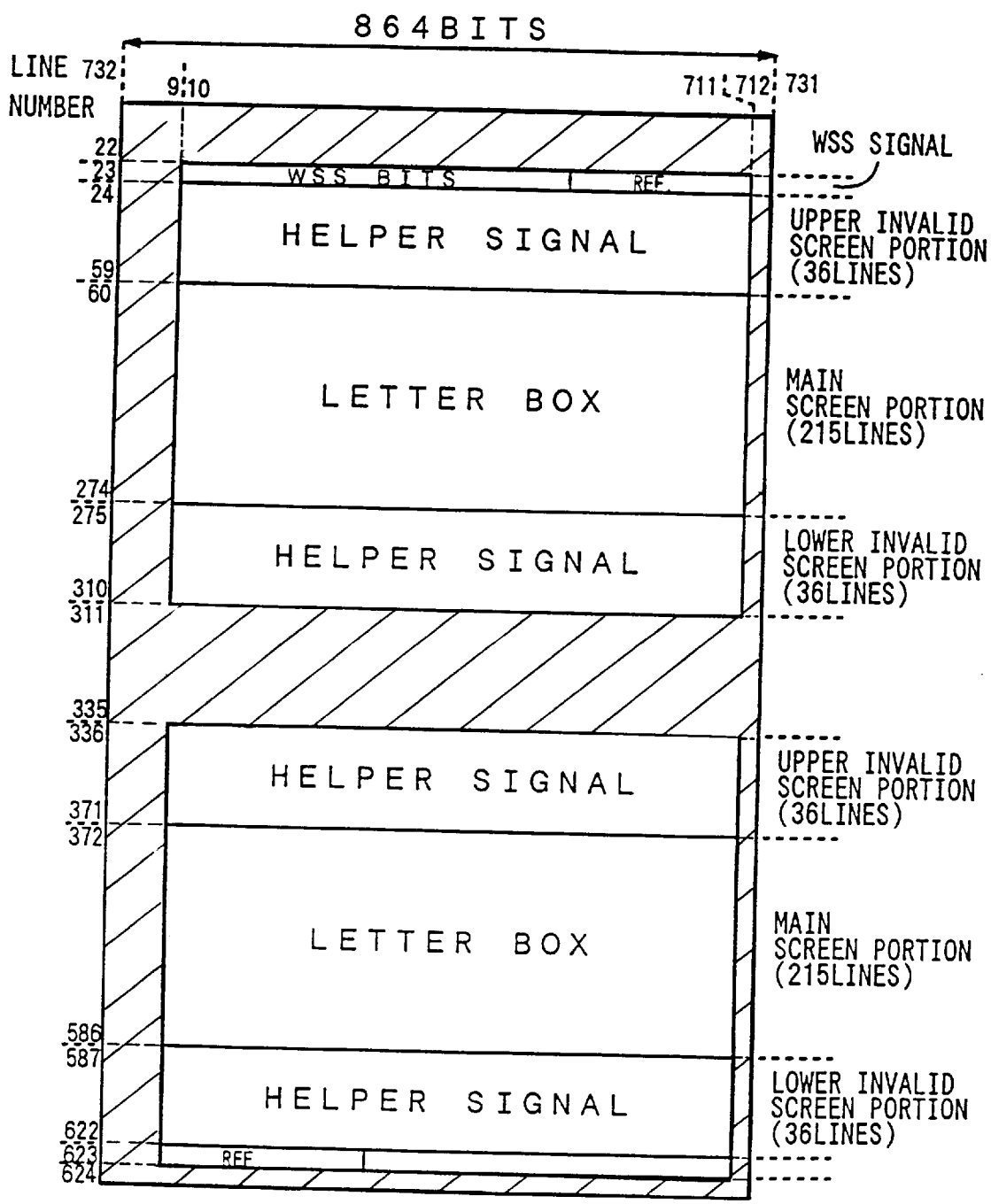

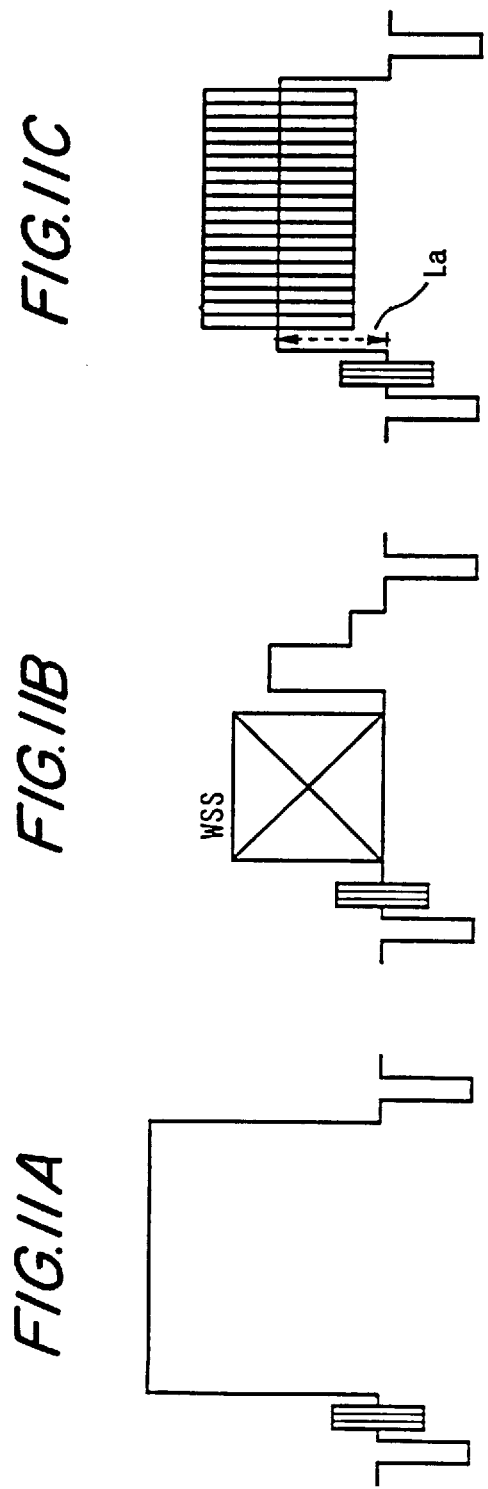

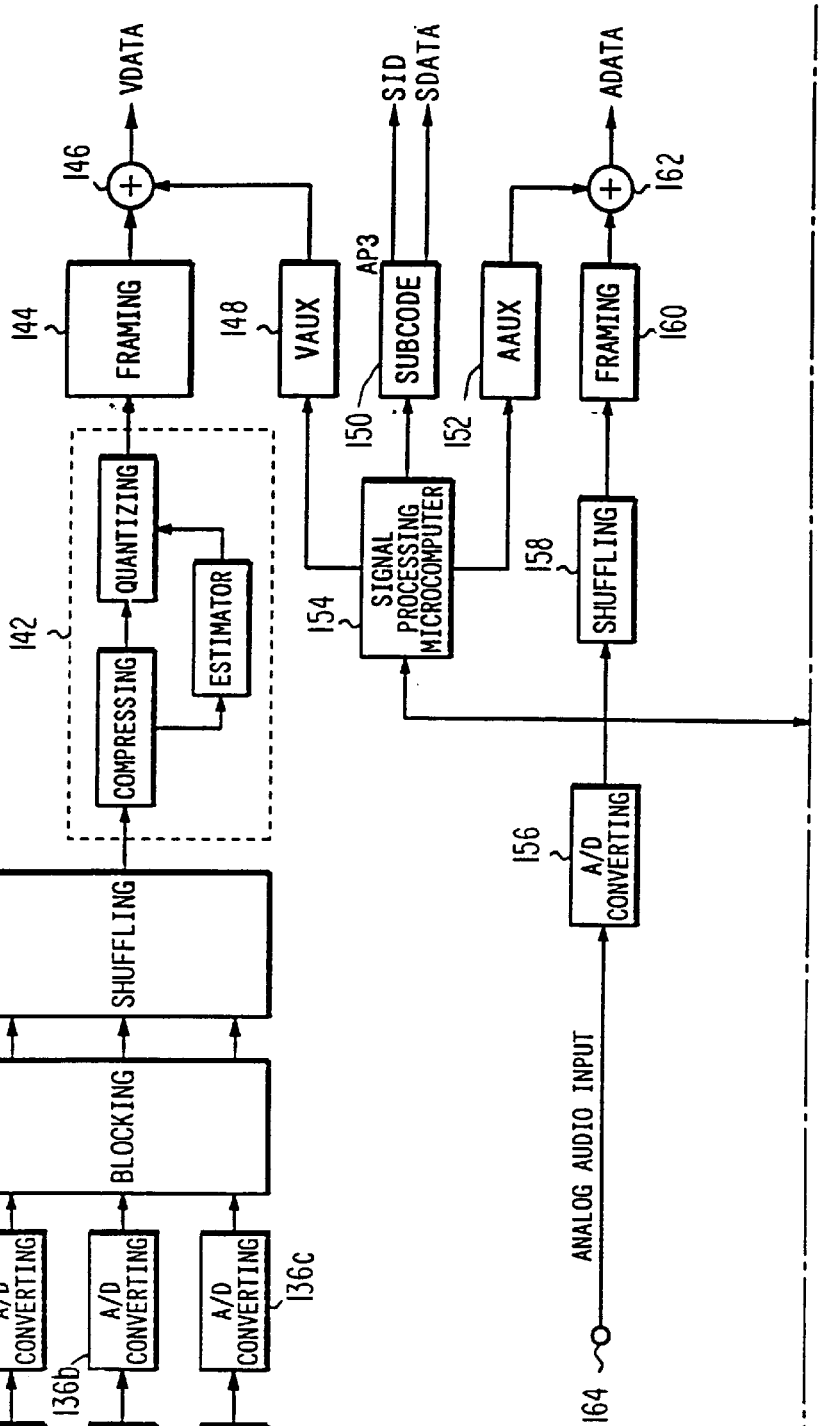

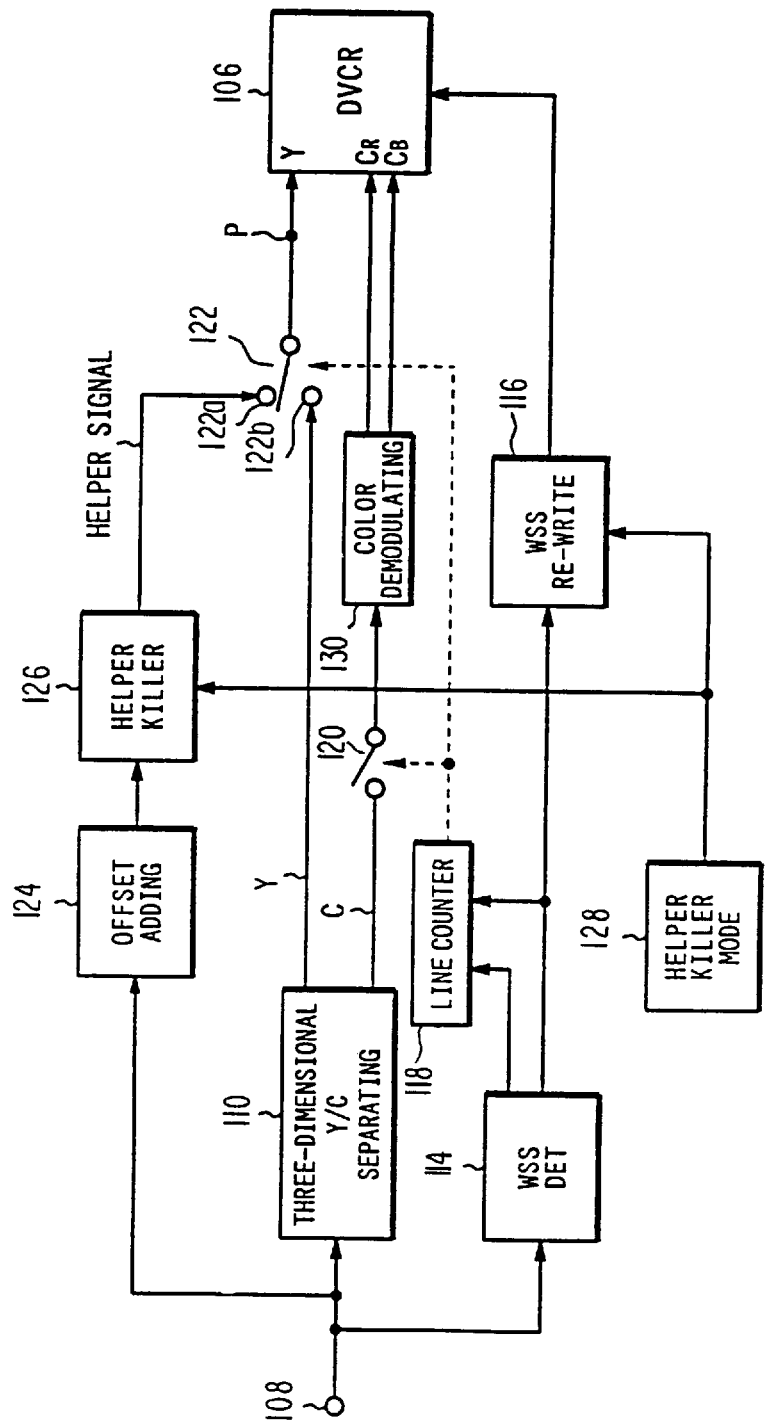

| | MSB | | | VAUX TR pack | | | | LSB |
|---|---|---|---|---|---|---|---|---|
| PC0 | 0 | 1 | 1 | 0 | 0 | 1 | 1 | 0 |
| PC1 | b3 | b2 | b1 | b0 | 0 | 0 | 0 | 1 |
| PC2 | b11 | b10 | b9 | b8 | b7 | b6 | b5 | b4 |
| PC3 | 1 | 1 | 1 | 1 | 1 | 1 | b13 | b12 |
| PC4 | WHITE LEVEL REFERENCE | | | | | | | |

*FIG. 23*

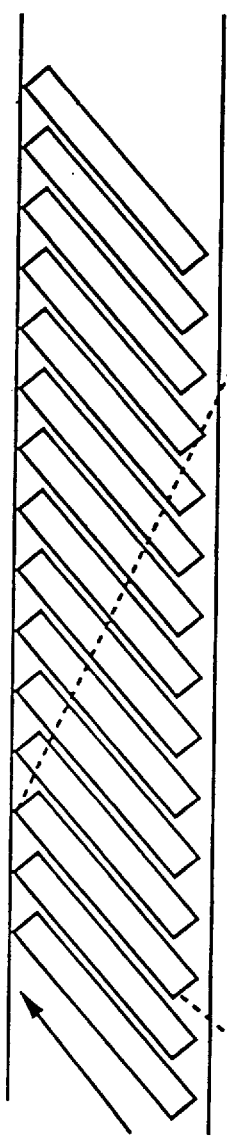
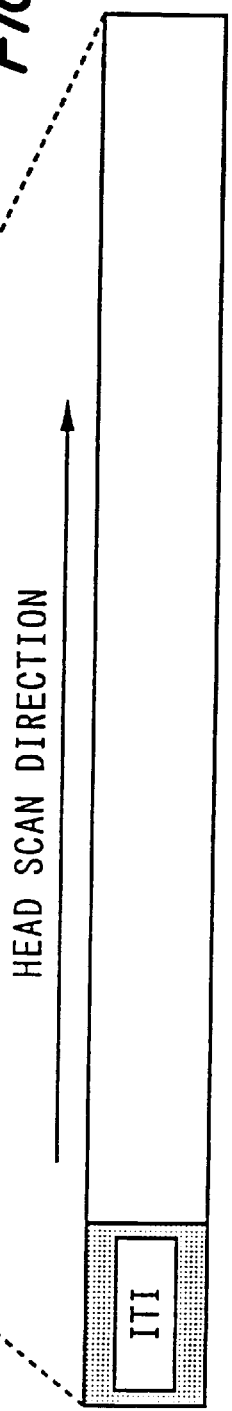
FIG.30A
FIG.30B

| WORD NAME | MSB | | LSB |
|---|---|---|---|
| PC0 | | HEADER | |
| PC1 | | | |
| PC2 | | DATA | |
| PC3 | | | |
| PC4 | | | |

FIG.37A

| PC0 | 0 | 1 | 1 | 0 | 0 | 1 | 1 | 0 |
|-----|---|---|---|---|---|---|---|---|
| PC1 | ------------------LSB→ | | | | DATA TYPE | | | |
| PC2 | ------------------ DATA ------------------ | | | | | | | |
| PC3 | ------------------ (UP TO 28 BITS) ------------------ | | | | | | | |
| PC4 | ←MSB------------------ | | | | | | | |

DATA TYPE:
- 0000 = VBID
- 0001 = WSS
- 0010 = EDTV-2 ID ON LINE 22
- 0011 = EDTV-2 ID ON LINE 285
- 0100 = NO INFORMATION
- OTHERS = NOT DEFINED

| PC0 | 0 | 1 | 1 | 0 | 0 | 1 | 1 | 0 |
|-----|---|---|---|---|---|---|---|---|
| PC1 | ------------------LSB→ | | | | 0 | 0 | 0 | 1 |
| PC2 | ------------------ WSS DATA ------------------ | | | | | | | |
| PC3 | 1 | 1 | 1 | 1 | 1 | 1 | ←MSB------ | |
| PC4 | 1 | 1 | 1 | 1 | 1 | 1 | 1 | 1 |

FIG.37B

FIG. 38
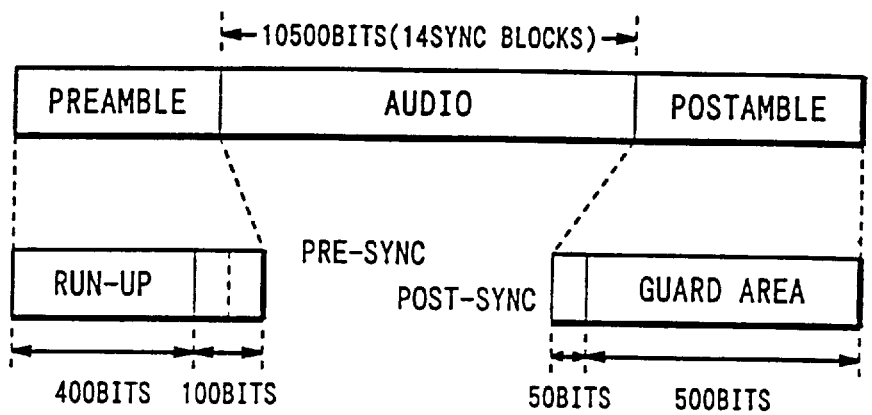
PRE-SYNC BLOCK
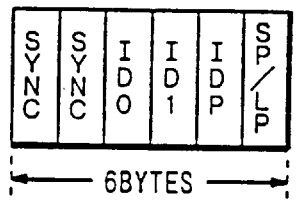
FIG. 39A
POST-SYNC BLOCK
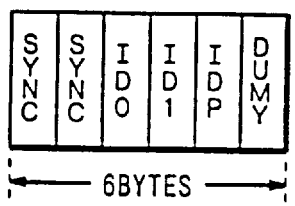
FIG. 39B

FIG.50
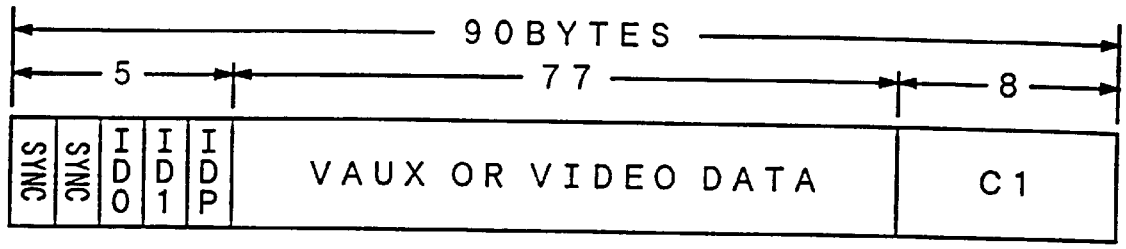
FIG.51
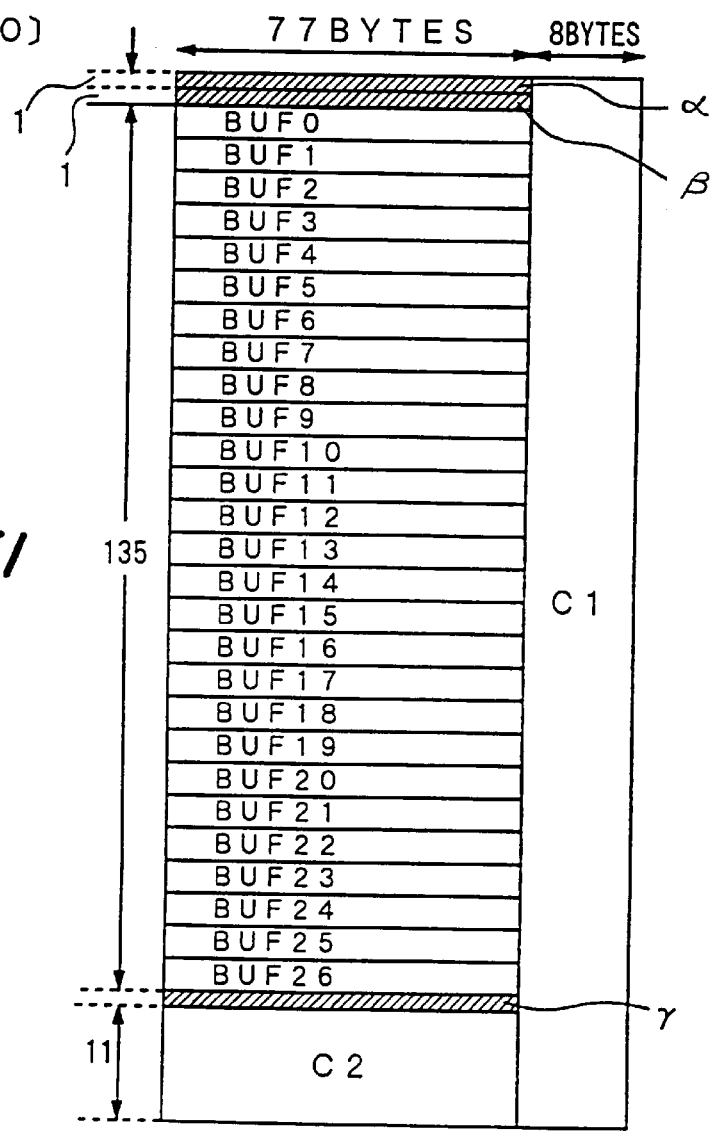
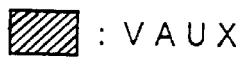 : VAUX

FIG. 53

| | MSB　　　　　　　　　　　　　　LSB |
|---|---|
| PC0 | HEADER |
| PC1 | |
| PC2 | DATA |
| PC3 | |
| PC4 | |

5 BYTES
1 BYTE

FIG. 54

| | MSB | | | | | | | LSB |
|---|---|---|---|---|---|---|---|---|
| PC0 | 0 | 1 | 1 | 0 | 0 | 1 | 1 | 0 |
| PC1 | | | | LSB | DATA TYPE | | | |
| PC2 | DATA | | | | | | | |
| PC3 | | | | | | | | |
| PC4 | MSB | | | | | | | |

FIG.55

| | MSB | | | | | | | LSB |
|---|---|---|---|---|---|---|---|---|
| PC0 | 0 | 1 | 1 | 0 | 0 | 0 | 0 | 0 |
| PC1 | TENS OF TV CHANNEL | | | | UNITS OF TV CHANNEL | | | |
| PC2 | B/W | | EN | CLF | | HUNDREDS OF TV CHANNEL | | |
| PC3 | SOURCE CODE | | | 50/60 | STYPE | | | |
| PC4 | TUNER CATEGORY | | | | | | | |

FIG.56

| | MSB | | | | | | | LSB |
|---|---|---|---|---|---|---|---|---|
| PC0 | 0 | 1 | 1 | 0 | 0 | 0 | 0 | 1 |
| PC1 | RESERVED | | | | | | | |
| PC2 | REC ST | 1 | REC MODE | | 1 | DISP | | |
| PC3 | FF | FS | FC | IL | ST | SC | BC | SYS |
| PC4 | 1 | GENRE CATEGORY | | | | | | |

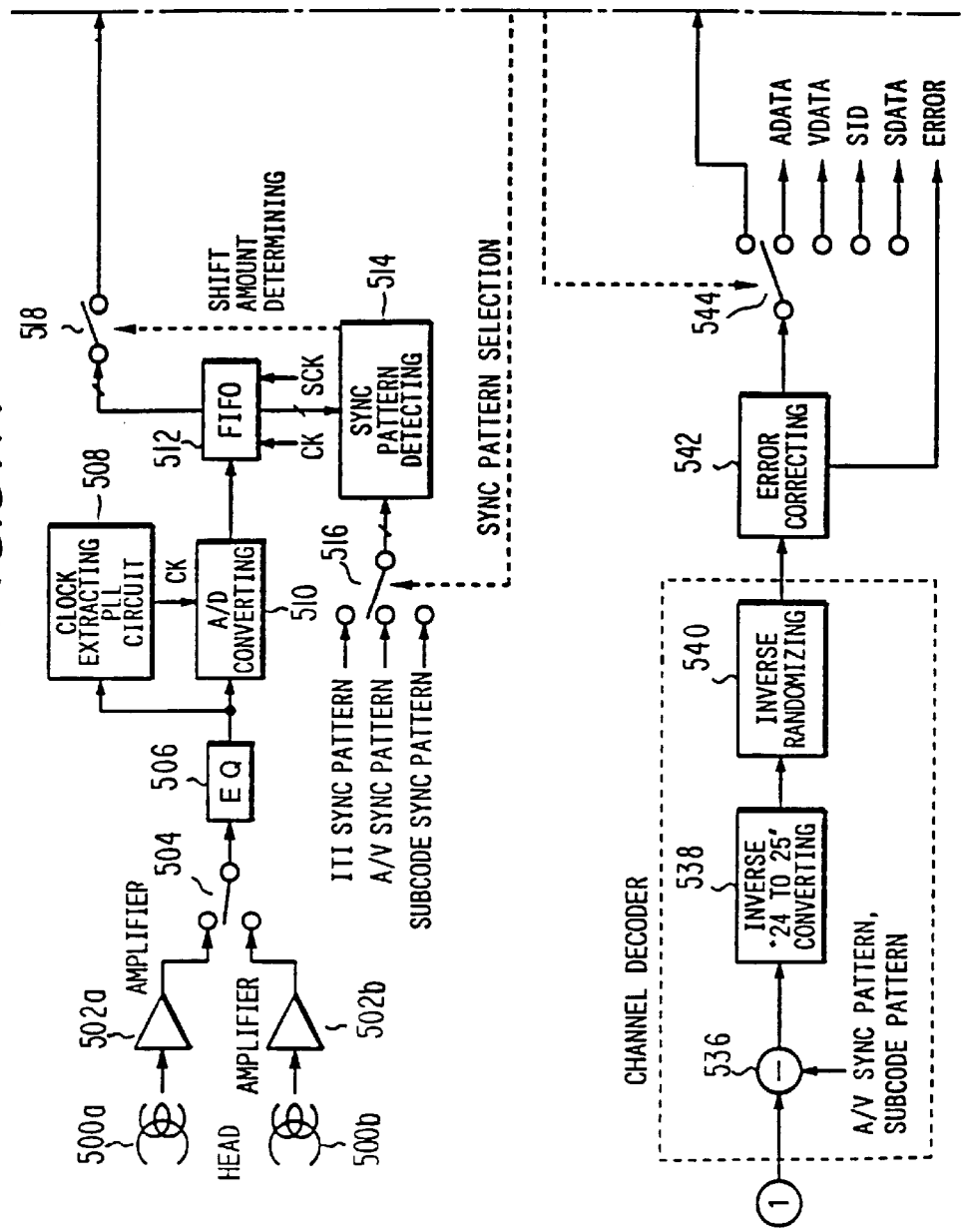

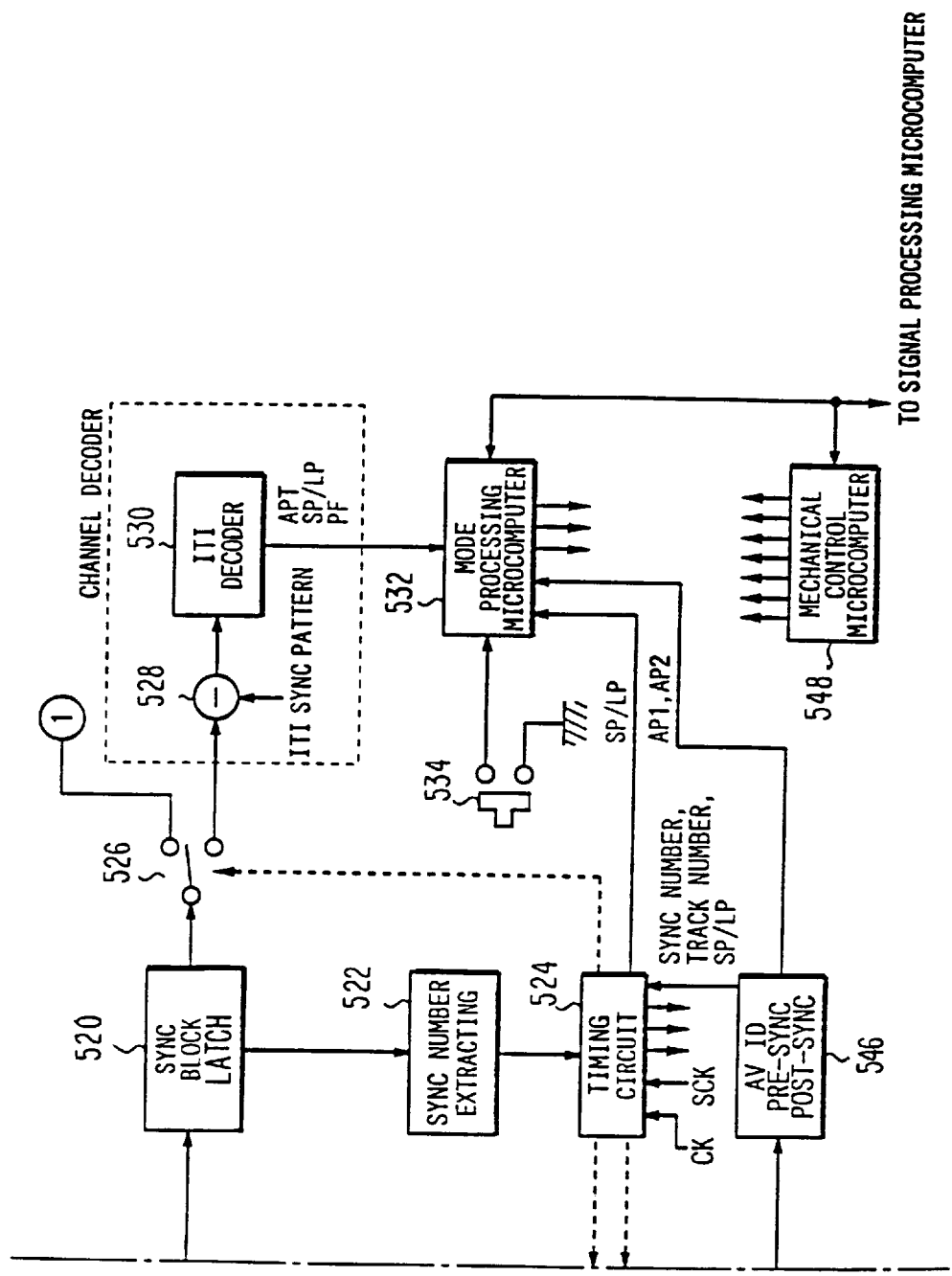

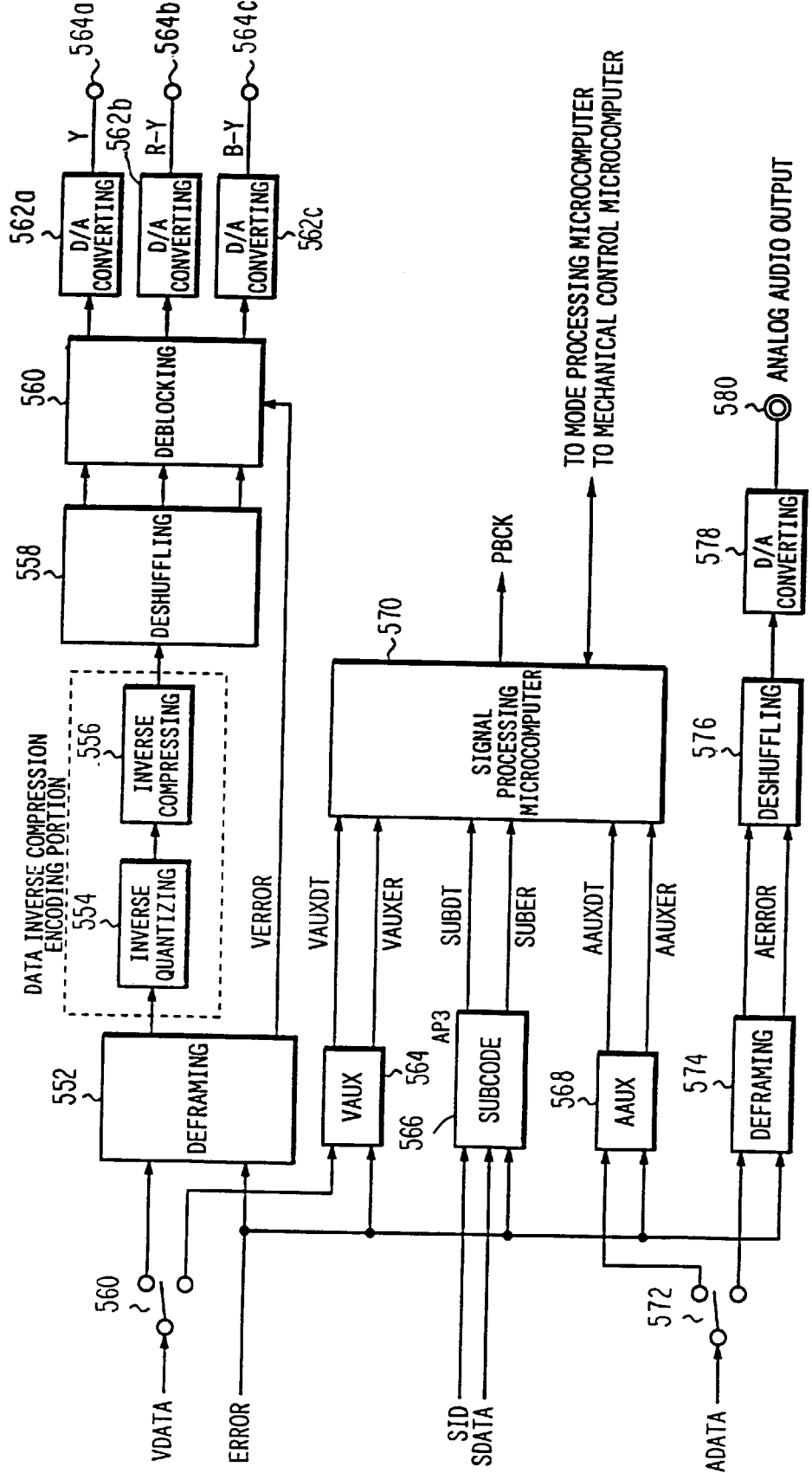

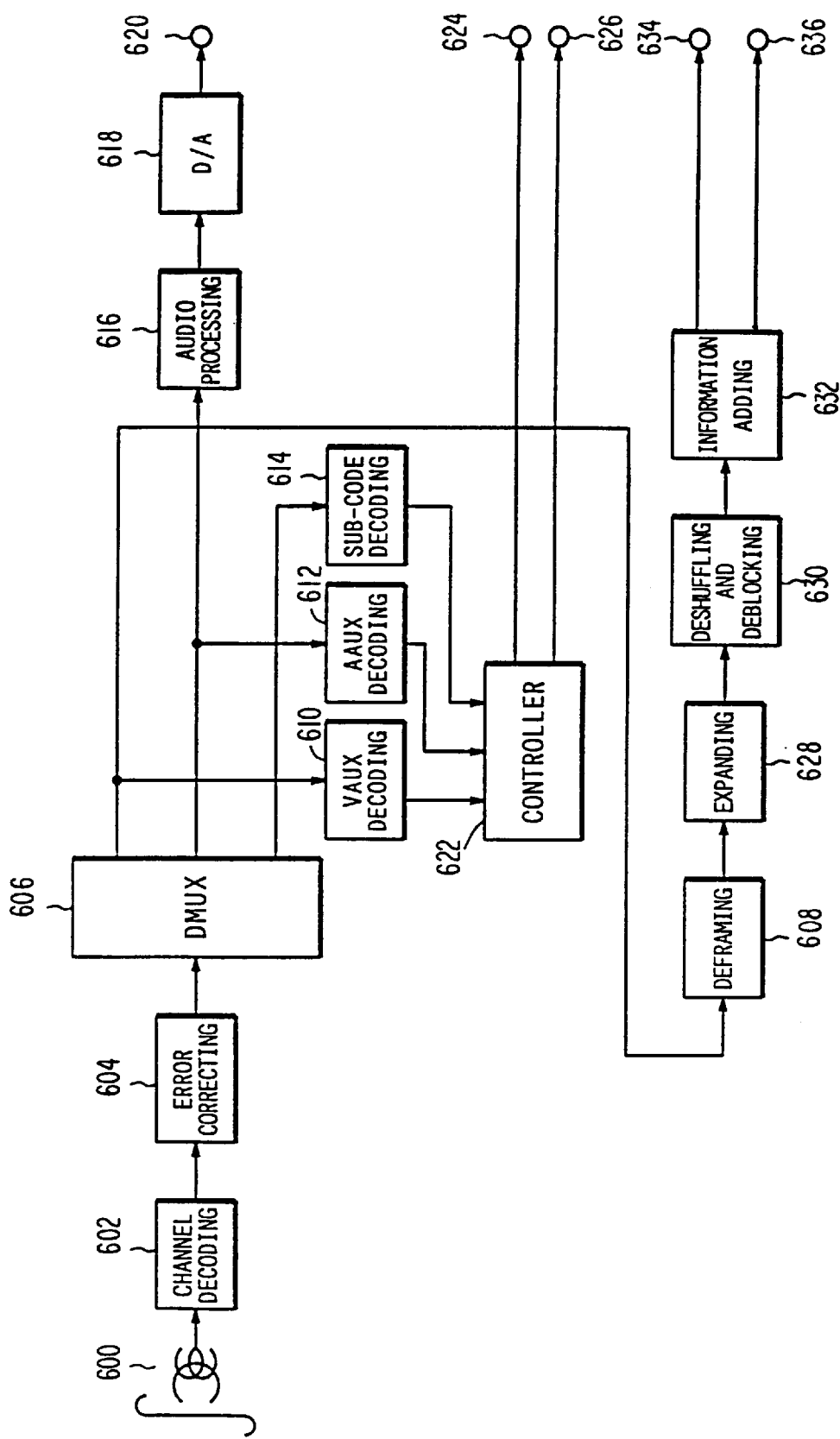

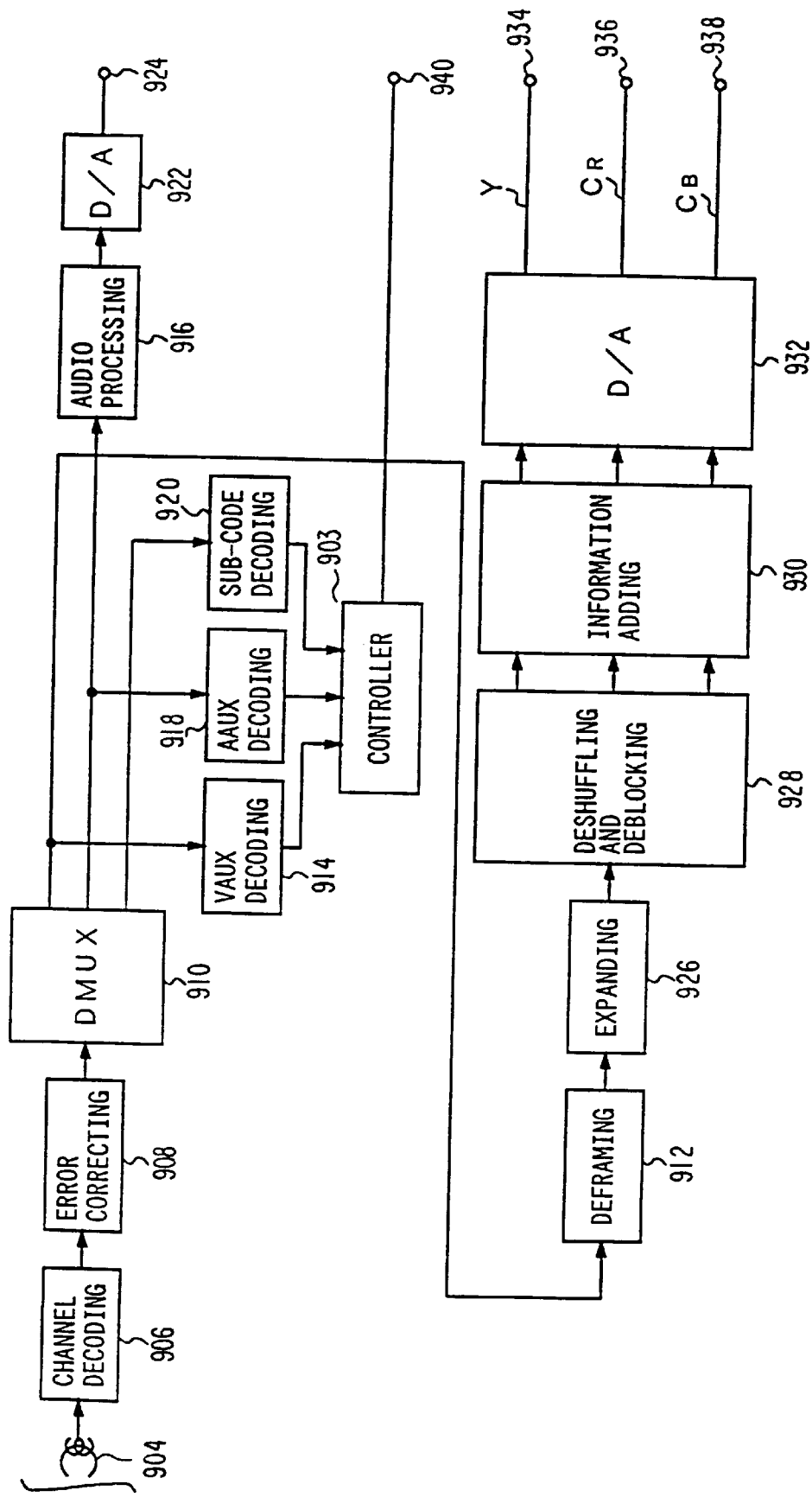

APPARATUS AND METHOD FOR RECORDING AND REPRODUCING A TELEVISION SIGNAL

This application is a division of application Ser. No. 08/552,842, filed Nov. 3, 1995, now U.S. Pat. No. 5,742,727.

BACKGROUND OF THE INVENTION

1. Field of the Invention.

The present invention relates to a recording/reproducing apparatus and method for digitally recording and reproducing a television signal.

1. Description of the Related Art.

PAL plus and EDTV-2.

Television signals are encoded using accepted encoding standards. The United States adopted the NTSC (National Television System Committee) standard of encoding television signals, while Europe adopted the PAL (Phase Alternating Line) standard. The NTSC and the PAL standards provide television pictures with an aspect ratio of 4:3 (width:height), which is considered poor because people normally view scenes with a wider aspect.

In recent years, the PAL plus standard and the EDTV-2 (Enhanced Definition Television) standard have been proposed, which have a high image quality, a wide screen feature, and a compatibility with the PAL and the NTSC standards, respectively. The aspect ratios of these wide screen standards are 16:9 and 14:9, which are considerably better than the 4:3 (12:9) standard. Thus, the PAL plus and EDTV-2 standards provide viewers with superior image quality and a more realistic aspect ratio.

In both the EDTV-2 and the PAL plus standards, the higher aspect ratios are obtained by processing each screen through a 4-to-3 line decimator. Each resulting screen may be thought of as being in the shape of a letter box, as shown in FIG. 1, bordered by invalid screen portions. For example, a video signal is placed on the 360 lines at the main screen portion of the display, but not on the upper and lower 60 lines. In this manner, a flat screen with an aspect ratio of 16:9 is obtained.

In the case of the PAL plus standard, the image quality is preserved by generating a vertical resolution component known as the helper signal. As shown in FIG. 2, the helper signal for compensating the vertical resolution is multiplexed at the top and bottom, invalid portions of the letter box shape screen. In addition, a WSS signal, which signals the presence of the helper signal and which includes the aspect ratio information, is stored at invalid line 23. Reference signals, which are used to reconstruct the helper signal, are also stored in the invalid portions. A reference burst signal with a sub-carrier frequency (4.43 MHz) is disposed at the second half of the line 23. Moreover, a reference signal that represents the 100% white level is disposed on a line 623.

While the decimated screen is conveniently thought of as a letter box, each line actually comprises an analog signal. As shown in FIG. 3, line 23 is depicted as an analog signal including a blanking signal, a color burst, the WSS signal, a reference burst and another blanking signal. FIG. 4 depicts all of the lines as analog signals and distinguishes between the valid and vertical blanking intervals of the screen. It should be noted that line 23, which is located in the upper invalid portion, is considered valid according to FIG. 4 in the sense that line 23 is not in the vertical blanking interval. Line 623 is in the vertical blanking interval because line 623 carries the 100% white level, which should not be displayed.

In the case of the EDTV-2 standard, as shown in FIG. 5, VT and VH signals are multiplexed at the top and bottom of the letter box screen, and an HH signal is multiplexed at the main screen portion. The VT signal is a vertical time high band component that is lost in the interlace process when a video signal photographed in the double speed non-interlace mode is transmitted by the interlace mode. The VH signal is a vertical luminance high band component that is lost when a video signal with an aspect ratio of 16:9 is formed by decimation into the letter box shape. The HH signal is a horizontal luminance high band component with a band ranging from 4.2 MHz to 6 MHz and is frequency shifted and multiplexed to the Fukinuki hole (an area in the vertical/temporal frequency domain where the color signals are not located) of the main screen portion.

As shown in FIG. 6, NRZ signals (B1 to B4) that represent an aspect ratio are disposed on lines 22 and 285. Next, identification (ID) signals are disposed that represent whether or not signal components of VT, VH, and HH are present (the ID signals are modulated with a color sub-carrier and identify whether the signal components VT, VH, and HH are present depending upon whether the phase of the modulated signals are phase 0 or in phase with the color sub-carrier). Lastly, a 2.04 MHz confirmation signal that identifies the video signal as a signal corresponding to the EDTV-2 standard is disposed.

FIG. 7 depicts all of the lines of the screen. As discussed, only the valid screen (which includes the upper and lower invalid portions) is extracted, compressed, and encoded. Thus, data in the vertical blanking interval and the horizontal blanking interval is omitted. That is, lines 23 to 232 of a field 1 and lines 285 to 524 of a field 2 are encoded.

Digital Recording/Reproducing

The helper signal of the PAL plus system and the VT, VH signals of the EDTV-2 system are then digitized as part of the valid screen. Digital recording systems process the helper and VT, VH signals as chrominance signals because, as shown in FIGS. 8A, B, the chrominance signals and helper signals (VT, VH signals) have a center frequency of 4.43 MHz. However, the helper signal has a much larger bandwidth (4.5 MHz) than the chrominance signals (approximately 1 MHz). This means that some of the information of the helper signal and VT, VH signals is lost during digital compression and a high image quality of the frame cannot be maintained.

SUMMARY OF THE INVENTION

The present invention provides digital recording/reproducing of signals corresponding to the PAL plus and the EDTV-2 standards while maintaining a high image quality. The invention extracts resolution signals from the invalid portions of the letter box and applies them to the luminance signal Y input of the digital recording/reproducing device. As shown in FIG. 8A, the luminance signal Y has a large bandwidth, which can accommodate the vertical resolution signals. In this manner, the vertical resolution signals, i.e., the helper signal and the VT, VH signals, are digitally stored without a loss of information.

The invention is embodied as a television signal recording apparatus, which digitally records a composite signal. The composite signal is composed of a luminance signal, a chrominance signal, and a resolution compensation signal that are positioned at predetermined television scanning lines. A Y/C separator separates the luminance signal and the chrominance signal from the composite signal. A combiner combines the resolution compensation signal and the luminance signal separated by the Y/C separator onto a first signal line. A demodulator demodulates the chrominance signal and outputs a color difference signal onto a second signal line. A digital video signal recorder digitally processes signals on the first signal line separately from signals on the second signal line and records digitally processed signals onto the record medium.

The invention is also embodied as a television signal reproducing apparatus, which digitally reproduces a composite signal. A digital reproducer reproduces a component signal, which includes a luminance signal combined with a resolution compensation signal, from a record medium. A separator separates the luminance signal from the resolution component signal and a combiner combines the resolution component signal with color difference signals.

The invention is also embodied as a method of recording and reproducing composite signals. In the recording method, the luminance signal and the chrominance signal are separated and the resolution componensation signal is combined with the luminance signal. The chrominance signal is demodulated into color difference signals and the component signals are recorded on a record medium. In the reproducing method, the component signal is reproduced from the record medium; and the resolution compensation signal is separated from the luminance signal. The color difference signals then are combined with the resolution component signal.

BRIEF DESCRIPTION OF THE DRAWINGS

A more complete appreciation of the present invention and many of its attendant advantages will be readily obtained by reference to the following detailed description in connection with the accompanying drawings, in which:

FIG. 2 shows the letter box video screen as applied to a Pal plus system;

FIGS. 11A, B, C are timing diagrams of the WSS signal of a PAL plus signal;

FIG. 13 is a block diagram of a PAL plus recording processor according to the second embodiment;

FIG. 23 shows a VAUX TR pack stored on the recording medium;

FIGS. 30A, B depicts tracks stored on the recording medium;

FIGS. 37A, B depict different types of data stored in the packs;

FIG. 38 depicts a sync block;

FIGS. 39A, B depict a pre-sync block and post-sync block, respectively;

FIG. 50 is a schematic diagram showing the structure of a video area;

FIG. 51 is a schematic diagram showing 149 sync blocks of a video sector;

FIG. 53 depicts an unconfigured data pack;

FIG. 54 depicts a data pack configured as a TRpack;

FIG. 55 is a schematic diagram showing the structure of a source pack of the VAUX data that stores the color phase information;

FIG. 56 is a schematic diagram showing the structure of a source pack of the VAUX data that stores the aspect ratio information;

FIGS. 57A, B and 58 show a block diagram of a digital video reproducing processor for a PAL plus system;

FIG. 59 shows a block diagram of a digital video reproducing processor for an EDTV-2 system;

FIG. 67 is a digital signal reproducing VCR for EDTV-2 systems; and

DETAILED DESCRIPTION OF THE PREFERRED EMBODIMENTS

Figure 1:
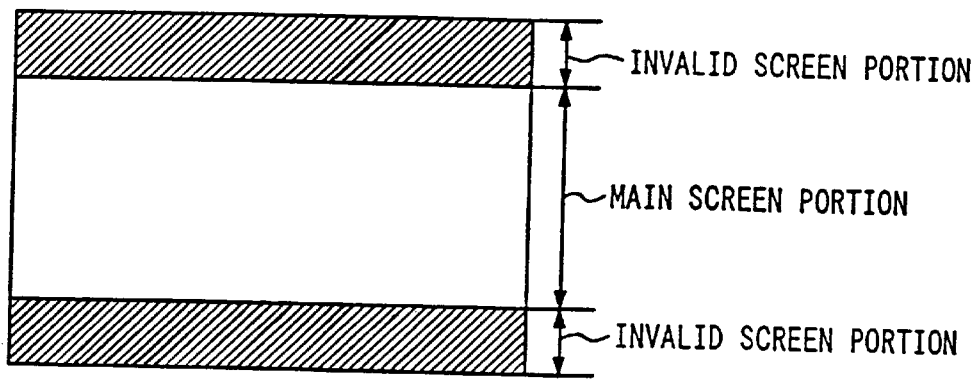
FIG. 1 shows a letter box video screen.
Figure 6:
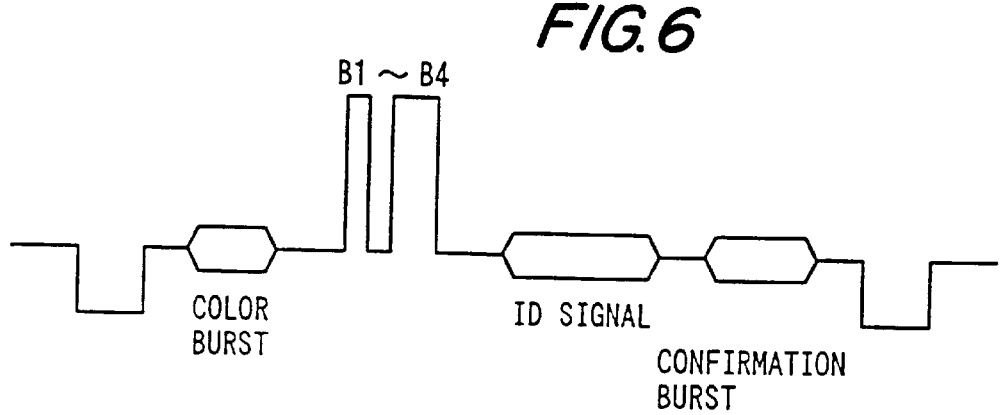
FIG. 6 is a timing diagram of lines 22 and 285 in FIG. 5.
Figure 3:
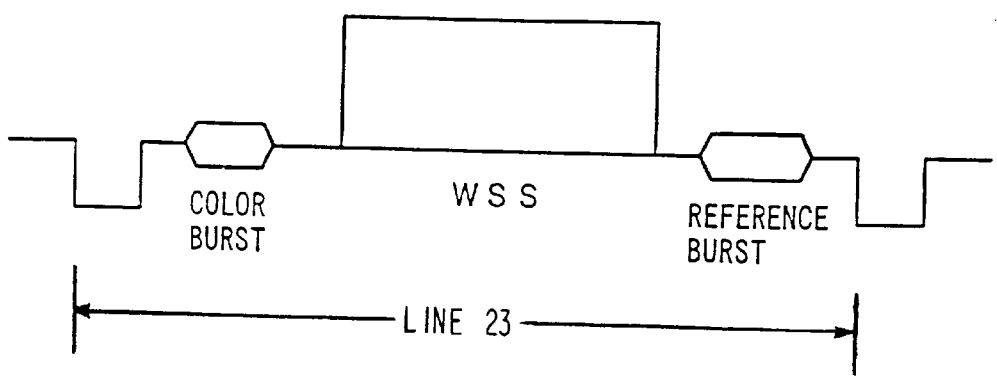
FIG. 3 is a timing diagram of line 23 in the letter box video screen of FIG. 2.

Referring now to the drawings, wherein like reference numerals designate identical or corresponding parts throughout the several views, the present invention will be described.

A. RECORDING

1. PAL plus Embodiments

Figure 9:
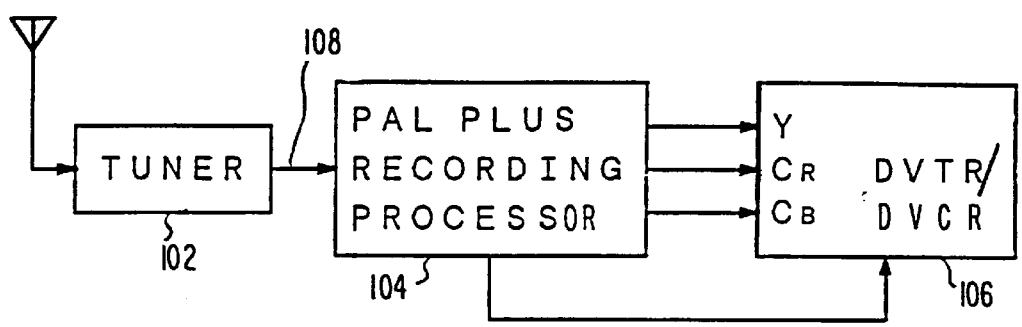
FIG. 9 is a block diagram of a PAL plus recording system.

FIG. 9 depicts a block diagram of the present invention employed in a PAL plus system. A PAL plus television signal is received by a tuner 102 and sent to an input terminal 108. The PAL plus recording processor 104 then processes the PAL plus signal by extracting the helper signal from the upper and lower invalid portions of the letter box (FIG. 2) and sends them to the luminance input Y of the digital VCR 106.

In addition, the WSS signal, which includes aspect ratio information and indicates the presence of the helper signal, is extracted and stored in a TR pack (a data pack stored in a reserved area of the recording medium; a more detailed discussion of the recording format is discussed below in the Digital VCR Format Section).

a. First Embodiment i. PAL plus Recording Processor

Figure 10:
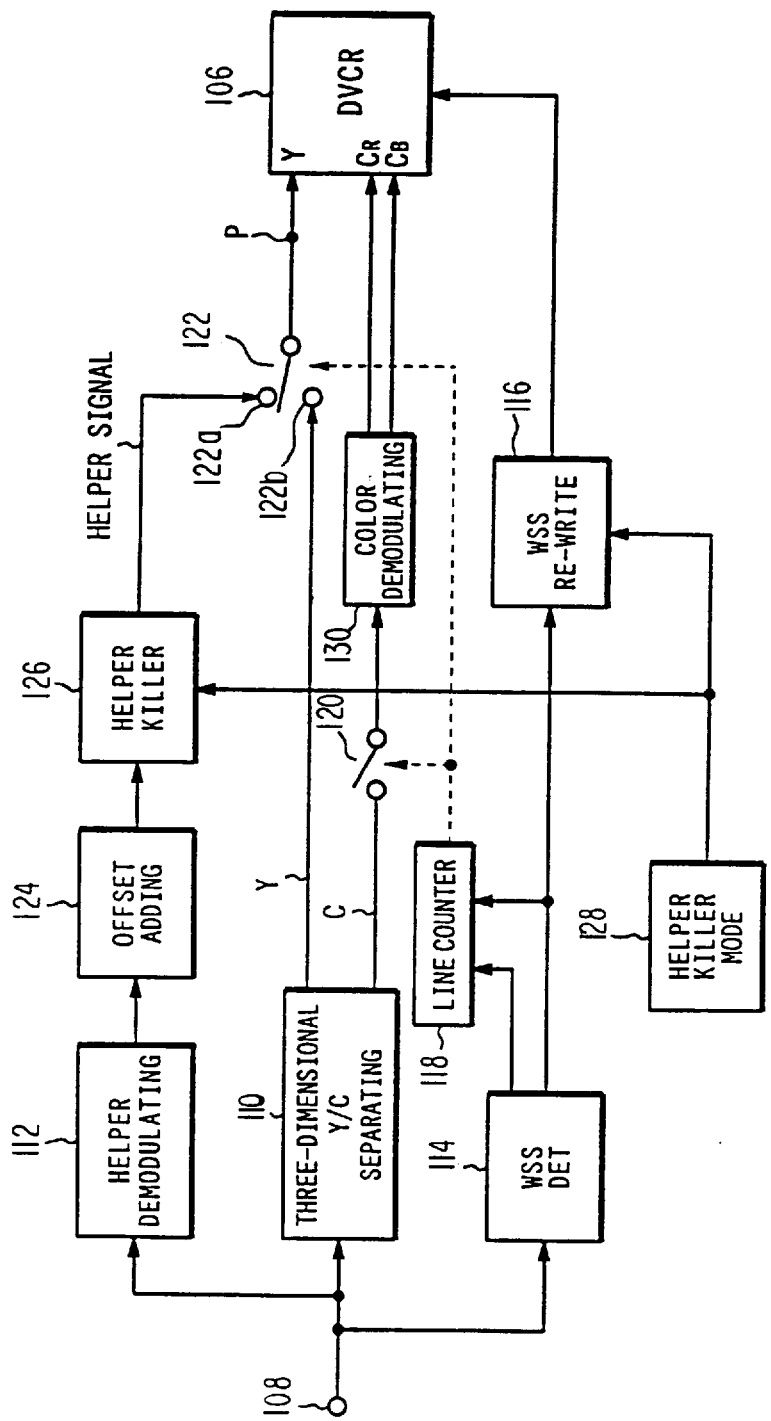
FIG. 10 is a block diagram of a PAL plus recording processor according to the first embodiment.

FIG. 10 depicts a block diagram of the PAL plus recording processor of the present invention. A signal received from the input terminal 108 is supplied to a three-dimensional Y/C separating circuit 110, which separates a luminance signal Y and a color signal C (that have been frequency multiplexed according to the PAL plus standard). The separated luminance signal Y is supplied to an input terminal 122b of a switch circuit 122. An output signal of the switch 122 is supplied to a Y signal input terminal of a digital VCR 106.

The separated color signal C is supplied to a switch circuit 120. The output signal of the switch circuit 120 is supplied to a color demodulating circuit 130, which demodulates the separated color signal C into color difference signals CR and CB. The CR and CB signals are then supplied to color difference signal input terminals CR and CB of the digital VCR 106.

The WSS signal on the line 23 of the PAL plus signal is detected by the WSS detecting circuit 114 and supplied to a WSS rewriting circuit 116. The WSS rewriting circuit 116 rewrites the content of the WSS signal to be consistent with a format of the digital VCR 106. The output signal of the WSS rewriting circuit 116 is supplied to the digital VCR 106 and the WSS signal is written to the TR pack.

The WSS detecting circuit 114 detects the line number of which the WSS signal is inserted (namely, the line 23). The resultant signal (that is an ID signal) is supplied as a preset input signal to a line counter 118. In addition, the WSS detecting circuit 114 includes a horizontal synchronous signal separating circuit (not shown). The separated horizontal synchronous signal is supplied as a count input signal to the line counter 118 which represents the line number in synchronization with the input PAL plus signal. In this manner, the line counter 118 can turn off the switch 120 when the WSS signal on line 23 is present in order to prevent the WSS signal from being sent to the digital VCR 106.

The PAL plus signal supplied to the helper signal demodulating circuit 112 is demodulated and then supplied to an offset adding circuit 124. The helper signal that is inserted into the invalid screen portions of the letter box is extracted by modulating a chrominance subcarrier signal. The DC level of the helper signal is low, 0 IRE and there is virtually no disturbance of the invalid screen portions. However, since the signal level recorded by the digital VCR 106 is 0 IRE or higher, the offset adding circuit 124 adds a DC level so that the signal can be recorded. For example, as shown in FIG. 11C, the level La of the added offset becomes 51 IRE.

The resultant helper signal is supplied to a helper killer circuit 126, which is enabled or disabled by a helper killer signal (corresponding to a control signal) supplied from a helper killer mode selecting circuit 128. When the helper signal is present and the helper killer circuit 126 is turned off, the helper signal is supplied to an input terminal 122a of the switch circuit 122. On the other hand, when the helper killer circuit 126 is turned on, signal components are not supplied to the input terminal 122a of the switch circuit 122.

The helper killer circuit 126 is turned on or off corresponding to the performance of the digital VCR 106 that records the PAL plus signal. For example, when the record frequency band of the digital VCR 106 is narrow, the helper killer circuit 126 is turned on.

The switch circuits 120 and 122 are controlled by the line counter 118, which generates a control signal that distinguishes the main screen portions from the invalid screen portions corresponding to the received line number. In the interval of the upper and lower invalid screen portions, the switch circuit 120 is turned off. In the interval of the main screen portions, the switch circuit 120 is turned on and the input terminal 122b of the switch circuit 122 is selected.

Thus, in the interval of the upper and lower invalid screen portions of the screen, only the helper signal is supplied as the luminance signal Y to the luminance signal input terminal of the digital VCR 106. At this point, the color signal C is not supplied to the color demodulating circuit 130 because the switch 120 is turned off by the line counter. Thus, the color difference signals CR and CB are not supplied to the digital VCR 106. Consequently, only the helper signal, as the luminance signal Y, is recorded on the cassette tape of the digital VCR 106 at the appropriate time.

FIGS. 11B and 11C show the signal input to the luminance terminal Y of the digital VCR 106 when the helper signal is present. FIG. 11B shows signals including the WSS signal on the line 23 and FIG. 11C shows the helper signal to which the offset is added.

In the interval of the main screen portions of the screen, the luminance signal Y (FIG. 11A, point P) is input to the luminance signal input terminal of the digital VCR 106 and the color signal C is supplied to the color demodulating circuit 130. Output signals of the color demodulating circuit 130 are input to the color difference signal input terminals CR and CB. Then, the processed signals are sent to the digital VCR 106.

ii. Digital VCR Recording

After the PAL plus signal has been processed by the PAL plus recording processor 104 (FIG. 10), the digital VCR 106 converts the input luminance signal and the two color difference signals into digital signals. Thereafter, the digital signals are converted into (4:2:0) component signals. The resultant signals are processed as a record signal and recorded on the cassette tape. While the luminance and color signals are preferably converted in the digital VCR 106, the signal conversion may be performed before the luminence and color signals are input to the digital VCR 106.

Figure 12B:
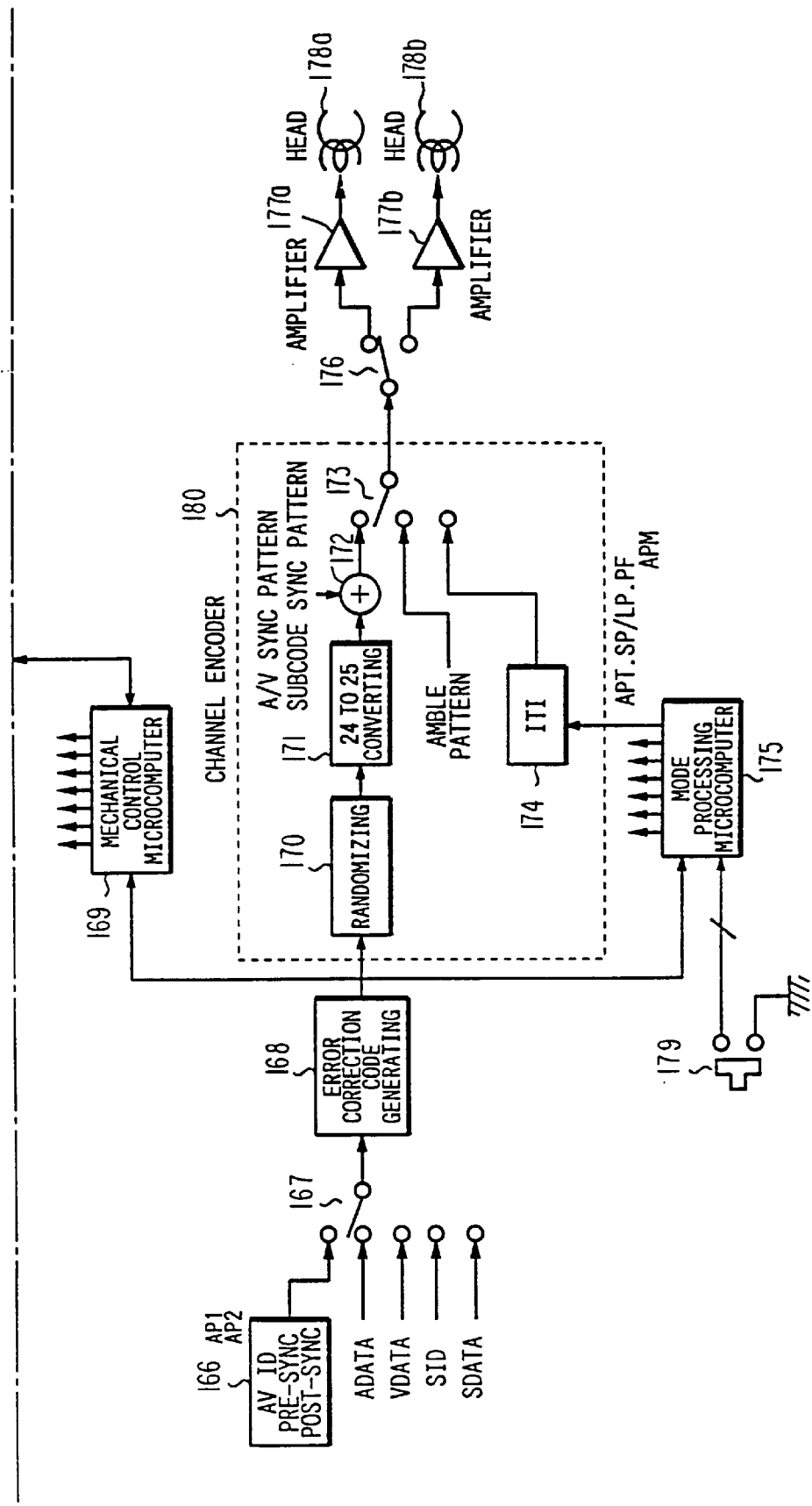
FIGS. 12A, B are block diagrams of a digital video recording processor according to the first embodiment.

FIGS. 12A and 12B depict a block diagram of a digital VCR according to the first embodiment. The luminance signal (Y) and the color difference signals (CR and CB) are supplied to terminals 132a, 132b, and 132c, respectively. These received signals are supplied to A/D converters 136a, 136b, and 136c through low pass filters 134a, 134b, and 134c, respectively. The low pass filters 134a, 134b, and 134c restrict the frequency bands of the input signals so as to remove loop-back distortions.

The digital component video signals Y, CR, and CB are then supplied to a blocking circuit 138, which segments data of a real screen into (8 sample×8 line) blocks. Output signals of the blocking circuit 138 are supplied to a shuffling circuit 140, which shuffles the output signals of the blocking circuit 138. The shuffling process is performed so as to prevent data recorded on the tape from being successively lost due to a head clogging, a horizontal tape scratch, or the like. In addition, the shuffling circuit 140 changes the order of the luminance signal and the color difference signals so that they can be easily processed in the later stages.

The output signal of the shuffling circuit 140 is supplied to a data compression encoding portion 142. The data compression encoding portion 142 comprises a compressing circuit (corresponding to the DCT method), an estimator that estimates the amount of generated data and a quantizer that quantizes the compressed data (corresponding to a quantizing step). The compressed video data is placed in a predetermined sync block (a data block which stores the digital video data on the video tape in packs as discussed below) by the framing circuit 144. The output signal of the framing circuit 115 is supplied to a combining circuit 146, which combines the sync block with the video auxiliary data VAUX.

An analog audio signal that is received from a terminal 164 is supplied to an A/D converter 156, which digitizes the analog audio signal and outputs a digital audio signal to a shuffling circuit 158. The shuffling circuit 158 shuffles the digital audio data and outputs the shuffled data to a framing circuit 160. The framing circuit 160 places the audio data in an audio sync block and the audio sync block is sent to a combining circuit 162.

A mode processing microcomputer 175 (FIG. 12B) interfaces with an operator a display, which operates in synchronization with a field frequency of 60 Hz or 50 Hz of a television image. The display includes switches 179 disposed outside the digital VCR 106 main body and to designate a record mode (such as a SP/LP record mode), a reproduction mode, and so forth. The output signal of the switches 179 is supplied to the mode processing microcomputer 175, which processes the selections of the operator.

The mode processing microcomputer 175 receives commands from an operator and generates pack data, including video auxiliary data VAUX, audio auxiliary data AAUX, and sub-code data. The pack data is forwarded, via a mechanical control microcomputer 169, to a signal processing microcomputer 154 synchronized with the rotations of a drum (not shown) for example, 9000 rpm and 150 Hz, which generates an absolute track number contained in a "title end" pack or the like. In addition, the signal processing microcomputer 154 generates a TTC (title time code) to be stored in a sub-code sync block (used in a search mode) on the video tape.

The video auxiliary data VAUX generated by the signal processing microcomputer 154 is supplied to a VAUX circuit 148 and the audio auxiliary data AAUX is supplied to an AAUX circuit 152. The combining circuits 146, 162 combine the VAUX and AUX signals with the respective video and audio information.

A sub-code circuit 150 generates SID data, as well as, AP3 of the ID portion and the sub-code pack data SDATA corresponding to the output signal of the signal processing microcomputer 154.

A sync generating circuit 166 generates each ID portion of AV data (audio/video data), a pre-sync, and a post-sync. The sync generating circuit 166 generates application ID, e.g., AP1 and AP2, and places them in predetermined ID portions.

The output signal of the sync generating circuit 166 the AAUX (ADATA), the VAUX (VDATA), the SID and the SDATA are output to a switch 167 and are selected at predetermined times. An error correction code generating circuit 168 adds a predetermined parity to the signal received from the switch circuit 167. The output signal of the error correction code generating circuit 168 is supplied to a randomizing circuit 170, which randomizes the signal in such a manner that the record data does not deviate. The output signal of the randomizing circuit 170 is supplied to a "24 to 25" converting circuit 171, which converts 24-bit data into 25-bit data for removing a DC component that adversely affects magnetic recording/reproducing operations. At this point, an encoding process (1/1−D2) (not shown) of PR IV (partial response class 4) suitable for a digital recording operation is performed.

A combining circuit 172 combines the output signal of the "24 to 25" converting circuit 171 with sync patterns of audio data, video data, and sub-code data and outputs the combined signal to a switch 173.

The mode processing microcomputer 175 manages the mode of the entire VCR and outputs the APT, SP/LP, and PF signals to an ITI circuit 174. The ITI circuit 174 generates data of an ITI sector and outputs the ITI sector data to the switch 173, which is time-controlled to select either the combining circuit 172 output, the ITI sector data or an amble pattern.

The output signal of the switch 173 is supplied to a switch 176, which is switched corresponding to the scanning of heads 178a and 178b. The output signal of the switch 176 is amplified by head amplifiers 177a and 177b and is supplied to the heads 178a and 178b, respectively.

Thus, the digital VCR 106 according to the present invention compresses and records the digital luminance signal (Y) and the color difference signals (CR and CB) into a video sector. The digital audio signal is recorded in an audio sector. In addition, the VAUX data and the AAUX data are recorded in the pack structure. A more detailed discussion of the digital VCR recording format is set forth below in the Digital VCR Format section.

b. Second Embodiment i. PAL plus Recording Processor

The Pal plus recording processor 104 of the second embodiment shown in FIG. 13 is similar to the first embodiment and a detailed discussion of the second embodiment will be omitted. The difference between the embodiments is that the second embodiment does not have a helper demodulating circuit 112. Consequently, the reproducing processor (discussed in the Reproducing section) of the second embodiment does not employ a helper modulating circuit.

Since the helper signal is not demodulated in the second embodiment, the helper signal and the modulating subcarrier signal are digitally stored by the digital VCR 106. As discussed, the helper signal is multiplexed only in the interval of the invalid screen portions and, therefore, is temporally different from that of the video signal in the interval of the main screen portions. Thus, even if the helper signal is not demodulated when the PAL plus signal is recorded by the digital VCR 106, no problem substantially occurs.

ii. Digital VCR Recording

The digital VCR recorder 106 employed with the PAL plus recording processor of the first and second embodiments is the same, and a description of the digital VCR recorder 106 is deferred to the section concerning FIGS. 12A, B.

c. Third Embodiment i. PAL Plus Recording Processor

Figure 14:
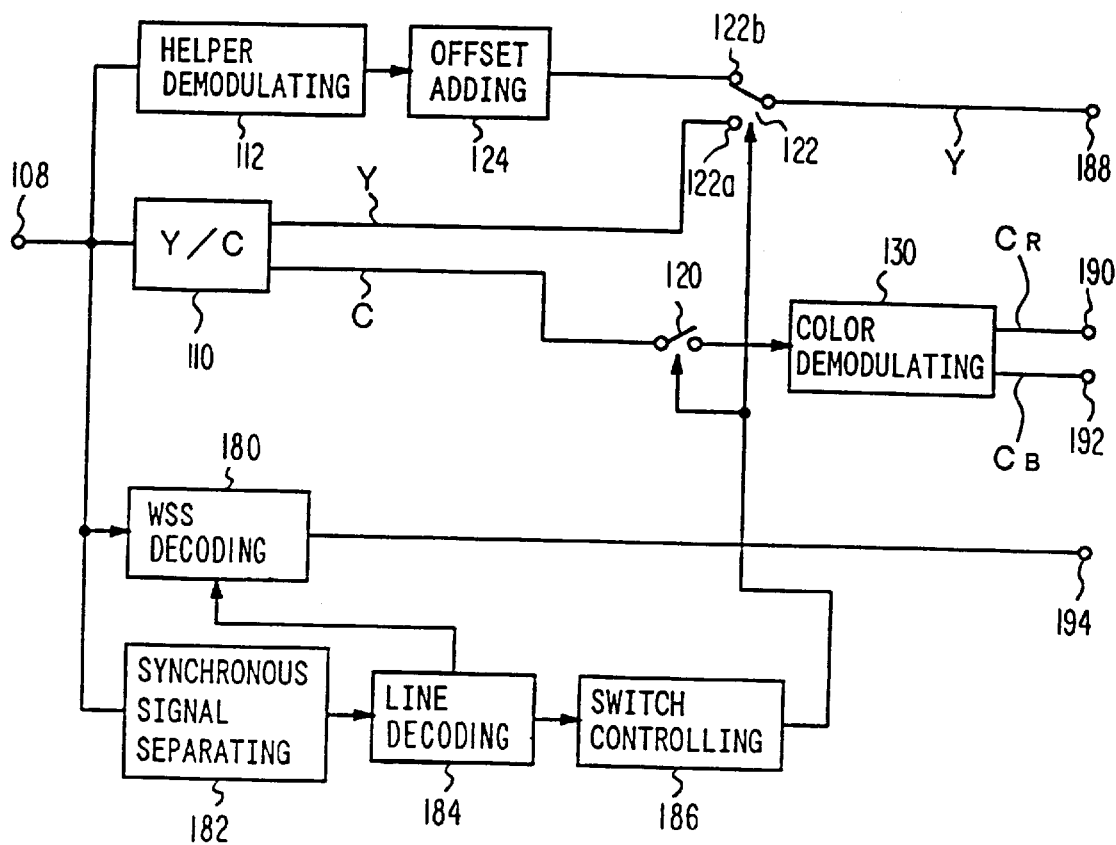
FIG. 14 is a block diagram of a PAL plus recording processor according to the third embodiment.

The PAL plus recording Processor 104 of the third embodiment is similar to the first and second embodiments and will now be described with reference to FIG. 14.

As in the first and second embodiments, the PAL plus recording processor 104 includes a Y/C separating circuit 110 for separating the luminance signal Y from the color signal C. As before, the color signal is supplied to a color demodulating circuit 130, which separates the color signal into color difference signals CR and CB. In addition, a helper demodulating circuit 112 and an offset adding circuit 124 process the helper signal. The WSS signal is stored in a TR pack by a WSS decoding circuit 180 and a line controlling circuit 182, 184 and 186 control the switches 122 and 120.

The differences between the third embodiment and the first two embodiments, will now be described. The PAL plus recording processor 104 of the third embodiment does not include a helper killer circuit 126. Also, the WSS signal is processed by a WSS decoding circuit 180 instead of a WSS detecting circuit 114 and WSS rewriting circuit 116. Moreover, the line controlling circuit is comprised of a synchronous signal separating circuit 182, a line decoding circuit 184 and a switch controlling circuit 186.

The PAL plus recording processor 104 of the third embodiment achieves the same results as the first two embodiments by storing the helper signal as a luminance signal Y during the invalid portions of the screen. The luminance signal Y and the color signals CR, CB are stored during the main portion of the screen and the WSS signal on line 23 is stored to a TR pack.

ii. Digital VCR Recording

The digital VCR recorder 106 of the third embodiment is similar to the digital recorder of the fifth embodiment (FIG. 29) and will be discussed in detail in that section. However, when a PAL plus video signal is recorded, the A/D converter 450 shown in FIG. 29 digitize component color video signals in the ratio of 4:2:0. The masking signal generating circuit 456 generates a masking signal for the line 23. The WSS signal on the line 23 is placed in a pedestal level, which is an offset slightly higher than the black level used to separate the active video from the blanking level. One video frame is recorded with 12 tracks. In addition, the data of the WSS signal is recorded in the TR pack of the VAUX data and the aspect ratio information is recorded in the source control pack of the VAUX data.

d. Fourth Embodiment i. PAL plus Recording Processor

Figure 15:
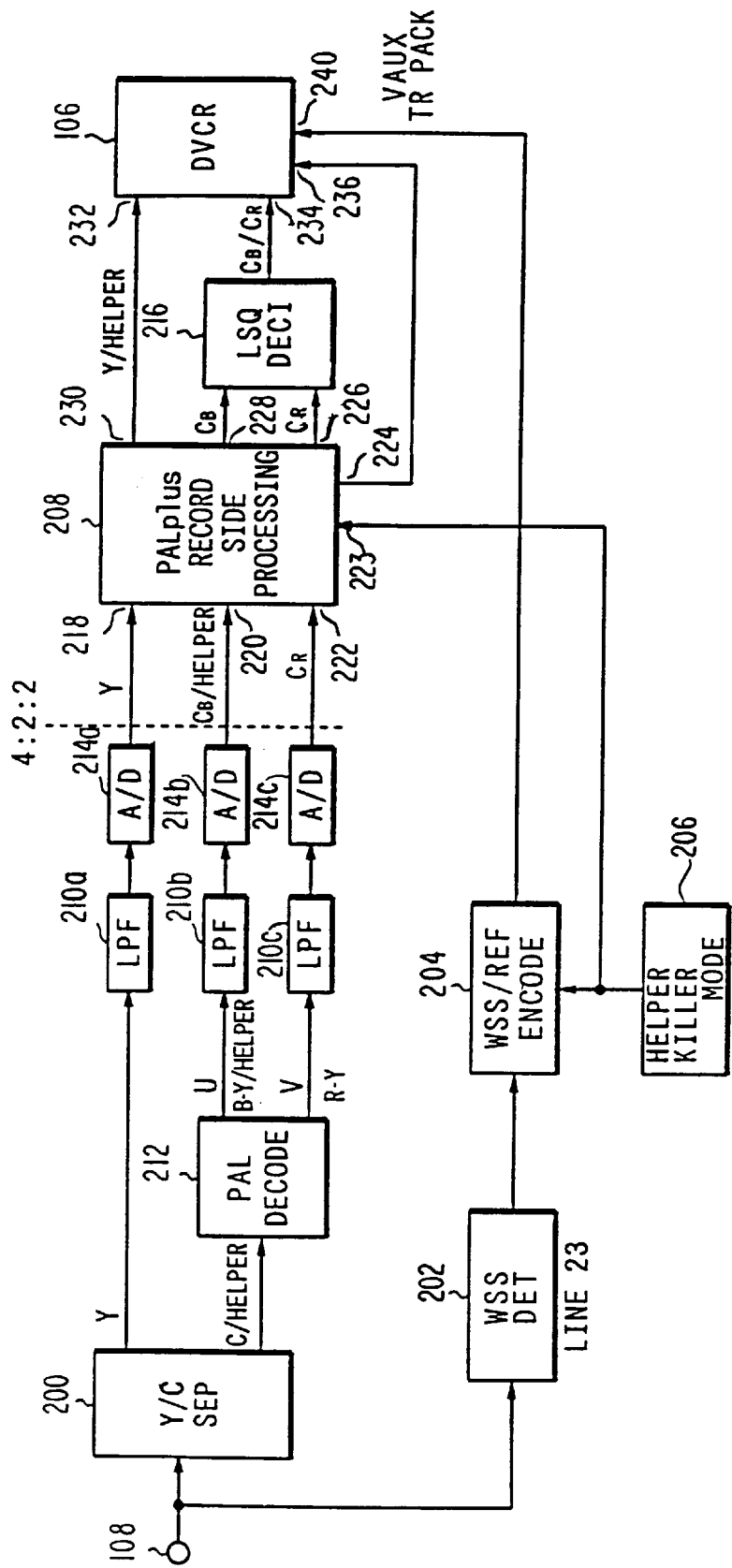
FIG. 15 is a block diagram of a PAL plus recording processor according to the fourth embodiment.

FIG. 15 depicts the PAL plus Recording Processor of the fourth embodiment. As in the previous embodiments, the helper signal is extracted and stored as a luminance signal Y during the invalid portions of the screen. In this embodiment, however, the luminance signal Y, the color difference signals CB, CR and the helper signal are digitized before being input to the digital VCR 106 and are processed by a PAL plus recording side processing circuit 208.

A. Brief Overview of FIG. 15

The WSS signal is processed in the fourth embodiment in a similar manner to the previous embodiments. The PAL plus signal is input through terminal 108 to a WSS detecting circuit 202. The WSS detecting circuit 202 detects the WSS signal on line 23 and outputs the WSS signal to a WSS reference/encoder circuit 204, which rewrites the WSS signal in a similar manner to the WSS rewrite circuit 116 (FIG. 10). The WSS reference/encoding circuit 204 then sends the WSS signal in a TR pack along with VAUX data to the input terminal 240 of the digital VCR 106.

A helper killer mode controller 206 is connected to both the WSS reference/encoder circuit 204 and an input terminal 223 of the PAL plus record side processing circuit 208. As before, the helper signal is killed when the helper killer mode is enabled.

The PAL plus signal is also input to the Y/C separating circuit 200, which separates the PAL plus signal into a luminance signal Y and a color/helper signal C/HELPER. A Y signal output terminal of the Y/C separating circuit 200 is connected to a low pass filter 210a, while the C signal/helper signal output terminal is connected to a PAL decoder 212. The PAL decoder 212 further separates the C/HELPER signal into color difference signals B−Y/HELPER (CB, U) and R−Y (CR, V). The color difference signals are then sent to low pass filters 210b, 210c and the outputs of all three low pass filters 210a, 210b, and 210c are connected to A/D converters 214a, 214b, and 214c, respectively.

The A/D converters 214a, 214b and 214c digitize the luminance signal Y and the color difference signals (including the helper signal), and the digital signals are output to terminals 218, 220 and 222, respectively, of the PAL plus record side processing circuit 208.

An output terminal 230 of the PAL plus record side processing circuit 208 is connected to an input terminal 232 of the digital VCR 106. A data output terminal 224 of the PAL plus record side processing circuit 208 is connected to a data input terminal 236 of the digital VCR 106. An output terminal 228 of the PAL plus record side processing circuit 208 is connected to a CB signal input terminal of a line sequencing circuit 216. An output terminal 226 of the PAL plus record side processing circuit 208 is connected to a CR signal input terminal of the line sequencing circuit 216. The output signal CB/CR of the line sequencing circuit 216 is connected to an input terminal 234 of the digital VCR 106.

B. Detailed Discussion of FIG. 15

A more detailed discussion of the operation of the PAL plus recording processor according to the fifth embodiment will now be set forth. A PAL plus signal corresponding to the PAL plus system that is received from, for example, an antenna is supplied to the input terminal 108 through a tuner 102 (FIG. 9). The PAL plus signal is supplied to both the Y/C separating circuit 200 and the WSS detecting circuit 202. Within the Y/C separating circuit, the PAL plus signal is supplied to a synchronous signal separating circuit (not shown). Thus, a vertical horizontal signal and a horizontal synchronous signal are separately extracted from the PAL plus signal. The separately extracted synchronous signals are supplied to a line counter 264 (FIG. 17) that controls the entire apparatus.

The Y/C separating circuit 200 separates a luminance signal Y and a chrominance signal C that have been frequency multiplexed from the received PAL plus signal. Only the chrominance signal C is supplied to the PAL signal decoder 212, which outputs color difference signals B–Y and R–Y. The helper signal, which is the vertical resolution compensation signal, is inserted into the color difference signal in the invalid screen portions that are on lines 24 to 59, lines 275 to 310, lines 336 to 371, and lines 587 to 622 of the screen.

The luminance signal Y that is output from the Y/C separating circuit 200 is supplied to the low pass filter 210a. The color difference signals B–Y and R–Y, which are output from the PAL decoder 212, are supplied to the low pass filters 210b and 210c, respectively. The resultant luminance signal Y and color difference signals B–Y and R–Y in which excessive high band components have been removed by the low pass filters 210a, 210b, and 210c are supplied to the A/D converters 214a, 214b, and 214c, respectively.

When the count value of the line counter (not shown) becomes a value corresponding to an invalid screen portion, the Y/C separating circuit 200 can be changed to the operation of the conventional band pass filter from the operation of a comb-shaped filter to prevent the modulated helper signal from being adversely affected.

The low pass filter 210b, which receives the color difference signal B–Y into which the helper signal is inserted, is controlled corresponding to the count value of the above-described line counter. In other words, when the count value accords with a value corresponding to an invalid screen portion, the function of the low pass filter 210b is turned off. Since the helper signal contains many high band components valid for the helper function, the high band components are not removed by the low pass filter.

The luminance signal Y and the color difference signals B–Y and R–Y that are supplied to the A/D converters 214a, 214b, and 214c are normalized and digitized so that their levels accord with those defined in CCIR REC 601. In the definition of CCIR REC 601, the maximum value of the white level is a digital value "235", whereas the maximum value of the black level (pedestal level) is a digital value "16". In the A/D converters 214a, 214b, and 214c, the luminance signal Y and the color difference signals B–Y and R–Y are normalized corresponding to these digital values.

C. Digital Normalization, FIG. 16

Figure 16:
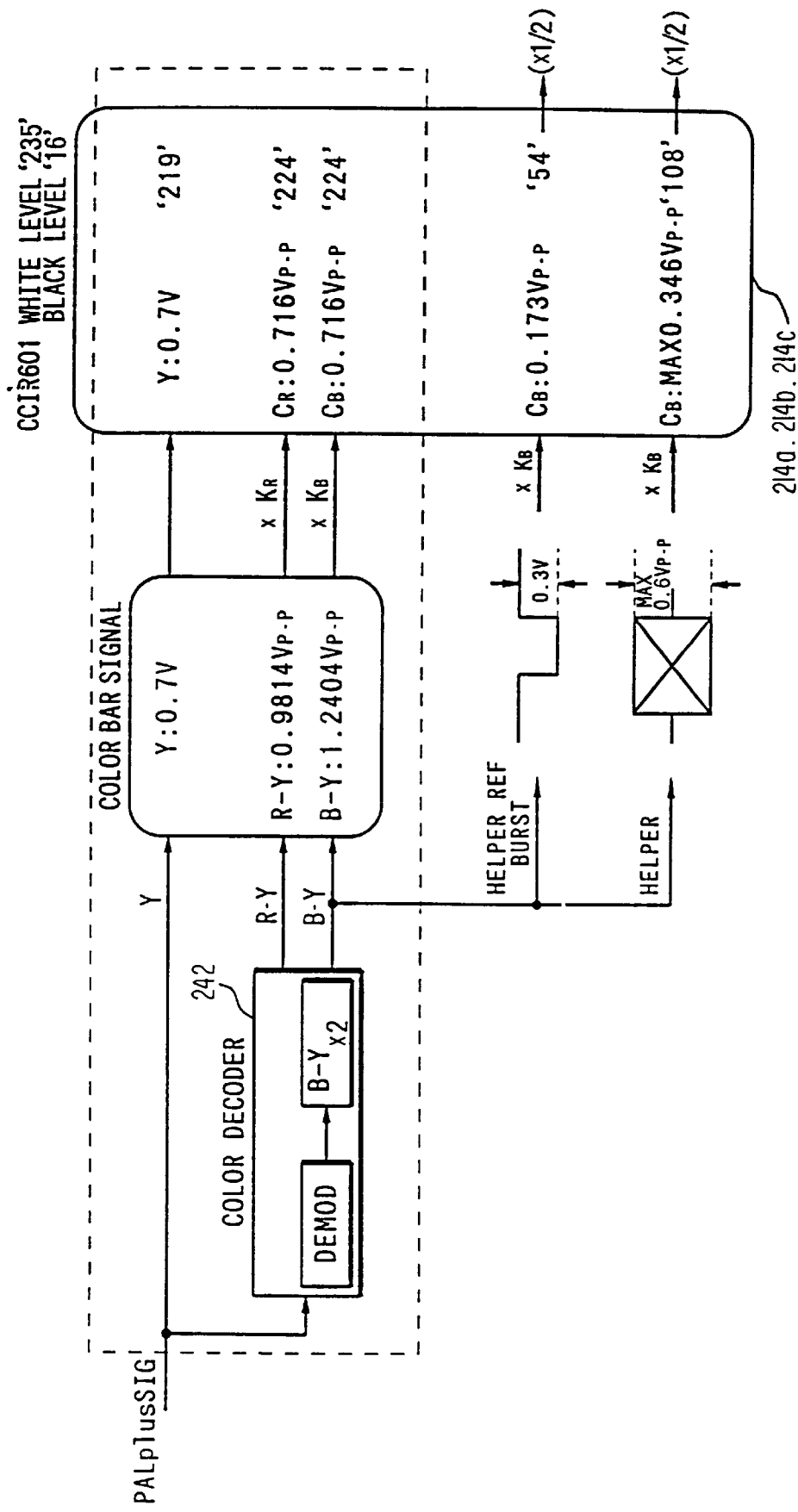
FIG. 16 shows the normalization of the video components according to the fourth embodiment.

FIG. 16 is a schematic diagram showing the digital normalization of the luminance signal Y and the color difference signals B–Y and R–Y. The Y/C separating circuit 200 and the low pass filters 210a, 210b, and 210c of the signal path are omitted. (In the following description, values in quotation marks represent digital values.)

The Y/C separating circuit separates a luminance signal Y and chrominance signal C from a PAL plus signal. The separated chrominance signal C is supplied to a PAL decoder 212. The chrominance signal C that is supplied to the PAL decoder 212 is demodulated into the color difference signals B–Y and R–Y. The amplitude of the color difference signal B–Y is multiplied by a factor of 2 to normalize the color difference signals.

As described above, the helper signal is inserted into the color difference signal B–Y in an invalid screen portion. Of course, the helper signal inserted into the invalid screen portion is also demodulated.

In the case of a color bar signal, the maximum values of the levels of the resultant color difference signals B–Y and R–Y and luminance signal Y are as follows:

Luminance signal Y=0.7 V

Color difference signal R–Y=0.9814 Vp–p

Color difference signal B–Y=1.2404 Vp–p

The maximum value of the level of the helper signal inserted into the color difference signal B–Y is as follows:

Helper signal=0.6 Vp–p

Reference burst signal of helper signal=0.3 Vp–p

When these signals are digitized by A/D converters 214a, 214b, and 214c (in FIG. 16, these A/D converters are not distinguished), the color difference signal R–Y is multiplexed by a coefficient KR. In addition, the color difference signal B–Y, the helper signal, and the reference burst signal of the helper signal are multiplied by a coefficient KB. Thus, the levels of these signals are as follows:

Luminance signal Y=0.7 V

Color difference signal R–Y=0.716 Vp–p

Color difference signal B–Y=0.716 Vp–p

Helper signal=0.346 Vp–p

Reference burst signal of helper signal=0.173 Vp–p

The levels of the digitized signals are as follows: (These signals are normalized corresponding to CCIR REC 601.)

Luminance signal Y="219"

Color difference signal CR (R–Y)="224"

Color difference signal CB (B–Y)="224"

Helper signal="108"

Reference burst signal of helper signal="54"

As will be described later, the amplitudes of the helper signal and the reference burst signal of the helper signal may be doubled or halved. As described above, the normalized color difference signals R–Y and B–Y are referred to as the color difference signals CR and CB, respectively. In the next signal process, the normalized color signals are digitized along with the luminance signal Y.

The signals normalized by the A/D converters 214a, 214b, and 214c are supplied to corresponding input terminals of the PAL plus record side processing circuit 208 at the input terminal 218.

D. Line Counter and Helper Killer Functions

The count value, which is output from the line counter (not shown), is supplied to the WSS detecting circuit 202. When the WSS signal on line 23 of the PAL plus signal supplied to the WSS detecting circuit 202 is detected corresponding to the count, the detected WSS signal is decoded.

The resultant signal is supplied to the WSS reference/encoder circuit 204.

As described above, the detected WSS signal contains information that identifies and controls each mode of the PAL plus system such as identification of whether or not the helper signal is present and the aspect ratio. The WSS reference/encoder circuit 204 that receives the WSS signal rewrites the content thereof and supplies the resultant WSS signal to the data input terminal 240 of the digital VCR 106. The digital VCR 106 then writes the WSS signal to the above-described TR pack.

The helper killer signal received from the helper killer mode circuit 206 is supplied to the WSS reference/encoder circuit 204 and the helper killer input terminal 223 of the PAL plus record side processing circuit 208. The helper killer mode circuit 206 turns off the helper function (namely, the function of the vertical resolution compensation for the PAL plus system) corresponding to an external input signal.

The helper killer function is turned on when a video recorder that does not correspond to the PAL plus system or a digital VCR with a narrow record band is used. Since the WSS signal contains many high band components, if it is recorded in the same manner as the conventional video signal, the recorded signal is distorted. When the recorded signal with such a distortion is reproduced by a television receiver corresponding to the PAL plus system and the WSS signal is demodulated, the identification and control signals corresponding to the PAL plus system are not correctly restored. Thus, the receiver will malfunction unless the helper signal is killed.

When the helper function is killed by the helper killer mode control circuit 206 the WSS signal reference/encoder circuit 204 rewrites the data of the WSS signal on line 23 so that it does not correspond to the PAL plus system. In the PAL plus record side processing circuit 208, in the interval of the helper signal (namely, in an invalid screen portion), the luminance signal Y is changed to a signal with a digital value "16". In addition, both the color difference signals CB and CR are changed to a signal with a digital value "128". Moreover, the WSS signal recorded on the line 23 is changed to a signal with a digital value "64". Thus, the appropriate signals are "muted" when the helper signal is killed, and bad effects due to imperfect recording of the WSS signal and the helper signal can be prevented.

d. PAL plus Record Side Processing Circuit, FIG. 17

Figure 17:
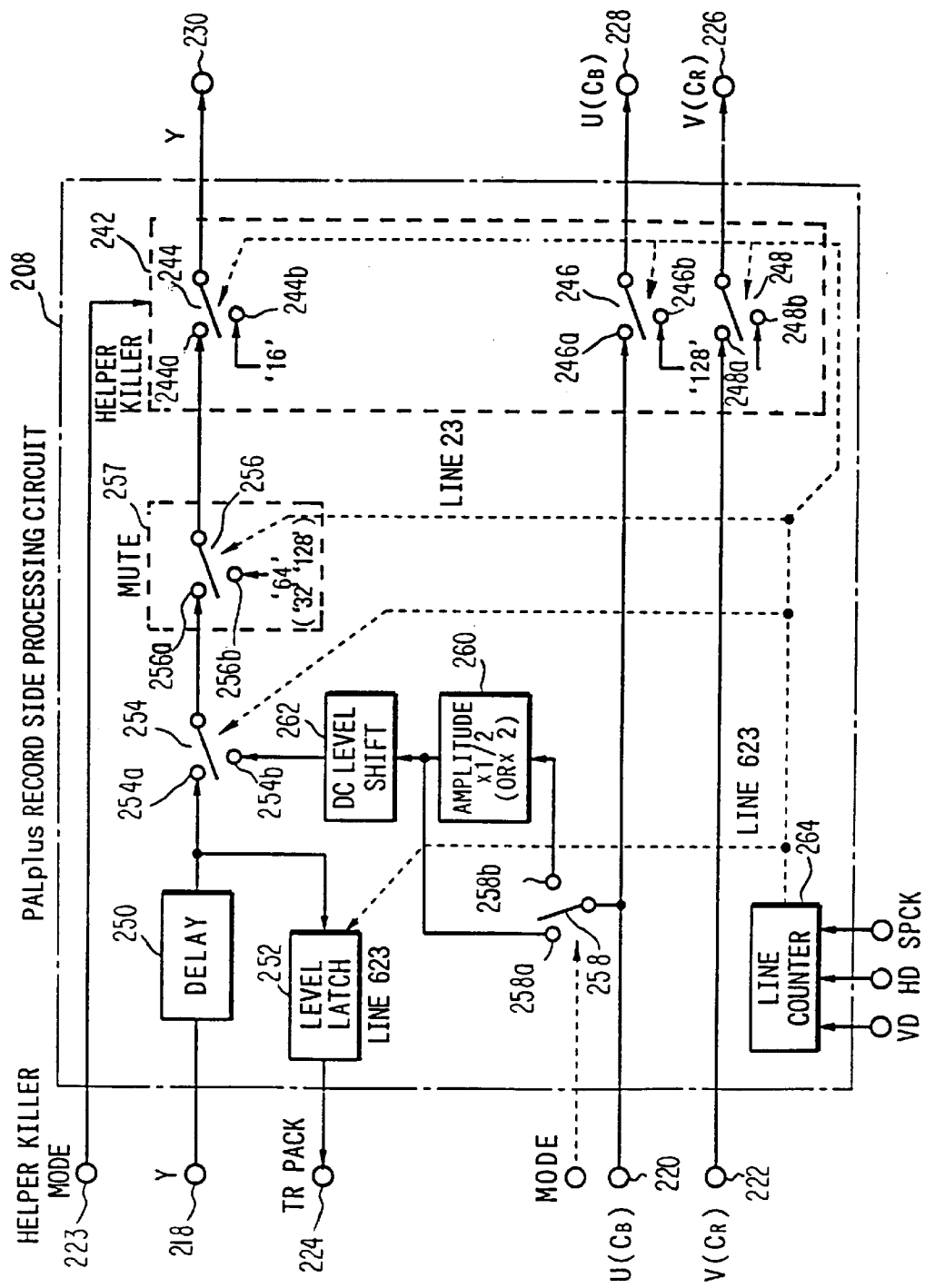
FIG. 17 is a block diagram of a PAL plus recording side processing circuit according to the fourth embodiment.
Figure 18:
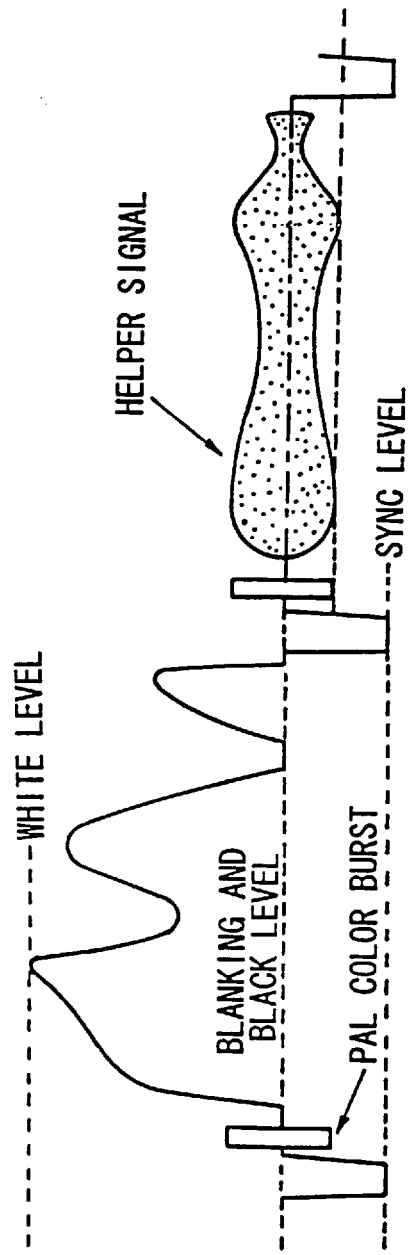
FIG. 18 is a signal diagram of line 23 according to the fourth embodiment.

FIG. 17 is a block diagram showing the construction of the above-described PAL plus record side processing circuit 208. In this circuit, the above-described helper killer function is accomplished. In addition, line 23 (on which the WSS signal has been recorded) is muted. Moreover, the shifting of the DC level of the helper signal, the addition of the DC setup value, and the latching of the lines 23 and 623 are performed.

An input terminal 223 is connected to a helper killer circuit 242 comprising switch circuits 244, 246, and 248. An input terminal 218 is connected to a delay circuit 250, which is connected to a level latch circuit 252 and an input terminal 254a of a switch circuit 254. The level latch circuit 252 is connected to a data output terminal 224. A common output terminal of the switch circuit 254 is connected to an input terminal 256a of the switch circuit 256 that constructs a mute circuit 257. An input terminal 256b is connected to a fixed digital level source, which is, for example, "64". This value can be varied to, for example, "32" or "128" corresponding to the shift amount of a DC level shift circuit 262 (that will be described later). A common output terminal of the switch circuit 256 is connected to an input terminal 244a of a switch circuit 244 included in the helper killer circuit 242.

An input terminal 220 is connected to an input terminal 246a of a switch circuit 246 of the helper killer circuit 242 and a common input terminal of a switch circuit 258. An output terminal 258a of the switch circuit 258 is connected to a DC level shift circuit 262 and an output terminal 258b of the switch circuit 258 is connected to the amplifying circuit 260. The DC level shift circuit 262 is connected to an output terminal 254b of the switch circuit 254.

An input terminal 222 is connected to an input terminal 248a of the switch circuit 248 of the helper killer circuit 242.

Input terminals 244b, 246b, and 248b of the switch circuits 244, 246, and 248 of the helper killer circuit 242 are connected to respectively fixed digital level sources. The input terminal 244b is connected to a digital level source "16" and the input terminals 246b and 248b are connected to a digital level source "1128". The output terminal of the switch circuit 244 is connected to an output terminal 230 and the output terminals of the switch circuits 246 and 248 are connected to output terminals 228 and 226, respectively.

The PAL plus record side processing circuit 208 has a line counter 264, which counts the number of lines of the video signal corresponding to the vertical synchronous signal and horizontal synchronous signal supplied from the above-described synchronous signal separating circuit (not shown) and the system clock, which controls the entire apparatus. The line counter 264 controls the level latch circuit 252, the switch circuit 254, the switch circuit 256 in mute circuit 257, and the switch circuits 244, 246, and 248 in helper killer circuit 242.

The luminance signal Y is supplied to the delay circuit 250 through the input terminal 218. The delay circuit 250 has a half clock accuracy (namely, the accuracy of the half timing of the system clock). The delay circuit 250 corrects the deviations of the timings of the luminance signal Y and the color difference signals CB and CR generated in the PAL plus record side processing circuit 208. The resultant luminance signal Y is supplied to both the input terminal 254a of the switch circuit 254 and the level latch circuit 252.

To demodulate the helper signal with the reference signal, the amplitude and phase information stored in the white 100% reference signal on line 623 is important. In the digital VCR that records a PAL plus video signal, only the valid screen is extracted, compressed, and encoded. Thus, data in the vertical blanking interval and the horizontal blanking interval is removed. Consequently, the white 100% reference signal inserted into the line 623 (present in the vertical blanking interval) is also removed when the television signal is received at an area where the electric field intensity is satisfactorily strong, even if the reference signal is lost, the white 100% reference level can be restored in the predetermined level. However, in the case where the electric field intensity is weak, it cannot be expected that the voltage of the reference signal of the restored luminance signal becomes the predetermined white 100% level.

To solve such a problem, in the present invention, the white 100% reference signal contained in a PAL plus video signal on line 623 is latched by the level latch circuit 252. Thus, the white 100% level is extracted and the value that represents the extracted level is recorded in an auxiliary region of the tape.

Figure 19:
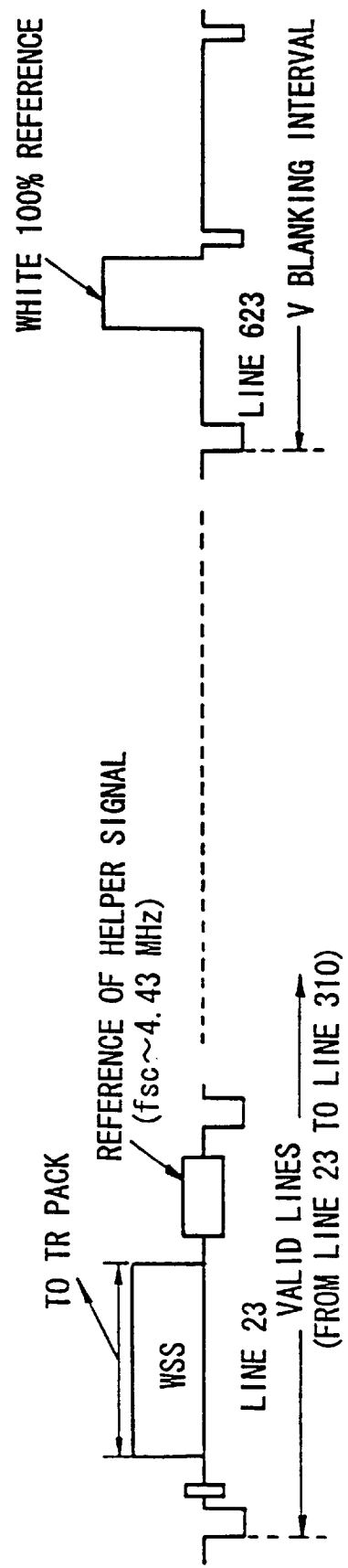
FIG. 19 is a timing diagram of lines 23 and 623 according to the fourth embodiment.
Figure 21:
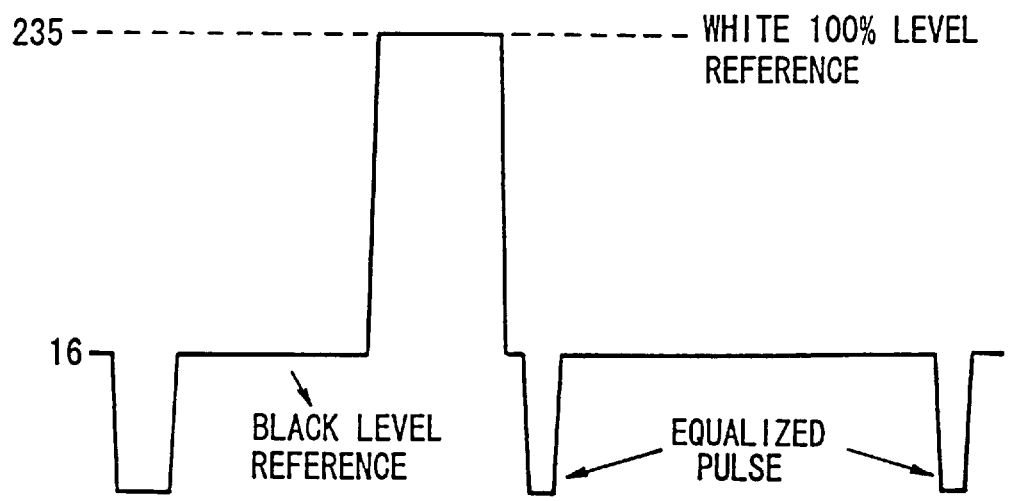
FIG. 21 is a timing diagram depicting the black level reference and a white 100% level reference according to the fourth embodiment.

The level latch circuit 252 is controlled corresponding to the count value of the line counter 264. As described above, the reference signal, which represents the white 100% level as shown in FIGS. 19 and 21, is sent to the line 623 of the screen. The white 100% level is extracted from the white 100% reference signal on line 623 and is supplied to a data output terminal 224.

If the white 100% data cannot be extracted from the white 100% reference signal on line 623 due to any cause (such as a noise), a digital valve (FFh) instead of the latch data is supplied to the data output terminal 224.

The color difference signal CR is supplied to the input terminal 246a of the switch circuit 246 included in the helper killer circuit 242 through the input terminal 222.

The color difference signal CB is supplied to both the input terminal 246a of the switch circuit 246 included in the helper killer circuit 242 and the common input terminal of the switch circuit 258. The switch circuit 258 is controlled corresponding to for example a mode control signal supplied from the outside. The color difference signal CB contains the helper signal. The color difference signal CB is supplied to the DC level shift circuit 262 through the output terminal 258a of the switch circuit 258 and to the amplitude amplifying circuit 260 through the output terminal 258b.

When the input terminal 258b of the switch circuit 258 is selected, the color difference signal CB is supplied to the amplitude amplifying circuit 260. The amplitude amplifying circuit 260 amplifies the color difference signal CB with a predetermined amplification factor (for example, x2 or x½). In this embodiment, it is assumed that the color difference signal CB is amplified with an amplification factor of ½. In addition, as described above (see FIG. 16), the level of the color difference signal CB is normalized by the A/D converter 214b. The helper signal contained in the color difference signal CB is normalized to a level "108". In addition, the reference burst signal of the helper signal on the line 23 is normalized to a level "54". The amplitude amplifying circuit 260 amplifies these signals with an amplification factor of ½. Thus, the helper signal is halved to a level "54" and the reference burst signal of the helper signal is halved to "27".

By selecting the level of the helper signal, the effect of the vertical resolution compensation corresponding to the helper signal can be varied. Thus, the vertical resolution compensation suitable for the received video signal and the apparatus that records and reproduces the signal can be performed.

In this embodiment, the amplification factor is designated to 2 or ½ because the signals processed in the apparatus are digital signals. Thus, by shifting bits, the digital signals can be easily amplified by a factor of 2. Consequently, it should be noted that the amplification factor is not limited to 2 and ½.

The signal that is amplified with an amplification factor of ½ is supplied to the DC level shift circuit 262. When the output terminal 258a of the switch circuit 258 is selected, the color difference signal CB including the helper signal is directly supplied to the DC level shift circuit 262. The DC level shift circuit 262 adds a predetermined DC setup value corresponding to the amplitude level of the supplied signal to the color difference signal CB. For example, when the amplitude level of the supplied color difference signal CB is "108", a DC setup value "64" is added. When the amplitude level of the supplied color difference signal CB is "54", a DC setup value "32" is added. When the amplitude level of the supplied color difference signal CB is "216", a DC setup value "126" is added.

The color difference signal CB to which a DC setup value has been added is supplied to the input terminal 254b of the switch circuit 254. As described above, the luminance signal Y is supplied from the delay circuit 250 to the input terminal 254a of the switch circuit 254. The switch circuit 254 is controlled corresponding to the count value of the line counter 264. In the interval of the main screen portion, the input terminal 254a is selected. In the interval of an invalid screen portion, the input terminal 254b is selected.

In other words, with reference to FIG. 2, in the interval of the upper invalid screen portion on the lines 24 to 59, the output terminal 254b is selected. In the interval of the main screen portion on the lines 60 to 274, the output terminal 254a is selected. In the interval of the lower invalid screen portion on the lines 275 to 310, the output terminal 254b is selected. In the interval of the upper invalid screen portion on the lines 336 to 371, the output terminal 254b is selected. In the interval of the main screen portion on the lines 372 to 586, the output terminal 254a is selected. In the interval of the lower invalid screen portion on the lines 587 to 622, the output terminal 254b is selected.

The color difference signal CB supplied to the input terminal 254b of the switch circuit 254 contains the helper signal in the interval of an invalid screen portion. Thus, when the signal path is selected corresponding to the interval of the invalid screen portion and the main screen portion, the helper signal is inserted into the luminance signal Y in the interval of the invalid screen portion. The luminance signal Y into which the helper signal has been inserted is supplied to the input terminal 256a of the switch circuit 256 included in the mute circuit 257.

Figure 20:
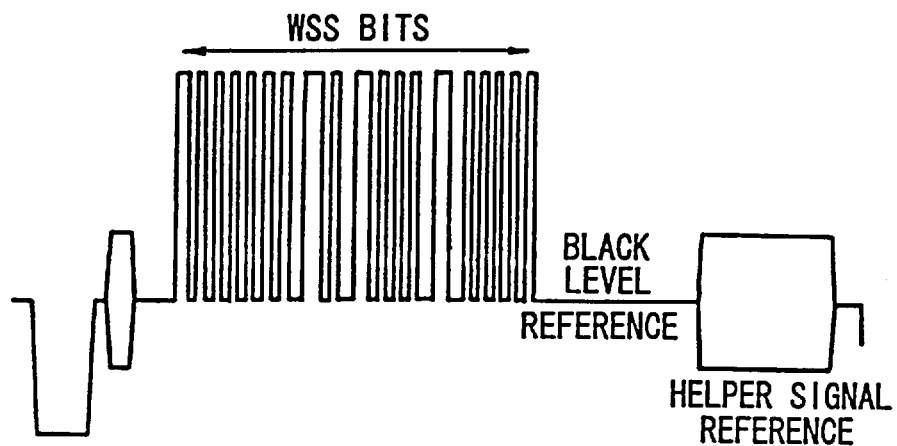
FIG. 20 is a more detailed signal diagram of line 23 according to the fourth embodiment.

The mute circuit 257 changes the level of the WSS signal on the line 23. The WSS signal, which is a binary (step shape) signal (FIG. 20), decreases the compression efficiency of the DCT compression process.

In the case that either a recording apparatus or a reproducing apparatus does not correspond to the PAL plus system, when the resultant signal is reproduced on a television receiver corresponding to the PAL plus system, an image cannot be correctly displayed. In other words, although these apparatuses can record or reproduce the WSS signal, they cannot record the helper signal. Thus, if such a signal is displayed on a television receiver corresponding to the PAL plus system, the recorded signal does not accord with the WSS signal. Thus, an image cannot be correctly displayed. To solve such a problem, the level of the WSS signal is changed.

Thus, when the count value of the line counter 264 becomes the value that represents the line 23, the input terminal 256b of the switch circuit 256 is selected. Thus, the level of the signal on the line 23 is changed to a level "64". As shown in FIG. 2, the reference signal of the helper signal is disposed at the second half of the line 23. Thus, the mute circuit 257 mutes the first half of the line 23 corresponding to the count value of the line counter 264 that counts corresponding to the horizontal synchronous timing.

In the vicinity of the border between each of the upper invalid screen portions and the main screen portion, there is a difference between the level of the helper signal in the invalid screen portion and the level of the video signal in the main screen portion as a level difference region. If a DCT block is present in the level difference region, a DCT compression distortion takes place in the vicinity of the center of the main screen portion as an image fault. To prevent such a problem, the mute circuit 257 mutes the levels on the three upper lines of each of the main screen portion (namely, the lines 60 to 62 and the lines 372 to 374) to a level "64".

On lines other than the lines 23, the lines 60 to 62, and the lines 372 to 374, the input terminal 256a to which the luminance signal Y has been supplied from the delay circuit 250, is selected. The output signal of the switch circuit 256 is the output signal of the mute circuit 257. Thus, the output signal of the mute circuit 257 is supplied to the input terminal 244a of the switch circuit 244 included in the helper killer circuit 242.

The digital value supplied to the input terminal 256b of the switch circuit 256 corresponds to the DC setup value of the DC level shift circuit 262. In other words, when the DC setup value is "64", a digital value "64" is supplied to the input terminal 256b. When the DC setup value is "32", a digital value "32" is supplied to the input terminal 256b. When the DC setup value is "128", a digital value "128" is supplied to the input terminal 256b.

In such a manner, the luminance signal Y of which the WSS signal on the line 23 has been changed is supplied to the input terminal 244a of the switch circuit 244 included in the helper killer circuit 242.

The luminance signal Y and the color difference signals CB and CR, into which the helper signal has been inserted, are supplied to the input terminals 244a, 246a, and 248a of the switch circuits 244, 246, and 248 (included in the helper killer circuit 242), respectively. A digital value "16" is supplied to the input terminal 244b of the switch circuit 244 and a digital value "128" is supplied to each of the input terminals 246b and 248b of the switch circuits 246 and 248.

As described above, the helper killer function of the helper killer circuit 242 is turned on/off corresponding to the helper killer signal supplied from the helper killer control circuit 206 through the helper killer input terminal 223. In addition, the switch circuits 244, 246, and 248 are controlled corresponding to the helper killer signal and the count value of the line counter 264.

When the helper killer function is turned on, the switch circuits 244, 246, and 248 are controlled corresponding to the count value of the line counter 264. In the interval of the invalid screen portion, the input terminals 244b, 246b, and 248b are selected and, in the interval of the main screen portion, the input terminals 244a, 246a, and 248a of the switches 244, 246, and 248 are selected.

In other words, with reference to FIG. 2, in the interval of the upper invalid screen portion on lines 24 to 59, the input terminals 244b, 246b, and 248b are selected. In the interval of the main screen portion on lines 60 to 274, the input terminals 244a, 246a, and 248a are selected. In the interval of the lower invalid screen portion on lines 275 to 310, the input terminals 244b, 246b, and 248b are selected. In the interval of the upper invalid screen portion on lines 336 to 371, the input terminals 244b, 246b, and 248b are selected. In the interval of the main screen portion on lines 372 to 586, the input terminals 244a, 246a, and 248a are selected. In the interval of the lower invalid screen portion on lines 587 to 622, the input terminals 244b, 246b, and 248b are selected.

Thus, in the interval of the invalid screen portion, the level of the luminance signal Y into which the helper signal has been inserted is changed to the level of the digital value "16" supplied to the input terminal 244b of the switch circuit 244. The resultant signal is output from the output terminal of the switch circuit 244. The level of the color difference signal CB is changed to the level of the digital value "128" supplied to the input terminal 246b of the switch circuit 246. The level of the color difference signal CR is changed to the level of the digital value "128" supplied to the input terminal 248b of the switch circuit 248. The resultant color difference signals CB and CR are output from the output terminals of the switch circuits 246 and 248, respectively.

In the main screen portion, the luminance signal Y and the color difference signals CB and CR into which the helper signal has been inserted are input to the input terminals 244a, 246a, and 248a of the switch circuits 244, 246, and 248 and then output from the output terminals thereof, respectively.

When the helper killer function is turned off, the switch circuits 244, 246, and 248 are not controlled corresponding to the count value of the line counter 264. Thus, the input terminals 244a, 246a, and 248a of the switch circuits 244, 246, and 248 are always selected. Thus, the luminance signal Y and the color difference signals CB and CR, into which the helper signal has been inserted, are directly output from their output terminals.

The switch circuits 246 and 248 for the color difference signals CB and CR may be controlled by another function rather than the helper function. For example, to prevent the three upper lines of each of the main screen portion from being distorted due to DCT code, in this interval, (namely, on the lines 60 to 62 and the lines 372 to 374), the input terminals 246b and 248b of the switch circuits 246 and 248 can be selected, respectively. Thus, the levels of the color difference signals CB and CR are muted to the level "128".

The output signal of the switch circuit 244 included in the helper killer circuit 242 is supplied as a recorded luminance signal Y to the output terminal 230. The output signal of the switch circuit 246 is supplied as a recorded color difference signal CB to the output terminal 228. The output signal of the switch circuit 248 is supplied as a recorded color difference signal CR to the output terminal 226.

The recorded luminance signal Y that is output from the output terminal 230 of the PAL plus record side processing circuit 208 is supplied to the input terminal 232 of the digital VCR 106. The recorded color difference signal CB and the recorded color difference signal CR that are output from the output terminals 228 and 226 are supplied to the line sequencing circuit 216. The line sequencing circuit 216 outputs a color difference signal CB/CR. The color difference signal CB/CR is supplied to the input terminal 234 of the digital VCR 106.

Digital Recording/Reproducing

A digital recording/reproducing device, such as a digital VCR, converts a composite digital color video signal into a luminance signal Y and color difference signals CR and CB. The converted signals are compressed using a DCT method and a highly efficient compressing method using a highly efficient code. Then, the digital VCR records the compressed data on a magnetic tape through a rotating head. A brief explanation of two schemes for digitally recording the PAL plus and EDTV-2 digitized signals onto a video tape will now be described.

ii. Digital VCR Recording

Figure 22:
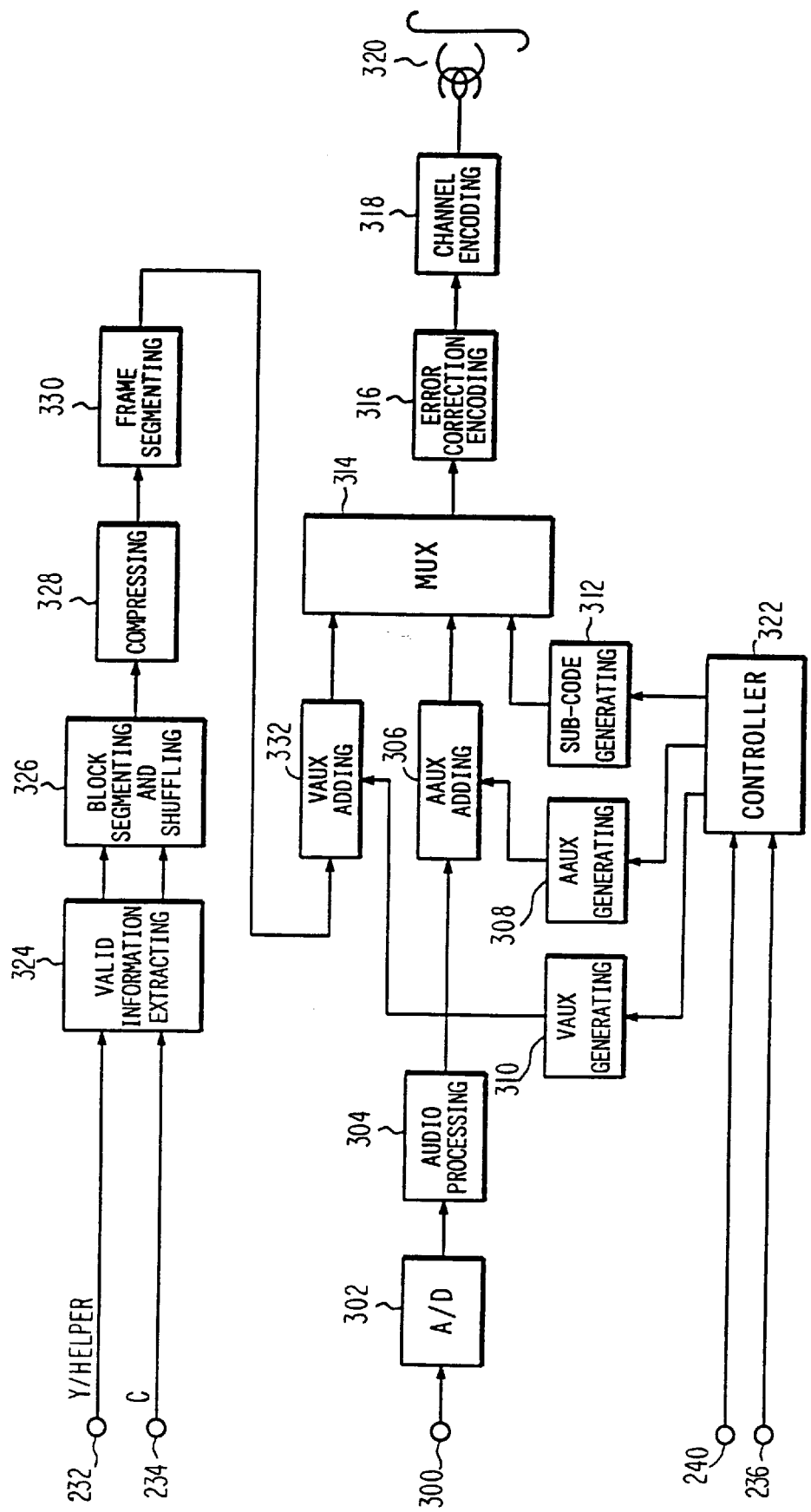
FIG. 22 is a block diagram of a digital video recording processor according to the fourth embodiment.

FIG. 22 is a block diagram showing the construction of a digital VCR 106 that records a signal that is output from the PAL plus record side processing circuit 208 according to the fourth embodiment. A recorded luminance signal Y and a recorded color difference signal CB/CR that are component color video signals are supplied from input terminals 232 and 234, respectively. A helper signal is inserted into the recorded luminance signal Y in the interval of the invalid screen portion.

The recorded luminance signal Y and the recorded color difference signal CB/CR are supplied to a valid information extracting circuit 324, which removes data in the interval of the invalid screen portions (such as in the vertical blanking interval and the horizontal blanking interval) and extracts data in the interval of the valid screen. (Valid lines of the signal are considered to include the "invalid" portions of the letter box, i.e., lines 23 to 310 of field 1 and the lines 335 to 622 of field 2; FIG. 2).

In the PAL plus system, the WSS signal that represents the aspect ratio data, the ID signal that identifies whether or not the helper signal is present, and so forth are inserted into the line 23. In addition, the white 100% reference signal is inserted into the line 623. However, since the line 623 is not a valid line, the white 100% reference signal is removed. On the other hand, although the line 23 is a valid line, the level of the WSS signal is changed to the level of the digital value "64" by the mute circuit 29 of the PAL plus record side processing circuit 208.

The output signal of the valid information extracting circuit 324 is supplied to a block segmenting and shuffling circuit 326, which segments the extracted into (8×8) blocks and equally shuffles them so that the signal is equally compressed on the screen and data is prevented from being sequentially lost due to head clogging and tape damage.

The output signal of the block segmenting and shuffling circuit 326 is supplied to a compressing circuit 328, which compresses the video data corresponding to DCT and variable length encoding methods. The compressing circuit 328 comprises a DCT circuit, a quantizer that quantizes the DCT transformed data, an estimator that estimates the total code amount and determines an optimum quantizer, and a variable length encoding circuit that compresses data corresponding to a two-dimensional Huffman code. The compressing circuit 328, thus, converts (8×8) data of a time region into (8×8) coefficient data of a frequency region, quantizes the converted data, and then encodes the resultant data into a variable length code.

The output signal of the compressing circuit 328 is supplied to a frame segmenting circuit 330, which packs video data in a predetermined sync block corresponding to a predetermined rule. The output signal of the frame segmenting circuit 330 is supplied to a VAUX adding circuit 332, which receives VAUX data from a VAUX generating circuit 310. The VAUX generating circuit 310 generates the VAUX data corresponding to data received from the controller 322. Video data to which the VAUX data has been added by the VAUX adding circuit 332 is supplied to a multiplexer 314.

The WSS data to be written to a TR pack is supplied to the input terminal 240 from the WSS reference/encoder circuit 204 (shown in FIG. 15). The white 100% reference data to be written to the TR pack is supplied to an input terminal 236 from the output terminal 224 of the PAL plus record side processing circuit 208 (shown in FIGS. 15 and 17) and is used by the VAUX generating circuit 310 to generate the VAUX data.

In practice, the VAUX data is stored in a TR pack (header.=66h) as shown in FIG. 37A along with the ID signal. As described above, the WSS data is recorded in PC1 to PC3 of the TR pack, while the white 100% reference data is recorded in PC4 of the TR pack. When the white 100% reference data cannot be obtained due to any reason, (FFh) is recorded in PC4.

FIG. 23 is a schematic diagram showing a data pack configured as a TR pack. The WSS data of 14 bits is packed from the fifth bit of PC1 in the direction of MSB (b0, b1, b2 and so forth). When PC1 is packed with bits, the rest of the WSS data is packed in PC2 from LSB to MSB (b3, b4, . . ., and b10). Thereafter, the rest of the WSS data is packed in PC3 from LSB to MSB (b11, b12, and b13). In such a manner, the TR pack is filled with the WSS data. Since the value of the white 100% reference data is at most "235", it is written to eight bits of PC4.

In addition, an audio signal is supplied to an input terminal 300 of an A/D converter 302, which digitizes the audio signal. The resultant audio signal is supplied to an audio signal processing circuit 304, which packs the audio data in a predetermined sync block. The output signal of the audio signal processing circuit 304 is supplied to an AAUX adding circuit 306. The AAUX adding circuit 306 also receives AAUX data from an AAUX generating circuit 308 under the control of the controller 322. The AAUX adding circuit 306 adds the AAUX data to the audio data and the resultant audio data is supplied to the multiplexer circuit 314.

A sub-code generating circuit 312 generates a sub-code data, which is used for a high speed search operation. The sub-code data is also supplied to the multiplexer circuit 314.

The multiplexer circuit 314 outputs one of the video data, the audio data, and the sub-code data to an error correction encoding circuit 316. The error correction encoding circuit 316 adds an error correction code to the record data and outputs a corrected signal to a channel encoding circuit 318. The channel encoding circuit 318 performs the "24 to 25" conversion for the record data and encodes the recorded signal corresponding to the partial response class 4 suitable for digital recording. The output signal of the channel encoder 318 is supplied to a head 320 through a recording amplifier (not shown). Thus, the record data is recorded on the recording tape in the above-described format.

iii. Digital Signals Recorded on the Magnetic Tape

FIGS. 24 to 27 are schematic diagrams showing levels of signals recorded on a magnetic tape according to the fourth embodiment. FIGS. 24A–E are schematic diagrams showing the case where the DC setup value of the DC level shift circuit 262 of the PAL plus record side processing circuit 208 is "64". In the signal level on the line 23 shown in FIG. 24A, since the helper signal is inserted into the recorded luminance signal Y, the reference signal of the helper signal is disposed on the line 23. Thus, the value of the reference signal is smaller than the DC setup value "64" by "54".

Figure 24A:
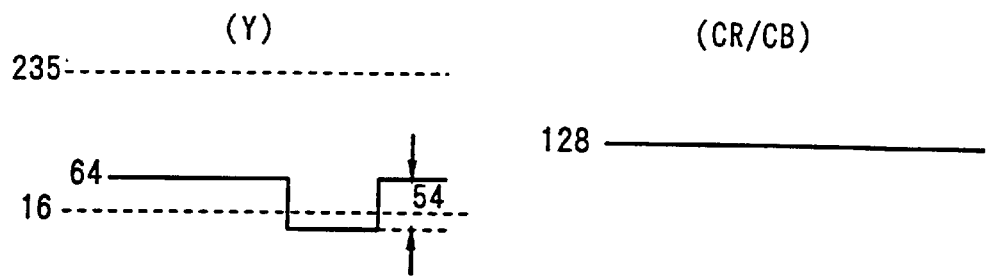
FIGS. 24A–E show digital levels of signals stored on the recording medium.
Figure 24B:
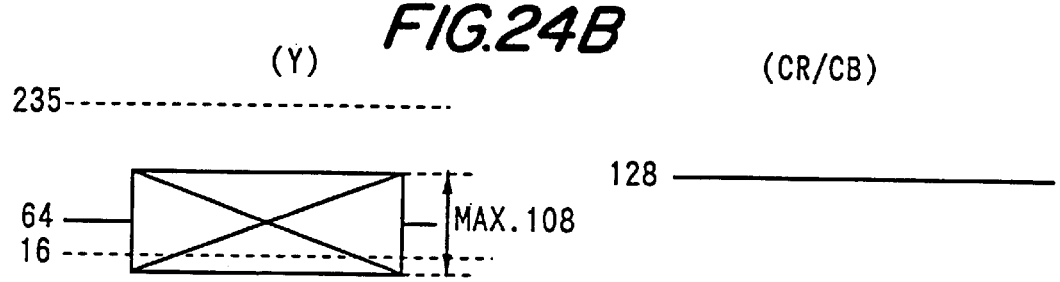

FIG. 24B is a schematic diagram showing a signal level in the interval of the invalid screen portions (namely, on the lines 24 to 59, the lines 275 to 310, the lines 336 to 371, and the lines 587 to 622). In this embodiment, the helper killer function is turned off and the value of the helper signal inserted into the interval of the invalid screen portions is at most "108" with a center value of the DC setup value "64". The level of the maximum value is normalized by the A/D converter 214a.

In the interval of the invalid screen portions, signals are not inserted into the recorded color difference signal CB/CR.

Figure 24C:
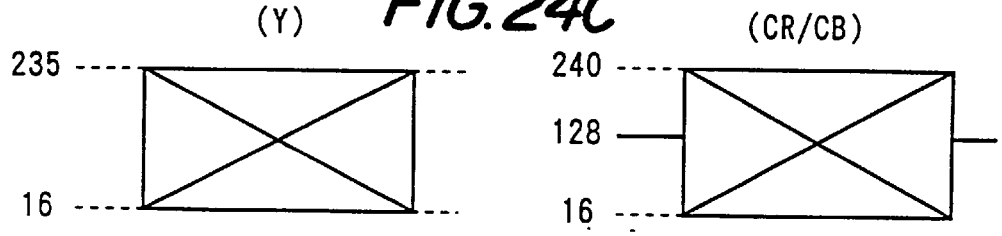

FIG. 24C is a schematic diagram showing a signal level in the interval of the main screen portions (namely, on the lines 60 to 274 and the lines 372 to 586). In this interval, the signal levels of the resultant signals are the same as those corresponding to the conventional PAL plus system. The maximum value of the recorded luminance signal Y is the white 100% reference level (namely, "235") and the minimum value thereof is the pedestal level (namely, "16"). Likewise, the level of the recorded color difference signal CB/CR has a deviation of "112" with a center value of "128" (thus, the minimum value thereof is "16", whereas the maximum value thereof is "240").

Figure 24D:
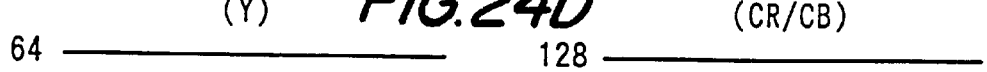

FIG. 24D is a schematic diagram showing the level of the signal on the three upper lines of each of the main screen portions (namely, on the lines 60 to 62 and the lines 372 to 374). In this interval, to prevent a compression distortion in the DCT compression method, the recorded luminance signal Y is muted to a level "64" that is the DC setup value, whereas the recorded color difference signal CB/CR is muted to a level "128" (namely, an achromatic color level).

Figure 4:
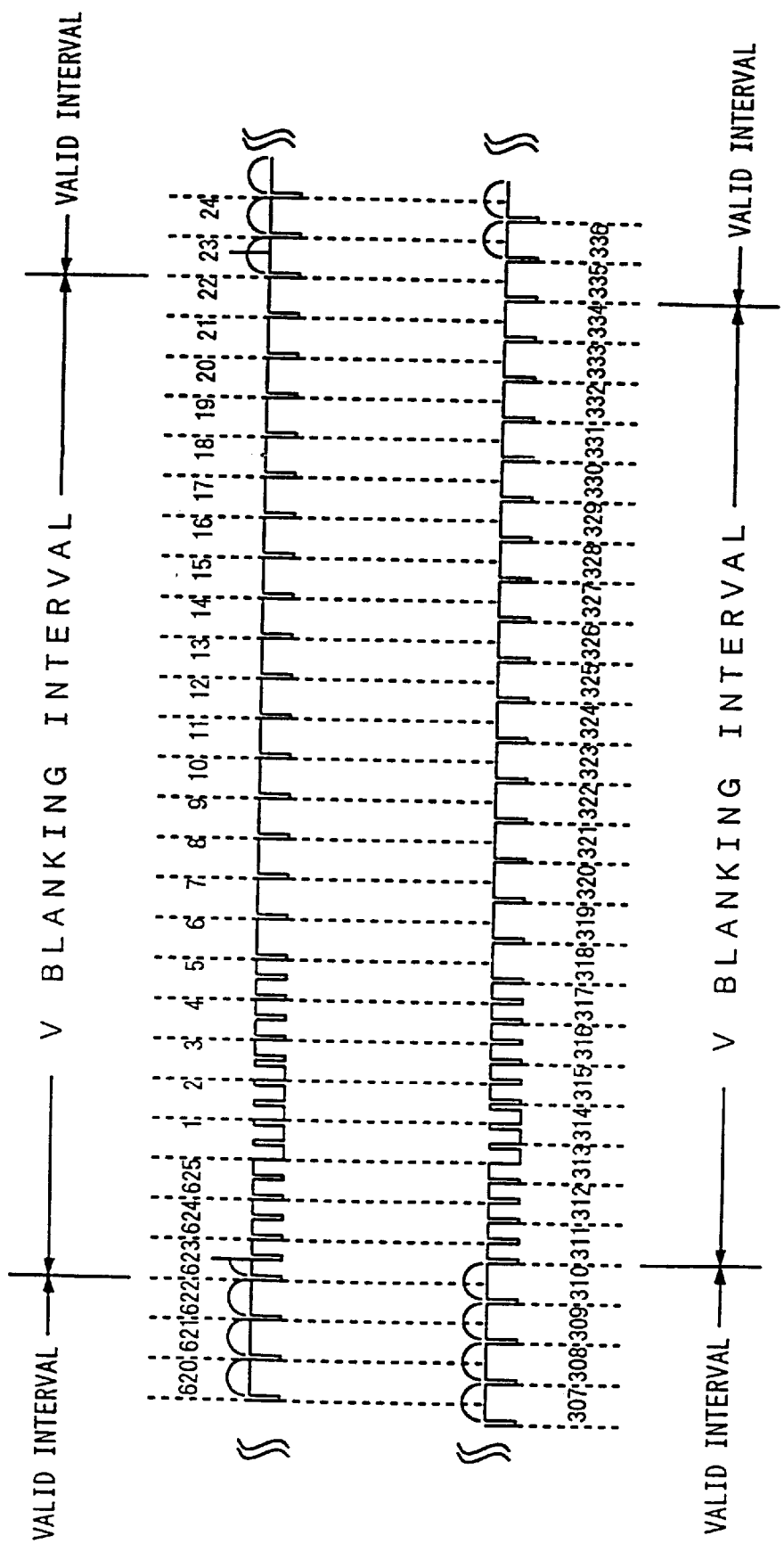
FIG. 4 is a timing diagram for all lines in FIG. 2.
Figure 5:
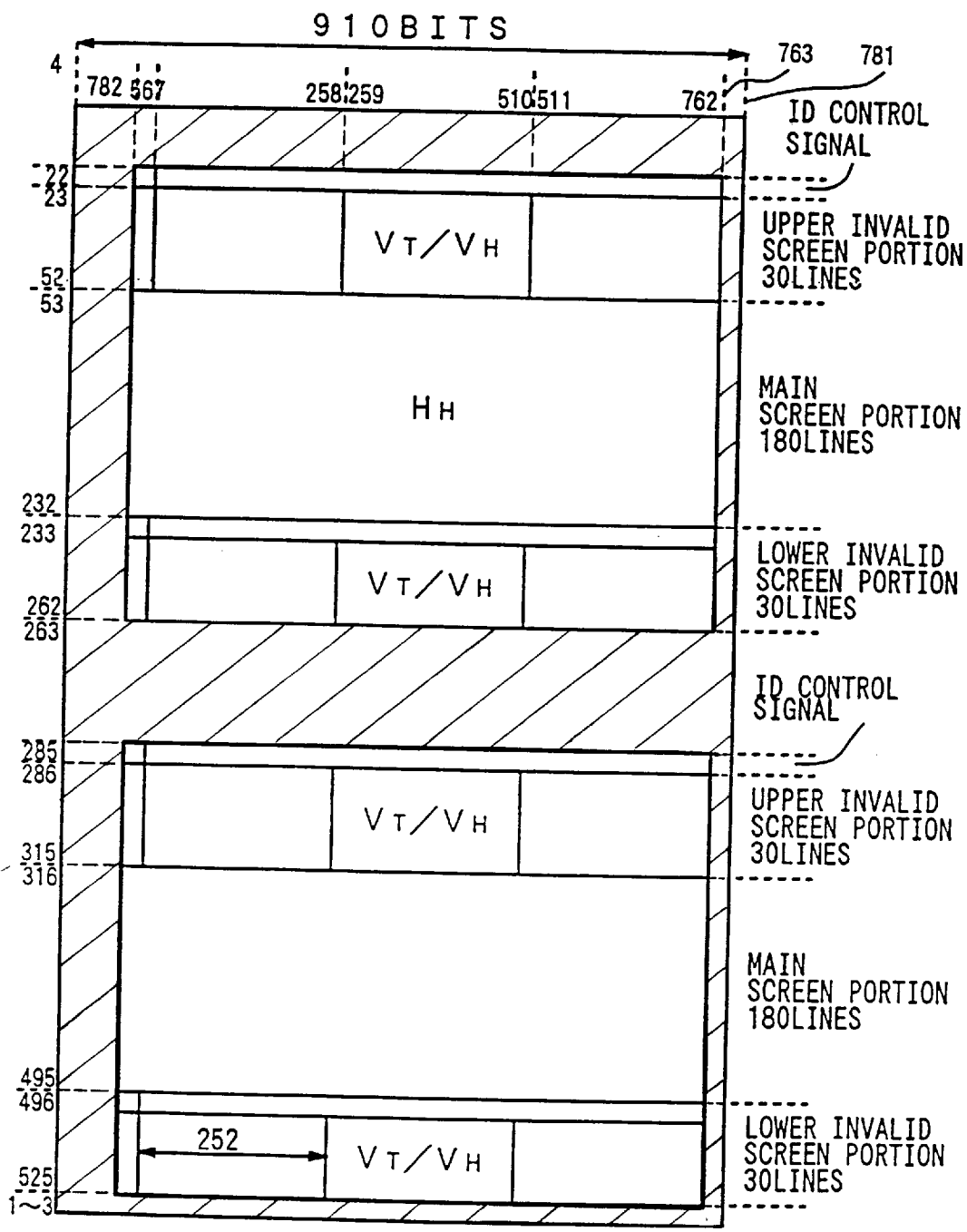
FIG. 5. shows the letter box video screen as applied to an EDTV-2 system.
Figure 7:
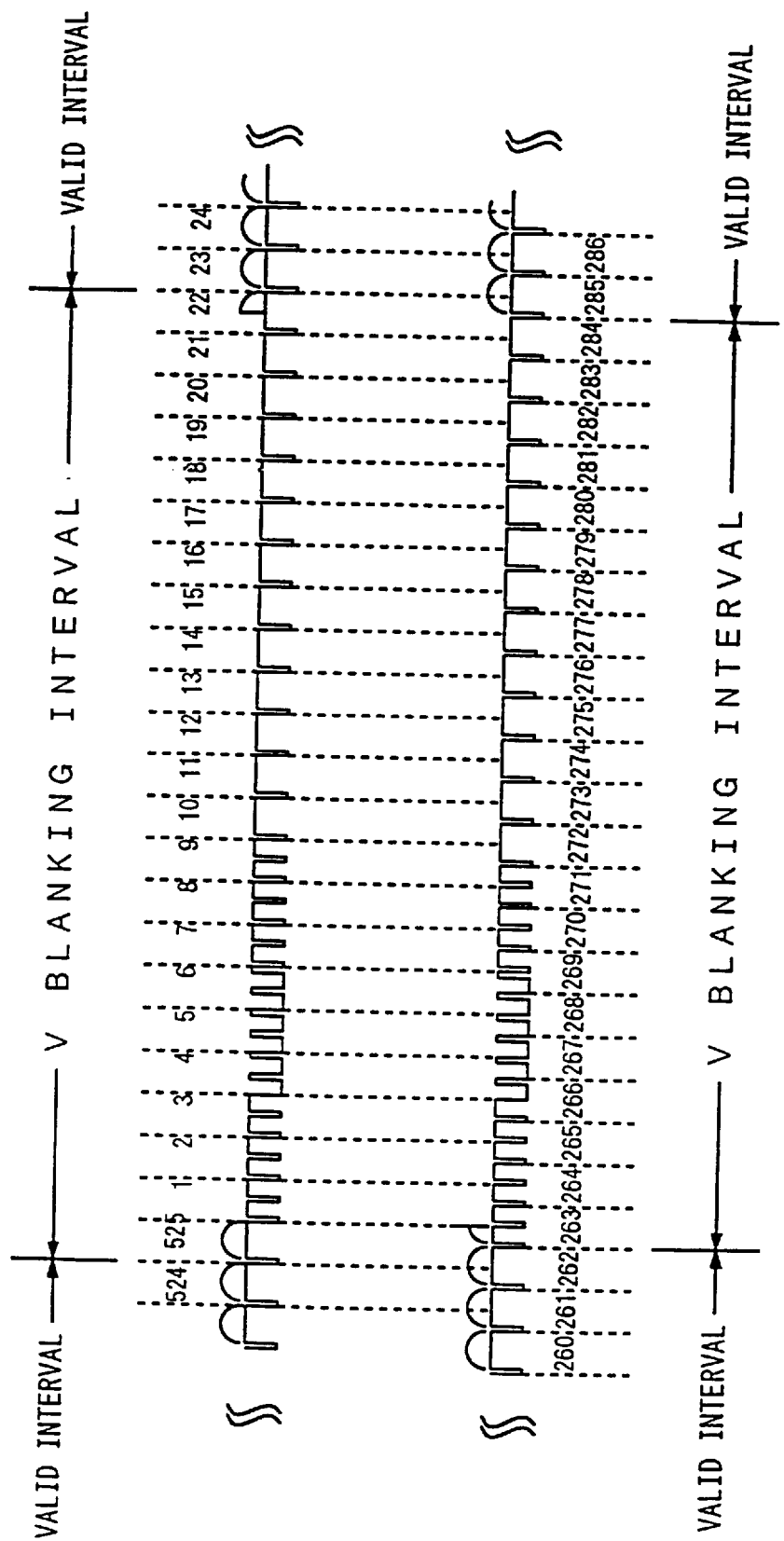
FIG. 7 is a timing diagram for all lines in FIG. 5.
Figure 8A:
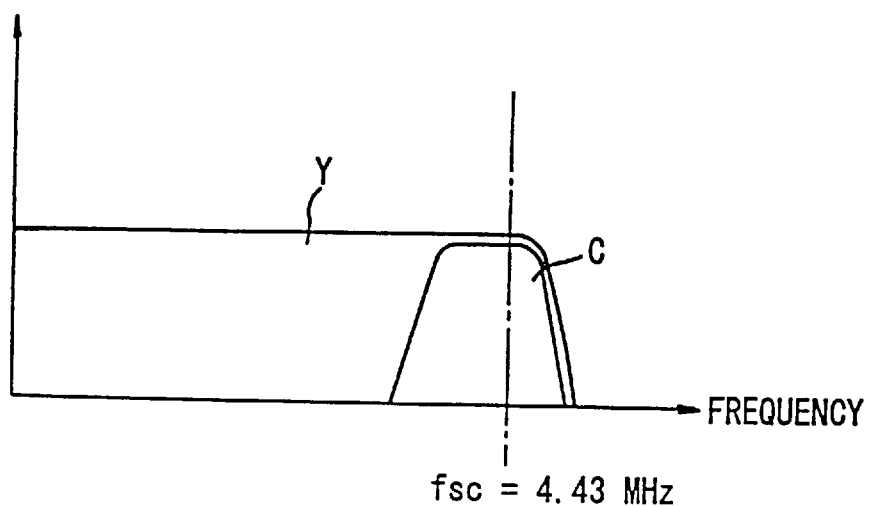
FIGS. 8A, B are frequency domain diagrams for video components in the PAL plus and EDTV-2 systems.
Figure 8B:
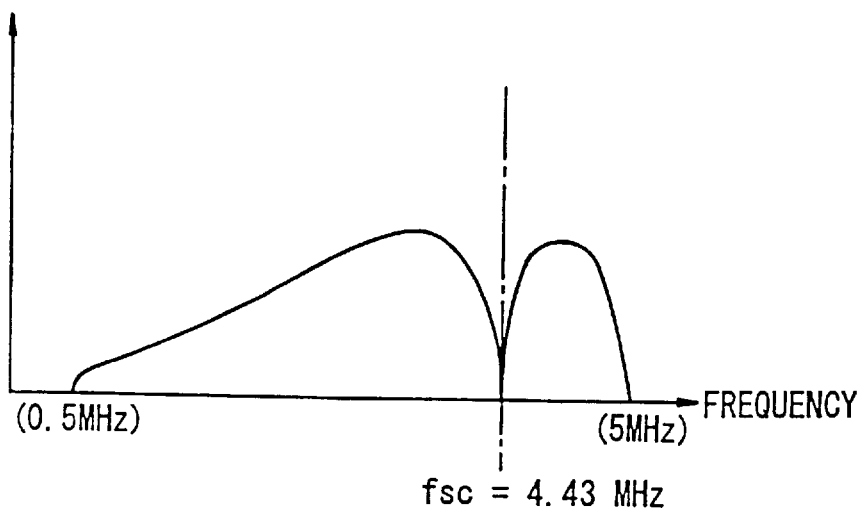
Figure 24E:
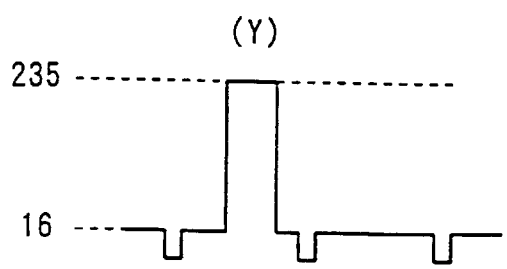

FIG. 24E is a schematic diagram showing a reference signal in the white 100% level on the line 623. This signal is not recorded on the tape because it is on line 623, which is during the vertical blanking interval (FIG. 4).

Figure 25A:
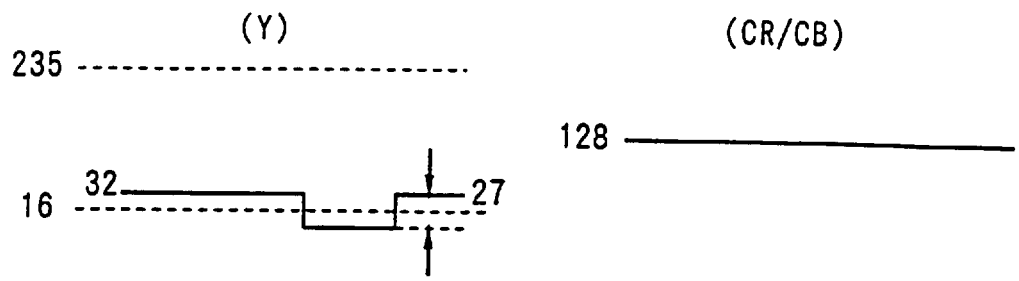
FIGS. 25A–E show digital levels of signals stored on the recording medium.

FIG. 25A is schematic diagram showing the case where the DC setup value is "32". Thus, the level of the reference signal of the helper signal is lower than the DC setup value "32" by "27".

Figure 25B:
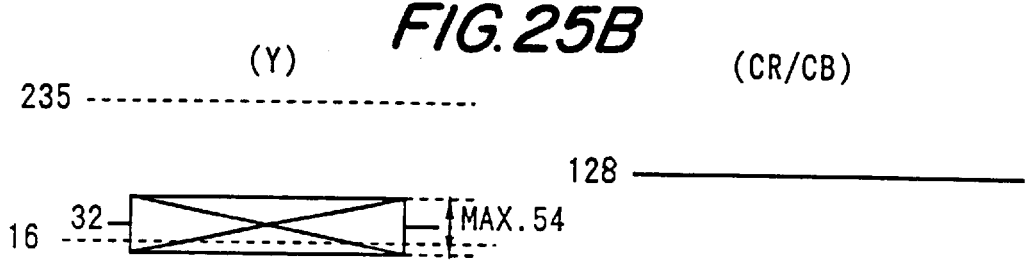

FIG. 25B is a schematic diagram showing a signal level in the interval of the invalid screen portions. The level of the helper signal inserted into the interval of the invalid screen portions is at most "54" with a center of the DC setup value at "32" that is normalized by the A/D converter 214a. In the interval of the invalid screen portions, no signal is inserted into the recorded color difference signal CB/CR.

Figure 25C:
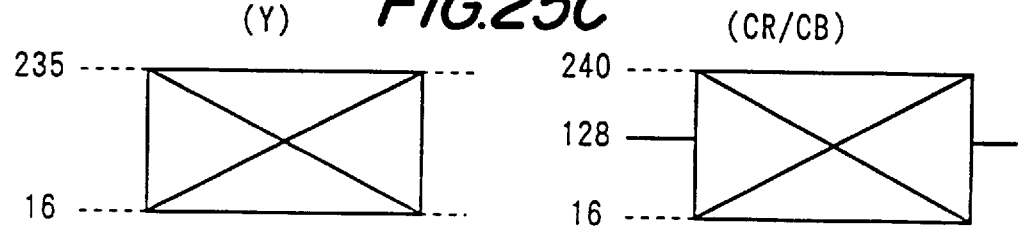

FIG. 25C is a schematic diagram showing a signal level in the interval of the main screen portions. In this interval, the DC setup value of each of the recorded luminance signals Y and the color difference signals CB and CR is the same as "64" as shown in FIG. 24C.

Figure 25D:

FIG. 25D is a schematic diagram showing the level of the signal on the three upper lines of each of the main screen portions. In this interval, so as to prevent a compression distortion in the DCT compression method, the recorded luminance signal Y is muted to a level "32" that is the DC setup value, whereas the recorded color difference signal CB/CR is muted to a level "128" (namely, an achromatic color level).

Figure 25E:
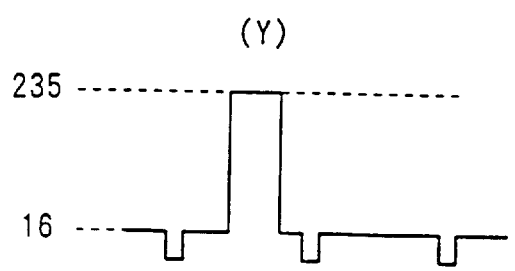

FIG. 25E is a schematic diagram showing a reference signal in the white 100% level on the line 623. This signal is not recorded on the tape, as discussed with reference to FIG. 24E.

Figure 26A:
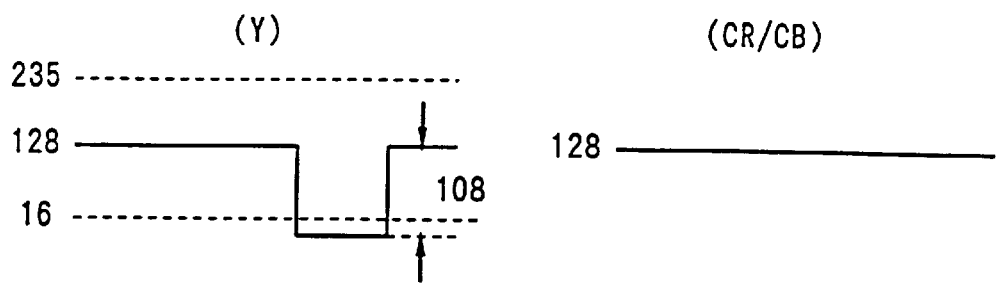
FIGS. 26A–E show digital levels of signals stored on the recording medium.

FIG. 26A is a schematic diagram showing the case where the DC setup value is "128". As the level of the signal on the line 23 shown in FIG. 26A, the level of the reference signal of the helper signal is lower than the DC setup value "128" by "108".

Figure 26B:
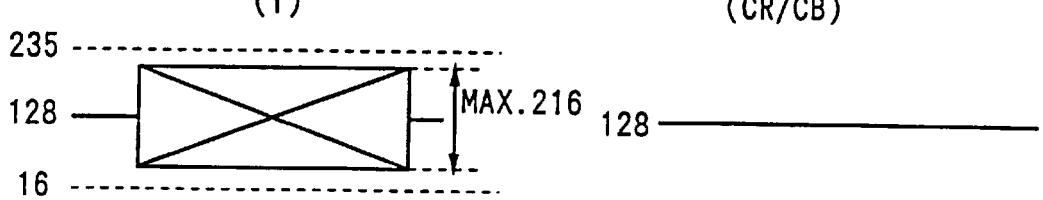

FIG. 26B is a schematic diagram showing a signal level in the interval of the invalid screen portions. The level of the helper signal inserted into the interval of the invalid screen portions is at most "216" with a center of the DC setup value set to "128" that is normalized by the A/D converter 214a. In the interval of the invalid screen portions, no signal is inserted into the recorded color difference signal CB/CR.

Figure 26C:
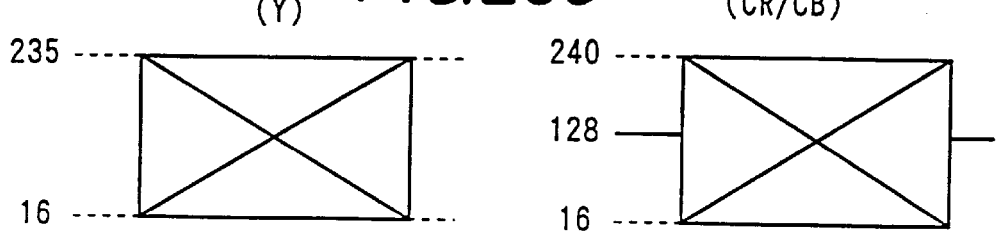

FIG. 26C is a schematic diagram showing a signal level in the interval of the main screen portions. In this interval, the DC setup value of each of the recorded luminance signals Y and the color difference signals CB and CR is the same as "64" as shown in FIG. 24C.

Figure 26D:

FIG. 26D is a schematic diagram showing the level of the signal on the three upper lines of each of the main screen portions. In this interval, so as to prevent a compression distortion in the DCT compression method, the recorded luminance signal Y is muted to a level "128" that is the DC setup value, whereas the recorded color difference signal CB/CR is muted to a level "128" (namely, an achromatic color level).

Figure 26E:
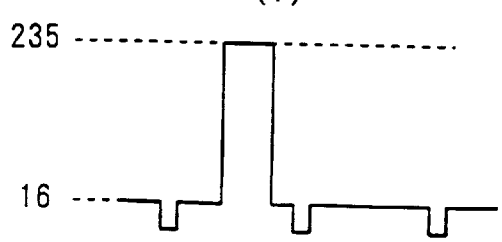

FIG. 26E is a schematic diagram showing a reference signal in the white 100% level on the line 623. This signal is not recorded on the tape, as discussed with reference to FIG. 24E.

2. EDTV-2 Embodiments

Figure 27:
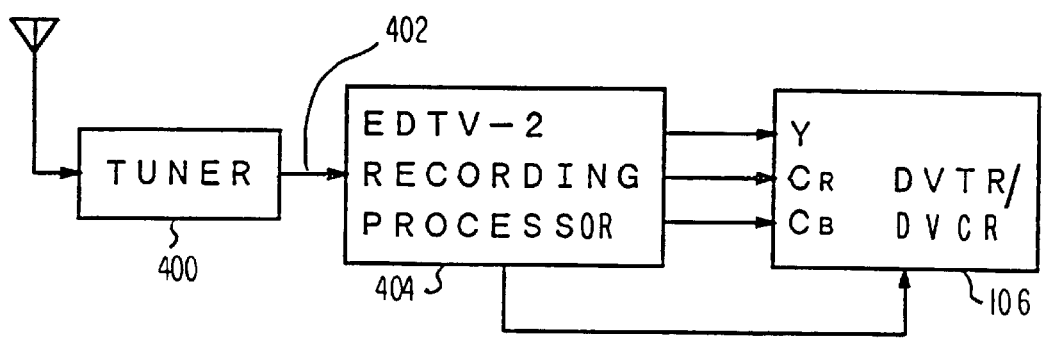
FIG. 27 is a block diagram showing the EDTV-2 record processing system according to the fifth embodiment.

FIG. 27 depicts a block diagram of the present invention employed in an EDTV-2 system. An EDTV-2 signal is received by a tuner 400 and output to an input terminal 402 of an EDTV-2 recording processor 404. The EDTV-2 recording processor outputs a processed EDTV-2 signal to the digital VCR 106. As in the previous embodiments, the vertical resolution component is stored as a luminance signal Y and the related signals are stored in a TR pack. In this manner, the vertical resolution is restored after digital recording and a high image quality is maintained.

More specifically, the EDTV-2 recording processor 404 decodes the HH signal at the main screen portion and multiplexes it with a luminance signal at the main screen portion. In addition, the EDTV-2 recording processor 404 adds offsets to the VT and VH signals that are sent to the upper and lower invalid screen portions so as to record them as luminance signals Y. Moreover, the EDTV-2 recording processor 404 decodes the ID signals sent to the lines 22 and 285 from the EDTV-2 video signal and extracts the aspect ratio data and the data that represents whether signal components of VT, VH, and HH are present from the ID signals. Since the digital VCR 106 processes the EDTV-2 video signal at a sampling frequency of 13.5 MHz, it can record the signal in a band of around 6 MHz. The EDTV-2 recording processor 404 outputs component color signals Y, CR, and CB to the digital VCR 106. The aspect ratio data, the data that represents whether or to signal components of VT, VH, and HH are present, and color phase information are separately supplied to the digital VCR 106.

a. Fifth Embodiment i. EDTV-2 Recording Processor

Figure 28:
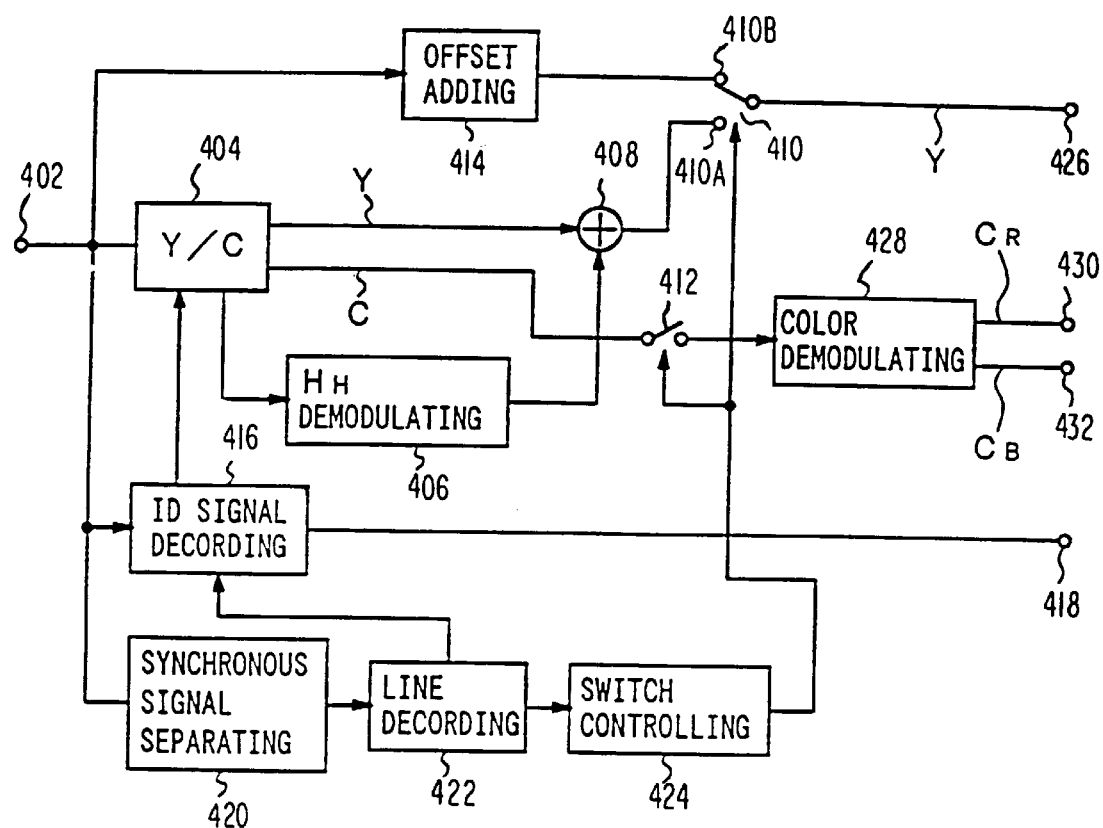
FIG. 28 is a block diagram of an EDTV-2 recording processor according to the fifth embodiment.

FIG. 28 is a block diagram showing the EDTV-2 recording processor 404 of the fifth embodiment. An EDTV-2 video signal is supplied to an input terminal 402, which is connected to a three-dimensional Y/C separating circuit 404. The three-dimensional Y/C separating circuit 404 separates a luminance signal Y from a chrominance (i.e., color) signal C. In addition, the three-dimensional Y/C separating circuit 404 extracts a multiplexed HH signal from the Fukinuki hole. The extracted signal is supplied to an HH signal demodulating circuit 406, which demodulates the HH signal and outputs a high band horizontal luminance component of a frequency band of 4.2 MHz to 6 MHz. The output signal of the HH signal demodulating circuit 406 is then supplied to an addition circuit 408.

The Y/C separating circuit 404 outputs a luminance signal of up to 4.2 MHz and a chroma signal C. The luminance signal Y is supplied to the addition circuit 408, which adds the high band horizontal luminance component (4.2 MHz to 6 MHz supplied from the HH signal demodulating circuit 406) to the luminance signal Y (of up to 4.2 MHz). The output signal of the addition circuit 408 is supplied to a terminal 410A of a switch circuit 410.

The input signal of the input terminal 402 is also supplied to an offset adding circuit 414, an ID signal decoding circuit 416, and a synchronous signal separating signal 420. The synchronous signal separating circuit 420 detects a synchronous signal from the input signal of the input terminal 402 and outputs the synchronous signal to a line decoder 422. The output signal of the line decoder 422 is supplied to the ID signal decoding circuit 416 and a switch controlling circuit 424 for controlling switches 410 and 412.

The offset adding circuit 414 adds offsets to the VT and VH signals that are in the invalid screen portions so as to process them as luminance signals. The output signal of the offset adding circuit 414 is supplied to a terminal 410B of the switch circuit 410.

The ID signal detecting circuit 416 detects aspect ratio data and data that represents whether or not signal components of VT, VH, and HH are present on lines 22 and 285. The output signal of the ID signal detecting circuit 416 is output to a data output terminal 418. The ID signal detecting circuit 416 also controls the state of the three-dimensional Y/C separating circuit 404 based on which signals are detected.

The switch controlling circuit 424 generates a switch control signal for selecting one of the main screen portion and the invalid screen portions. When the switch control signal is supplied to the switch circuits 410 and 412, the switch circuits select one of the main screen and invalid screen portions corresponding to the switch control signal.

When the main screen portion at the center of the screen is selected, the switch circuit 410 is placed in the terminal 410A position and the switch circuit 412 is turned on. On the other hand, when the upper and lower invalid screen portions are selected, the switch circuit 410 is placed in the terminal 410B position and the switch circuit 412 is turned off. Thus, the switch circuit 410 outputs the luminance signal Y, to which the horizontal high band component HH has been added to the main screen portion. In addition, the switch circuit 410 outputs the vertical resolution compensating signals VT and VH, to which offsets have been added to the invalid screen portions. The switch circuit 412 outputs the chroma signal C to the main screen portion. However, the switch circuit 412 does not output the chroma signal C during the invalid screen portions.

The output signal of the switch circuit 410 is output to an output terminal 426. The output signal of the switch circuit 412 is supplied to a color demodulating circuit 428, which demodulates the color difference signals CR and CB from the chroma signal C. The color difference signals CR and CB are output from output terminals 430 and 432, respectively. Thus, the video component signals are sent to the digital VCR.

ii. Digital VCR Recording

The digital VCR 106 digitizes the component color signals Y, CR, and CB, compresses them corresponding to DCT and variable length encoding methods, and records the resultant signals on a magnetic tape through a rotating head. When an EDTV-2 video signal is recorded, the aspect ratio data (the data that represents whether or not signal components of VT, VH, and HH are present, and so forth) are supplied to the digital VCR 106 from the EDTV-2 recording processor 404. These types of data are stored as VAUX data by the digital VCR 106. At this point, the HH signal is decoded and restored in the band of 6 MHz. Thus, these types of data are recorded in such a manner that the HH signal is absent. When the digital VCR 106 records the EDTV-2 video signal, only a valid portion is extracted. The ID signal is sent to lines 22 and 285. The line 22 is not a valid line and is not displayed, whereas the line 285 is a valid line. Thus, the signal on the line 285 is placed in the pedestal level in order that the data on line 285 be hidden. Thus, these signals are not recorded on the valid screen, thereby preventing color reproducibility and image quality from deteriorating.

Figure 29:
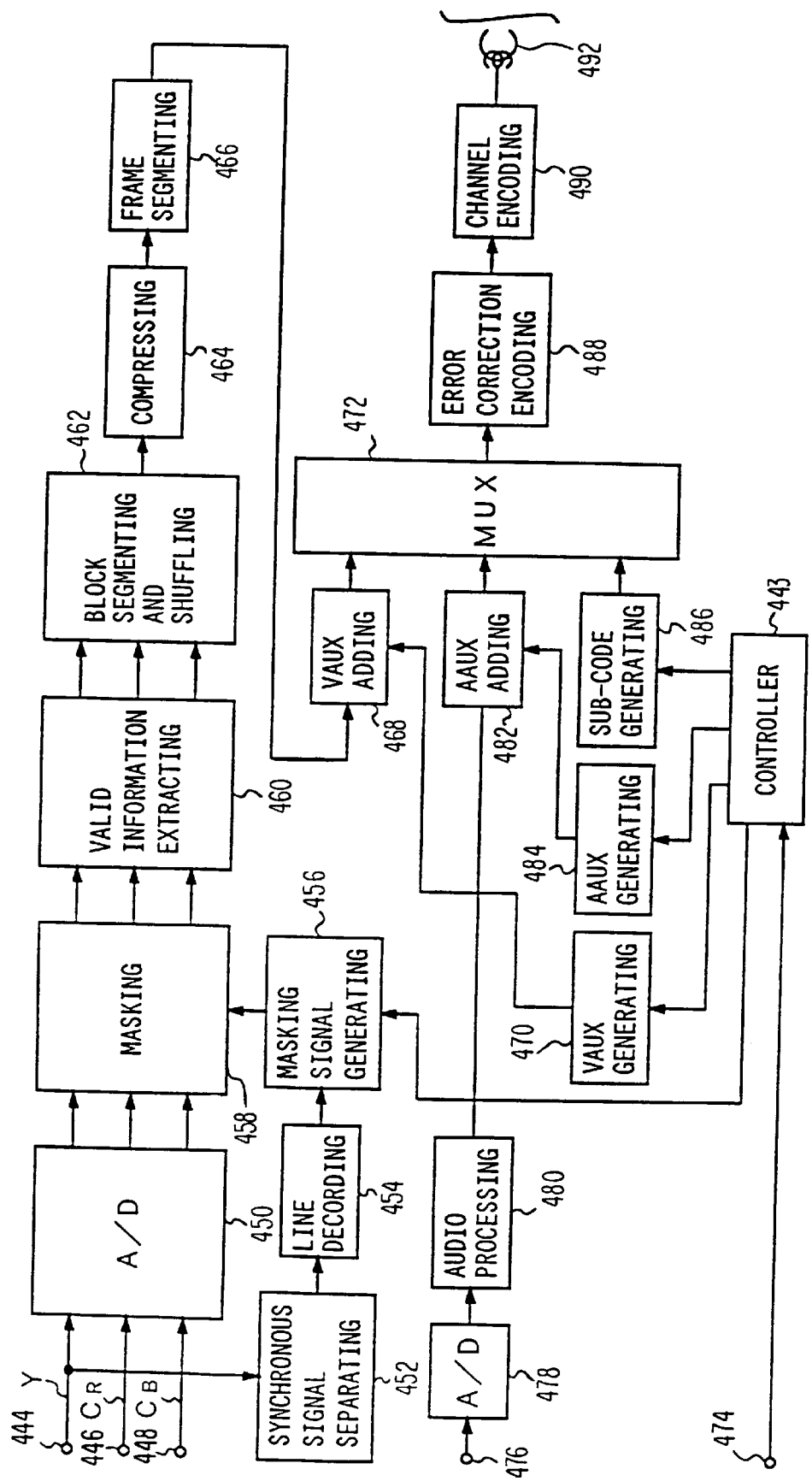
FIG. 29 is a block diagram of a digital video recording processor according to the fifth embodiment.

FIG. 29 is a block diagram showing the construction of a recording system of a digital VCR 106 according to the fifth embodiment. Component video signals Y, CR, and CB are supplied to input terminals 444, 446, and 448, respectively. The component color video signals Y, CR, and CB are supplied to an A/D converter 450, which digitizes the component signals Y, CR, and CB with a sampling clock at a frequency of 13.5 MHz. In the case of the NTSC system, the component signals Y, CR, and CB are digitized so that the information amounts of the luminance signal Y and the color difference signals CR and CB are in a 4:1:1 ratio, respectively. The output signal of the A/D converter 450 is supplied to a masking circuit 458.

The input luminance signal Y is also supplied to a synchronous signal separating circuit 452, which detects and outputs a synchronous signal to the line decoder 454. The output signal of the line decoder 454 is supplied to a masking signal generating circuit 456. The masking signal generating circuit 456 receives a signal from the controller 443 that identifies whether the input video signal is an EDTV-2 video signal. When the controller determines that an EDTV-2 video signal is input, the masking signal generating circuit 456 outputs a masking signal to the masking circuit 458 for line 285.

When the EDTV-2 video signal is input, the masking circuit 458 masks the signal on line 285 to a predetermined value (for example, value 16 that represents a pedestal level). The output signal of the masking circuit 458 is supplied to a valid information extracting circuit 460, which removes data out of the valid screen such as data in the vertical blanking interval and horizontal blanking interval and extracts only data of the valid screen. (The valid lines include the so-called "invalid portions" of the letter box screen and are lines 23 to 262 of a field 1 and lines 285 to 524 of a field 2.) In the EDTV-2 system, aspect ratio data, an ID signal that represents whether or not signal components of VT, VH, and HH are present, and a 2.04 MHz confirmation signal that identifies whether the received video signal is an EDTV-2 video signal are multiplexed on the lines 22 and 285. However, since the line 22 is not a valid line, the multiplexed signal on the line 22 is removed. On the other hand, although the line 285 is a valid line, the multiplexed signal on the line 285 is placed in the pedestal level by the masking circuit 458, so that the vertical resolution information on line 285 does not appear on the recovered image.

The output signal of the valid information extracting circuit 460 is supplied to a block segmenting and shuffling circuit 462. As in other shuffling circuits described in the previous embodiments, the block segmenting and shuffling circuit 462 segments the signal received from the valid information extracting circuit 460 into (8×8) blocks and equally shuffles them so that the signal is equally compressed. In this manner, data is prevented from being sequentially lost due to head clogging and tape damage.

The output signal of the block segmenting and shuffling circuit 462 is supplied to a compressing circuit 464, which compresses the video data corresponding to the DCT and variable length encoding methods. In other words, the compressing circuit 464 comprises a DCT circuit, a quantizer that quantizes the DCT transformed data, an estimator that estimates the total code amount and determines an optimum quantizer, and a variable length encoding circuit that compresses data corresponding to a two-dimensional Huffman code. The compressing circuit 464 converts (8×8) data of a time region into (8×8) coefficient data of a frequency region, quantizes the converted data, and then encodes the resultant data into a variable length code.

The output signal of the compressing circuit 464 is supplied to a frame segmenting circuit 466, which packs video data in a predetermined sync block corresponding to a predetermined rule. The output signal of the frame segmenting circuit 466 is supplied to a VAUX adding circuit 468.

The VAUX adding circuit 468 also receives VAUX data from a VAUX generating circuit 470, which generates the VAUX data corresponding to data received from the controller 443. Video data to which the VAUX data has been added by the VAUX adding circuit 468 is supplied to a multiplexer 472.

The EDTV-2 recording processor 404 (see FIG. 28) supplies the aspect ratio data, the ID signal data (representing whether of signal components of VT, VH, and HH are present), and the color phase information to the terminal 474.

Specifically, the VAUX data is stored as a TR pack (header=66h) as shown in FIG. 54. The ID signal data is recorded in the TR pack. The aspect ratio information is recorded as DISP (Display Select Mode) of a source control pack (header PC0=60h) of the VAUX data. The color phase information is recorded as CLF (Color Frame Identification Code) of a source pack (header PC0=60h) of the VAUX data.

In addition, an audio signal is supplied to an input terminal 476 of an A/D converter 478, which digitizes the audio signal. The resultant audio signal is supplied to an audio signal processing circuit 480, which packs the audio data in a predetermined sync block. The output signal of the audio signal processing circuit 480 is supplied to an AAUX adding circuit 482, which receives AAUX data from an AAUX generating circuit 484 under the control of the controller 443. The AAUX adding circuit 482 adds the AAUX data to the audio data and outputs the sum to the multiplexer circuit 472.

A sub-code generating circuit 486 generates a sub-code, which is used for a high speed search operation. The sub-code data is also supplied to the multiplexer circuit 472.

The multiplexer circuit 472 outputs one of the video data, the audio data, and the sub-code data to an error correction encoding circuit 488. The error correction encoding circuit 488 adds an error correction code to the record data and outputs the corrected data to a channel encoding circuit 490. The channel encoding circuit 490 performs the 24/25 conversion for the record data and encodes the recorded signal corresponding to the partial response class 4 suitable for digital recording. The output signal of the channel encoder 490 is supplied to a head 492 through a recording amplifier (not shown) for recording the digital signals on a recording medium.

Digital VCR Format

The recording processing and digital VCR have been previously discussed. A description of the format used by the digital VCR to record the digital signals on a recording tape will now be set forth. While the present invention is not limited to any particular format, two formats are presented below which are suitably used with this invention.

Digital VCR Format I.

The first scheme will be described with reference to FIGS. 30–46. On the tape of the digital VCR according to the present invention, as shown in FIG. 30A, oblique tracks are formed. Two recording conventions used are the SD system (525 lines/60 Hz and 625 lines/50 Hz) and the HD system (1125 lines/60 Hz and 1250 lines/50 Hz). In the SD system, there are 10 tracks per frame (in the case of 625 lines/50 Hz) or 12 (in the case of 525 lines/60 Hz). In the HD system, the number of tracks per frame is twice as many as that of the SD system, i.e., 20 (in the case of 1125 lines/60 Hz) or 24 (in the case of 1250 lines/50 Hz).

FIG. 30B is a schematic diagram showing tracks formed on a tape of the digital VCR. On the track entering side, a timing block for securely performing after-record operation is disposed. This timing block is referred to as ITI (Insert and Track Information). The ITI is used to precisely align an area that is after-recorded.

In any digital signal recording/reproducing apparatus, data in a particular area should be rewritten. Thus, the ITI area on the track entering side is essential. In other words, many sync blocks with a short sync length are written in the ITI area. The sync blocks are assigned sequential numbers from the track entering side. When data is after-recorded, if any of sync blocks in the ITI area is detected, the position of the present track can be precisely detected corresponding to the sync block number. Thus, the after-recorded area can be determined. Generally, the track entering side cannot be stably contacted with the head due to imperfect mechanical accuracy. To compensate such an imperfect mechanical accuracy, many sync blocks with a short sync length are written to improve a sync detecting probability.

Figure 31:
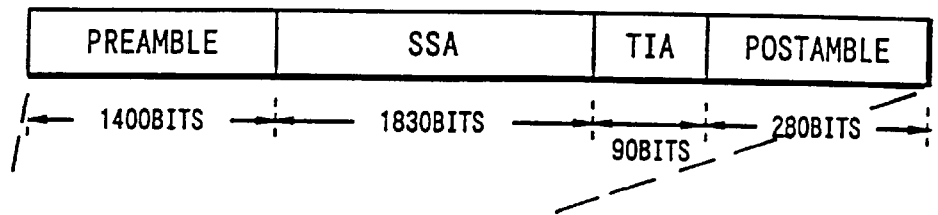
FIG. 31 depicts an ITI timing block.

As shown in FIG. 31, the ITI area is composed of a preamble, an SSA (Start Sync Block Area), a TIA (Track Information Area), and a postamble. The preamble is composed of 1400 bits and is used as a run-in for PLL that reproduces a digital signal. The SSA is used for this function. The SSA is composed of 61 blocks, each of which is composed of 30 bits. The SSA is followed by the TIA, which is composed of three blocks that are composed of 90 bits and stores information about the tracks.

Within the TIA, an APT (Application ID of a Track) (three bits), an SP/LP (one bit), a reserve bit (one bit), and a PF (Pilot Frame) bit (one bit) are stored. The APT is an application ID which determines the type of data structure of an area. The PF represents a reference frame of the servo system. Thus, the TIA is composed of six bits. The TIA is followed by the postamble, which is composed of 280 bits and used to provide a margin.

A cassette that encloses a recording medium is provided with a circuit board having a memory IC (MIC). Data written in the memory IC guides the recording/reproducing operation of the apparatus. In the MIC, along with information such as tape length, tape thickness, and tape type, other information such as TOC (Table Of Contents) information, index information, character information, reproduction control information, and timer record information can be stored. When the cassette tape with the MIC works in conjunction with the digital VCR, for example, data stored in the MIC can be used to skip to a predetermined program, designate the reproduction order of programs, designate a predetermined scene for reproducing a still image (photo), and reserve a timer record operation.

Similarly, the MIC stores an application ID, called the APM (Application ID of MIC), in the high order three bits of the address 0 of the MIC. The APM also defines a data structure which can be used to.

Figure 32:
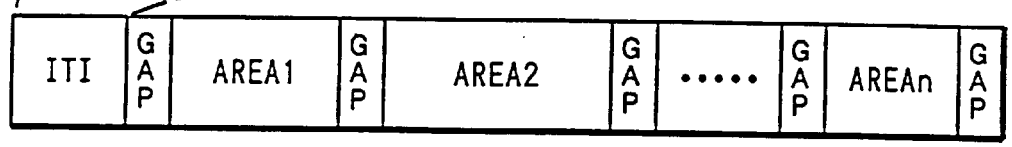
FIG. 32 depicts a track divided into the ITI area and data areas.

The tracks following the ITI area are divided into several areas as shown in FIG. 32. These divided areas uniquely define the data structure such as the track position, sync block structure, and ECC structure, which protects data against an error. Each area has an application ID for defining the data structure, i.e., application of area n defines the data structure of an area n.

Figure 33:
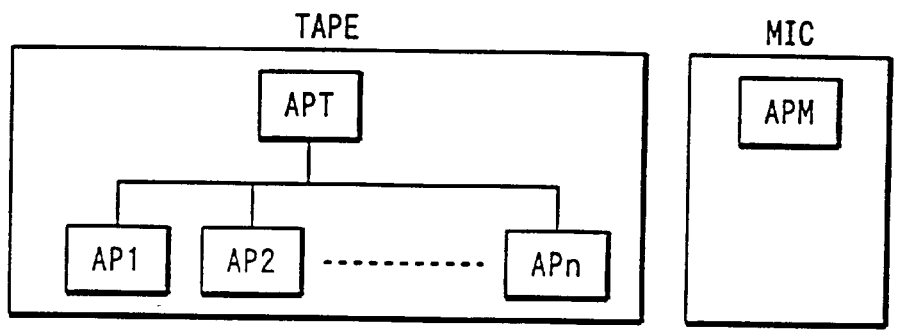
FIG. 33 depicts hierarchical application ID structures stored in a tape memory and a cassette memory MIC.

The application ID has a hierarchical structure as shown in FIG. 33. The APT, which is the basic application ID, defines the number of areas on a track. Within each area, AP1 to APn are defined. While FIG. 33 shows that the application IDs are structured in two hierarchical levels, lower hierarchical levels can be added. The APM, which is the application ID in the MIC, is disposed in only the first hierarchical level. The value of the APM is the same as that of the APT of the digital VCR.

With this scheme, the digital VCR can be operated as a completely different product such as a data streamer or a multi-track digital audio tape recorder. Even if one area is defined, the content thereof can be defined by the application ID of the area. Thus, corresponding to the values of the application ID, data can be designated to video data, video audio data, computer data, and so forth.

Figure 34A:
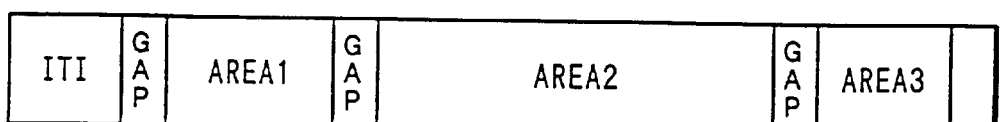
FIGS. 34A, B depict tracks arranged with different area structures.

FIG. 34A is a schematic diagram showing a track structure in the case that APT=000. As shown in FIG. 34A, areas 1, 2, and 3 are defined on a track. The areas 1, 2, and 3 define the track position, the sync block structure, the ECC structure, which protects data against an error, and the overwrite margin for providing gap and overwrite. Each of these areas has an application ID that defines the data structure thereof. The application IDs are defined as follows:

AP1 . . . Defines the data structure of the area 1.
AP2 . . . Defines the data structure of the area 2.
AP3 . . . Defines the data structure of the area 3.

The application ID of each area in the case that the application ID=000 is defined as follows.

Figure 34B:
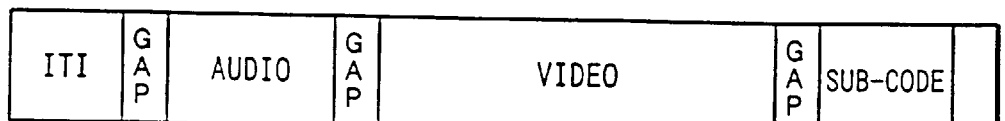

AP1=000 . . . Defines the data structure of audio and AAUX of the CVCR.
AP2=000 . . . Defines the data structure of video and VAUX of the CVCR.
AP3=000 . . . Defines the data structure of sub-code and ID of the CVCR.
CVCR: Home use digital video and audio signal recording/reproducing apparatus
AAUX: Audio auxiliary data VAUX: Video auxiliary data In other words, when the digital VCR is to be used in its normal capacity, the values of APT, AP1, AP2, and AP3 are designated to 000, as shown in FIG. 34B. In addition, the value of APM is also designated to 000.

Figures 35, 36:
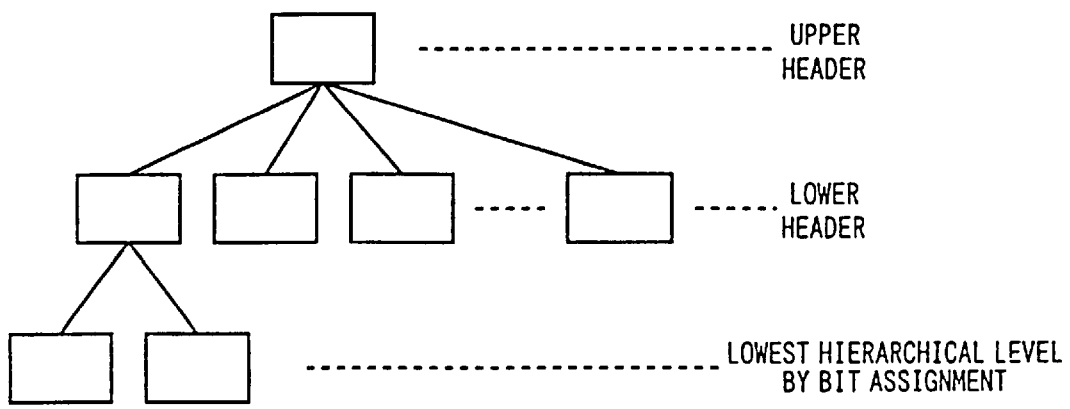
FIG. 35 depicts a data pack stored in the areas of each track.
FIG. 36 depicts an hierarchical structure for headers in the packs.

When APT=000, all areas of AAUX, VAUX, sub-code, and MIC are written in a common "pack" structure. As shown in FIG. 35, one pack is composed of five bytes (PC0 to PC4). The first one byte is a header and the remaining four bytes are data. A pack is a minimum unit of a data group. By collecting related data, one pack is composed.

The header of eight bits is divided into a high order four bits and a low order four bits to form a hierarchical structure. As shown in FIG. 36, the high order four bits are referred to as an upper header and the low order four bits as a lower header. In addition, by a bit assignment of data, the hierarchical structure can be extended to lower levels.

Using this hierarchical structure, the content of the pack can be clearly categorized and the hierarchical structure can be easily extended. In addition, 256 spaces formed from the upper header and the lower header are reserved for a pack header table along with the content of each pack. With the pack header table, each of the above-described areas is defined. Basically, each pack is composed of five bytes in a fixed length. However, when character data is written to the MIC, as an exception, a variable-length pack structure is used. This is because the limited buffer memory of the MIC should be used efficiently.

FIG. 37A is a schematic diagram showing a data structure of a TR pack in the case that the header byte PC0 is (66h). Although there are many types of data structures corresponding to headers, the pack shown in FIG. 37A strongly relates to the present invention. As shown, four bits of the data type, which is in the second half of PC1, identify various types of signals as follows:

0000=VBID 0001=WSS
0010=EDTV-2 on line 22
0011=EDTV-2 on line 285
0100=No identification
Others=Not defined The data portion of PC2 is composed of 28 bits and successively stores data from the LSB side (namely, on the horizontal synchronous signal side) of the data portion. FIG. 37B is a schematic diagram showing the case where 14 bits of the WSS signal are placed in the data portion.

The audio area and the video area are referred to as an audio sector and a video sector, respectively. FIG. 38 is a schematic diagram showing the structure of the audio sector, which is composed of a preamble, a data portion, and a postamble. The preamble is composed of 500 bits that are a run-up of 400 bits and two pre-sync blocks. The run-up is used for a run-up pattern for a PLL operation. The pre-sync is used to detect an audio sync block. The data portion is composed of 10500 bits. The postamble is composed of one post-sync block of 50 bits and a guard area of 500 bits. The post-sync block is used to acknowledge the end of the audio sector with the sync number of the ID. The guard area is used to prevent an after-recorded audio sector from entering the next video sector.

As shown in FIGS. 39A and 39B, each pre-sync block and post-sync block is composed of six bytes. The sixth byte of the pre-sync block is an SP/LP ID byte. When the value of this byte is (FFh), it represents the SP mode. When the value of this byte is (00h), it represents the LP mode. The sixth byte of the post-sync stores (FFh) as dummy data. The above-described TIA area also has the SP/LP ID byte as an SP/LP flag. The SP/LP flag is redundantly used. In other words, when the TIA area can be correctly read, the value thereof is used. If the TIA area cannot be read, the value of the SP/LP flag in the TIA area is used. The six bytes of each of the pre-sync block and the post-sync block are recorded after "24 to 25" conversion (that converts data of 24 bits into data of 25 bits). Thus, the total bit lengths of the pre-sync block and the post-sync block are as follows:

Pre-sync block: 6×2×8×25/24=100 bits
Post-sync block: 6×1×8×25/24=50 bits

Figure 40:
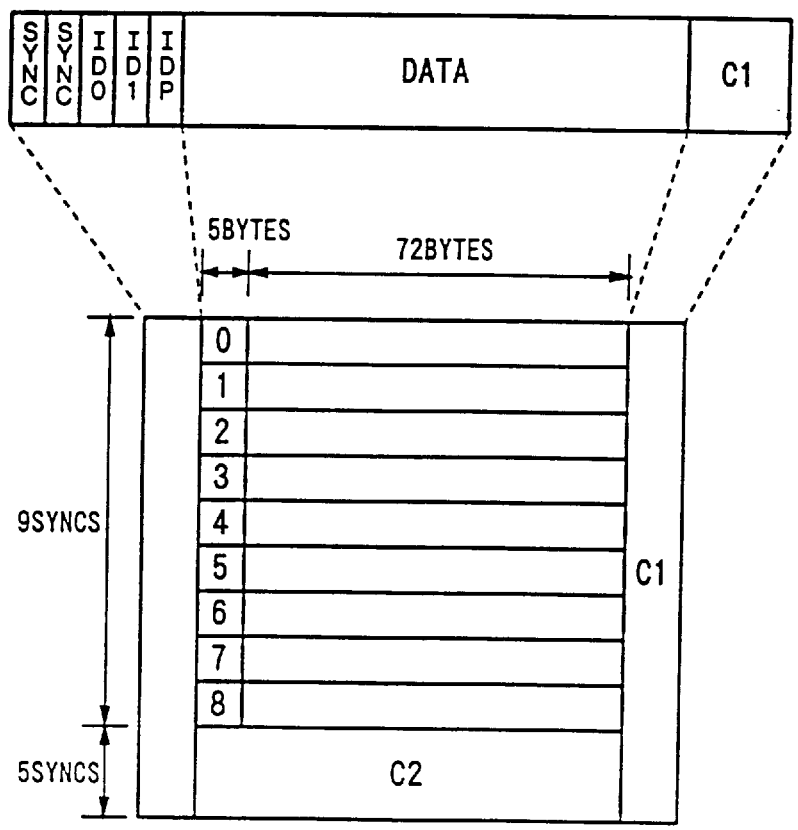
FIG. 40 depicts the sync block stored in a data pack.

As shown in FIG. 40, one sync block is composed of 90 bytes. The first five bytes of the pre-sync block has the same structure as that of the post-sync block. The data portion is composed of 77 bytes and is guarded by a horizontal parity C1 (eight bytes) and a vertical parity C2 (five sync blocks). The audio sync block is composed of 14 sync blocks per track. Since the audio sync block is recorded after the "24 to 25" conversion is performed, the total bit length is as follows:

90×14×8×25/24=10500 bits

The first five bytes of the data portion are for the AAUX data and compose one pack. There are nine packs per track. Numbers 0 to 8 of FIG. 40 represent pack numbers of each track.

Figures 41, 42:
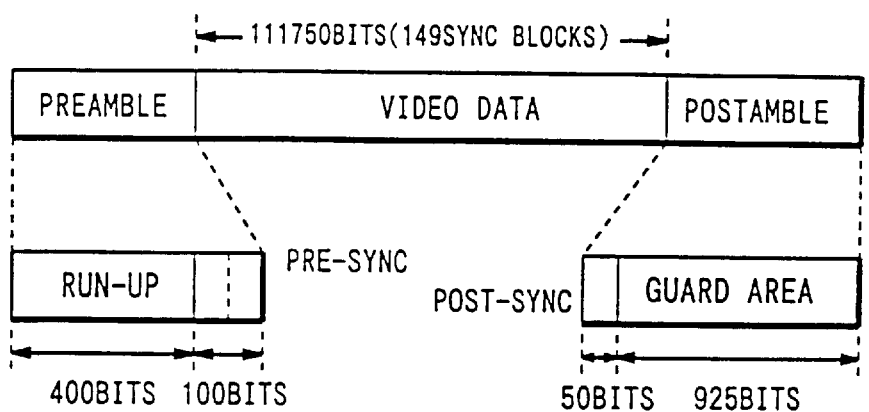
FIG. 41 is a schematic diagram showing pack numbers arranged in a track direction.
FIG. 42 depicts a sync block of video data.

FIG. 41 is a schematic diagram showing pack numbers of the AAUX data that are arranged in the track direction. In the 525 lines/60 Hz system, one video frame is composed of 10 tracks. In the 625 lines/50 Hz system, one video frame is composed of 12 tracks. The audio data and the sub-code are recorded and reproduced corresponding to the video frame. In FIG. 41, numbers 50 to 55 represent values of the pack header (FFh).

As shown in FIG. 41, as the AAUX data on 10 tracks, the same pack is written ten times. This portion is referred to as a main area, which stores essential items such as sampling frequency and the number of quantizing bits necessary for reproducing the audio signal. These essential items are written several times in order to protect the data. Thus, even if a horizontal scratch of a magnetic tape, a single channel clogging, or the like takes place, data of the main area can be reproduced.

The remaining packs are successively linked as an optional area. In FIG. 41, these packs are linked skipping those in the main area as with a, b, c, d, e, f, g, h, ... and so forth in the direction of the hashed arrows. One video frame comprises 30 packs as the optional area (in the case of the 525 lines/60 Hz system) or 36 packs (in the case of the 625 lines/50 Hz system). Since this area is literally optional, any packs can be selected from the pack header table for each digital VCR.

FIG. 42 is a schematic diagram showing the structure of a video sector. The structures of a preamble and a postamble of a video sector are the same as those of an audio sector shown in FIG. 38. As shown in FIG. 42, one sync block is composed of 90 bytes as with the audio sector. However, the number of bits of the guard area of the postamble of the video sector is slightly larger than that of the audio sector and the video sector contains 149 video sync blocks.

Figure 43:
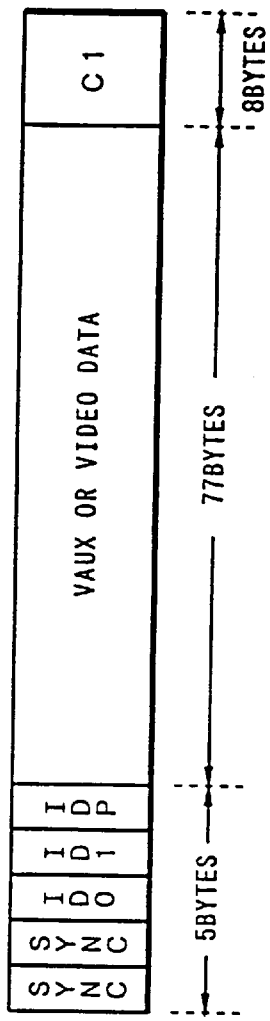
FIG. 43 depicts a sync block of VAUX or video data.
Figure 44:
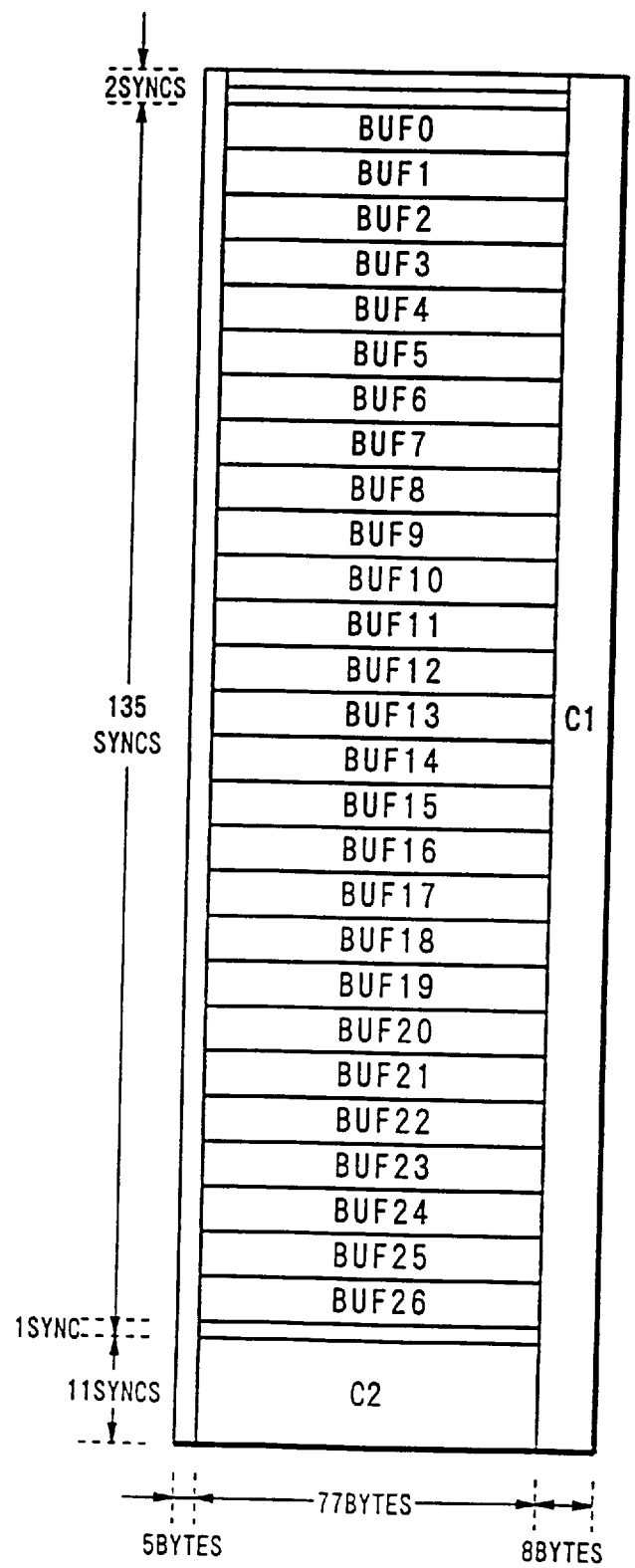
FIG. 44 is a schematic diagram showing a video sector of 149 sync blocks.

As shown in FIG. 43, the structure of the first five bytes of the sync block is the same as those of the pre-sync, the post-sync, and the audio sync. The data portion is composed of 77 bytes and is guarded by a horizontal parity C1 (eight bytes) and a vertical parity C2 (11 sync blocks) as shown in FIG. 44. The upper two sync blocks and one sync block just preceding the C2 parity are sync blocks dedicated for the VAUX data (77 bytes of data is allocated to the VAUX data). Video data of a video signal (other than the sync blocks dedicated for the VAUX data and the C2 sync blocks), which is compressed by the DCT (Discrete Cosine Transform) method, is stored. Since the video data is recorded after the "24 to 25" conversion is performed, the total bit length of the video sector is as follows:

90×149×8×25/24=111750 bits

FIG. 44 is a schematic diagram showing a video sector of which 149 sync blocks are vertically arranged. The 135 sync blocks at the center portion are used for a storage area of the video signal. BUF0 to BUF26 represent buffering units. One buffering unit is composed of five sync blocks, and one track contains 27 buffering units. One video frame formed on ten tracks has 270 buffering units. In other words, a valid area as an image is extracted from video data of one frame, is sampled and shuffled so that 270 groups (one buffering unit) are formed.

Data compression is performed by DCT, quantizing, and variable length encoding methods for each buffering unit, so as to determine whether or not the generated code amount meets the target data amount or less. A quantizing step of which the generated data amount is the target data amount or less is determined. With the determined quantizing step, data is encoded, and the resultant encoded data is packed in one buffering unit.

Figure 45:
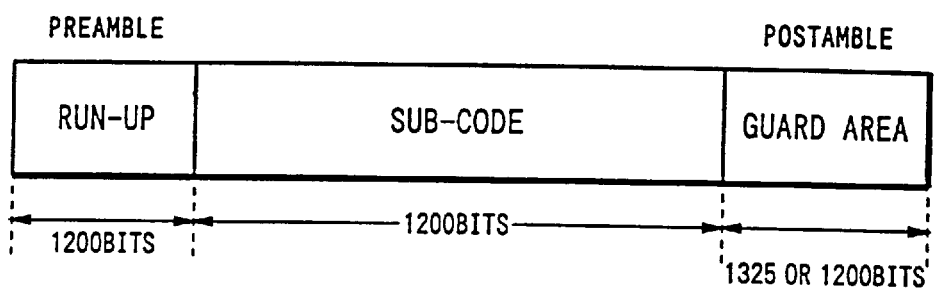
FIG. 45 is a schematic diagram showing the structure of a sub-code sector.
Figure 46:
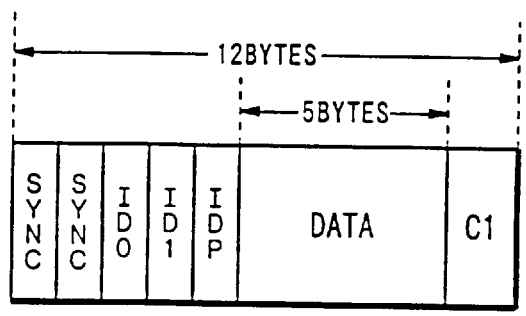
FIG. 46 is a schematic diagram of the sub-code sync block.

FIG. 45 is a schematic diagram showing the structure of a sub-code sector. Unlike the audio sector and the video sector, a preamble and a postamble of the sub-code sector do not have a pre-sync and a post-sync. The length of the sub-code sector is larger than that of other sectors because the sub-code sector is frequently rewritten for indexing or the like. Since the sub-code sector is disposed at the last portion of a track, the sum of deviations of the first half of the track affects the sub-code sector. As shown in FIG. 46, the sub-code sync block is composed of at most 12 bytes, the structure of the first five bytes of the sub-code sync block being the same as that of the pre-sync block, the audio-sync block, and the video-sync block. The sub-code sync block is followed by a data portion of five bytes. The first 10 bytes of the sub-code sync block compose a pack.

The data portion is followed by a horizontal parity C1 of 2 bytes which protects the data portion. Unlike the audio data and the video data, a so-called product code structure with C1 and C2 is not used in the sub-code. This is because the sub-code is used for a high speed search operation. Thus, it is rare to reproduce the C2 parity along with the C1 parity. In addition, since the sub-code is searched at a speed around 200 times higher than that of the other codes, the sync length is as small as 12 bytes. Since the sub-code sync block is composed of 12 sync blocks per track and recorded after the "24 to 25" conversion is performed, the total bit length of the sub-code sector is as follows:

12×12×8×25/24=1200 bits

Digital VCR Format II.

Figure 47:
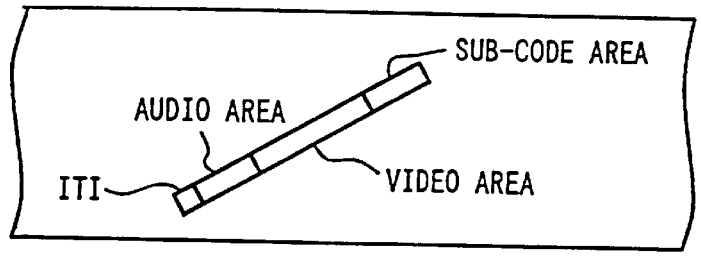
FIG. 47 depicts video tracks formed on the recording medium with audio, video and sub-code areas.

As shown in FIG. 47, video tracks are formed on the magnetic tape in a similar manner to the first scheme (FIG. 30). At the beginning of each track, an ITI area is formed. The ITI area is followed by an audio area, a video area, and a sub-code area. The ITI area is a timing block which an after-record operation is securely performed. When data after the ITI area is rewritten by the after-record operation, the ITI area is used to precisely align the data. In the audio area, the audio data is recorded. In the video area, the compressed video data is recorded. The sub-code area is used for a high speed search operation. When data corresponding to the NTSC system is recorded, one video frame is recorded on ten tracks.

Figure 48:
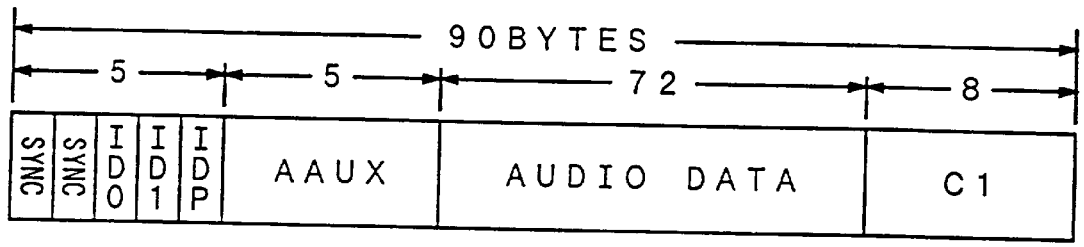
FIG. 48 is a schematic diagram showing the structure of an audio area.
Figure 49:
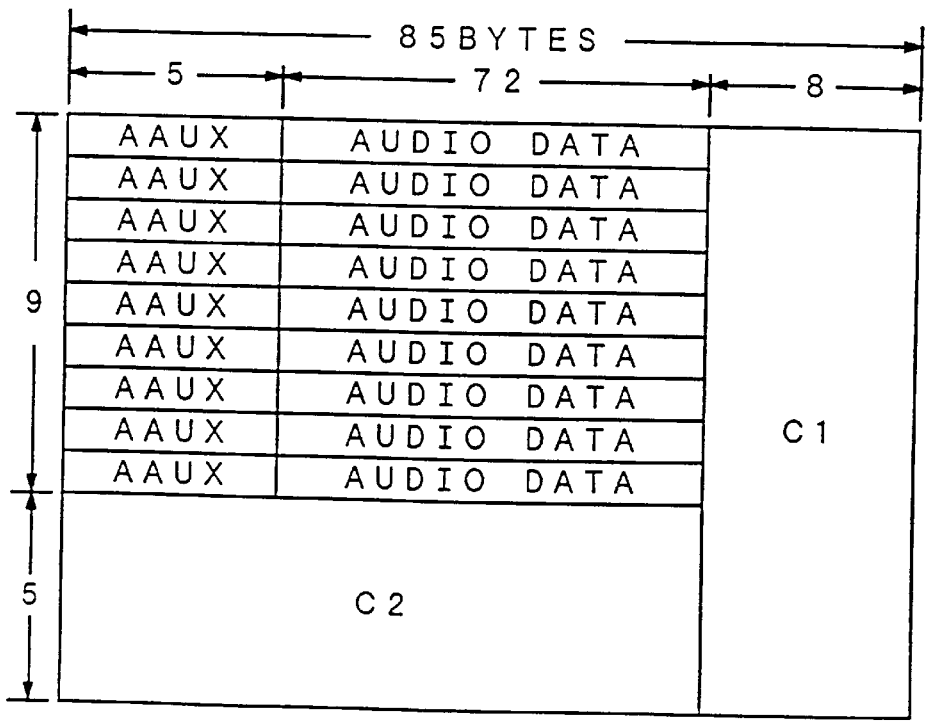
FIG. 49 depicts several audio areas stored in a pack.

FIGS. 48 and 49 are schematic diagrams showing the structure of the audio area. As shown in FIG. 50, one sync block is composed of 90 bytes. The first five bytes of the data portion is a pre-sync and a post-sync. The data portion is composed of 77 bytes (audio data of 72 bytes and AAUX data of 5 bytes). The data portion is protected by a horizontal parity C1 (8 bytes) and a vertical parity C2 (5 sync blocks). As shown in FIG. 49, one track has 14 sync blocks. The first five bytes of the data portion comprise a pack and is used for the AAUX data.

FIGS. 50 and 51 are schematic diagrams showing the structure of data in the video area. One sync block in the video area is composed of 90 bytes. The first five bytes of the data portion is a pre-sync and a post-sync. The data portion is composed of 77 bytes. As shown in FIGS. 50 and 51, the data portion is protected by a horizontal parity C1 (8 bytes) and a vertical parity C2 (11 sync blocks).

As shown in FIG. 51, 149 sync blocks of the video sector are vertically disposed. The upper two sync blocks and the two sync blocks just preceding the C2 parity are used for the VAUX data. The rest of the video sector other than the VAUX data and the C2 parity stores video data. In FIG. 29, 135 sync blocks at the center portion of the video sector are used for a storage area of video signal. In FIG. 51, BUF0 to BUF26 represent buffering units. One buffering unit is composed of five sync blocks (one track has 27 buffering units; one video frame, which is 10 tracks, has 270 buffering units). In other words, an image valid area is extracted from image data of one frame and sampled in order to form 270 groups, each group being one buffering unit.

Data compression is performed by DCT, quantizing, and variable length encoding methods for each buffering unit, to determine whether or not the generated code amount meets the target data amount or less. A quantizing step of which the generated data amount is the target data amount or less is determined. With the determined quantizing step, data is encoded. The resultant encoded data is packed in one buffering unit, which is five sync blocks.

Figure 52A:
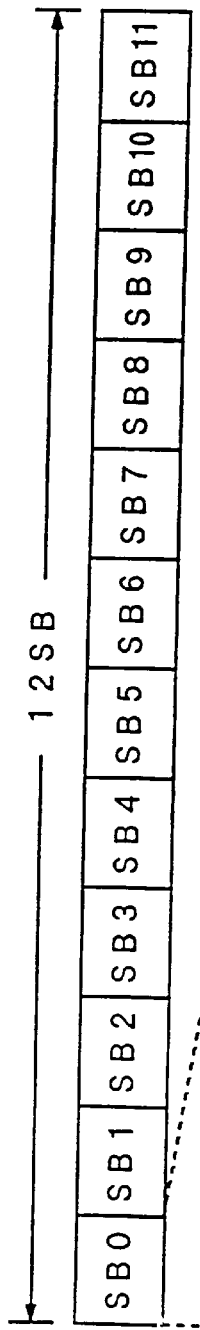
FIGS. 52A–D are schematic diagrams showing the structure of the sub-code area.
Figure 52B:
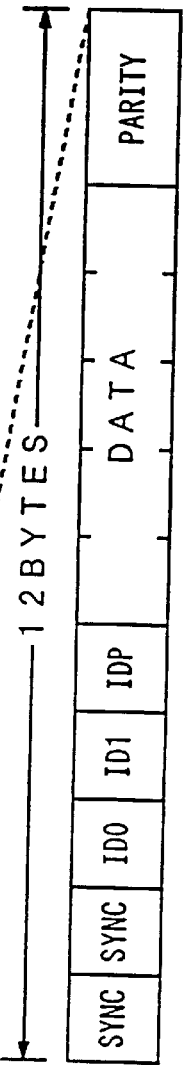

FIG. 52A is a schematic diagram showing the structure of the sub-code area, which is composed of 12 sync blocks (FIG. 52B). Since one sync block is composed of 12 bytes, one sync block in the sub-code area is smaller than one sync block in each of the video area and the audio area. This is because the high speed search operation needs to be performed quickly. At the beginning of one sync block, a pre-sync of one byte and a post-sync of one byte are disposed. Thereafter, ID data composed of ID0 and ID1 and IDP that is a parity for ID0 and ID1 are disposed. Thereafter, a main data area of five bytes is disposed. Thereafter, a parity of two bytes is disposed. The main data area stores data necessary for the high speed search operation such as a time code (record date and time).

Figure 52C:
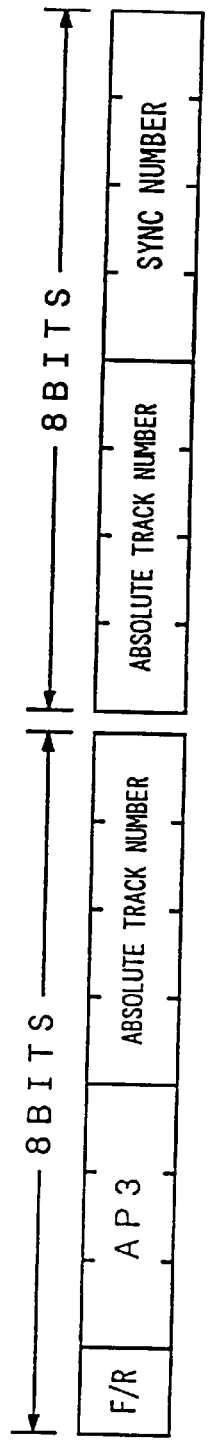
Figure 52D:
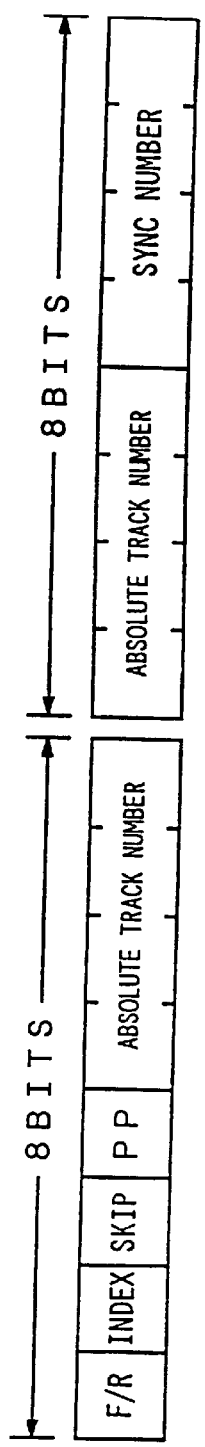

As shown in FIGS. 52C and 52D, ID0 has an F/R flag for detecting an address in the high speed search operation. In addition, as shown in FIG. 52C, the sync blocks SB0 and SB6 each have an application ID (API3) that represents the structure of data of the sub-code. Thereafter, an absolute track number is disposed in the same position as ID1. In other sync blocks, as shown in FIG. 52D, an F/R flag is disposed. Thereafter, an index ID, a skip ID, and a photo picture ID are disposed. Thereafter, an absolute track number is disposed in the same position as ID1. ID1 has an absolute track number and a sync number.

As shown in FIG. 53, the auxiliary data AAUX in the audio area, the auxiliary data VAUX in the video area, the sub-code data, and data of a cassette with a memory (not shown) are written as a common pack structure. One pack is basically composed of five types (PC0 to PC4). The first byte of the pack is a header. The rest of the pack (four bytes) is data.

The header has two hierarchical levels of an upper header of four bits and a lower header of four bits. Depending on a bit assignment of data, the header can be extended to lower hierarchical levels. Depending on the hierarchy, the content of the pack is clearly categorized. The hierarchical levels of the header can be easily extended. 256 spaces composed of the upper header and the lower header are prepared as a pack header table along with the content of the pack. Using the pack header table, each area is written. Although each pack is basically composed of five bytes, as an exception, when characters are written to a cassette with a memory, the pack has a variable length.

FIG. 54 is a schematic diagram showing the structure of a TR pack of the VAUX data that stores the ID signal. In the TR pack, the header byte PC0 is 66h. A data type is composed of four bits. The data type identifies each signal. The data type is defined as follows:

0000=VBID
0001=WSS
0010=EDTV-2 on line 22
0011=EDTV-2 on line 285
0100=No information
Others=Not defined When an EDTV-2 signal is recorded, as described above, data of the ID signals on the lines 22 and 285 is stored in the TR pack. The data portion is composed of 28 bits. The LSB of the data portion is placed on the horizontal synchronous signal side.

FIG. 55 is a schematic diagram showing the structure of a source pack of the VAUX data that stores the color phase information. In the source pack, the header byte PC0 is 60h. At PC1, a color frame ID code (CLF) is stored. In the NTSC (525/60) system, the color frame ID code (CLF) is defined as follows:

00=Color frame A 01=Color frame B
Others=Reserved
In the NTSC (625/50) system, the color frame ID code is defined as follows:
00=First and second fields
01=Third and fourth fields
10=Fifth and sixth fields
11=Seventh and eighth fields FIG. 56 is a schematic diagram showing the structure of a source control pack of the VAUX data that stores the aspect ratio information. In the source control pack, the header byte PC0 is 61h. PC2 defines a display select mode (DISP). Corresponding to the display select mode (DISP), the aspect ratio is defined as follows:

000=4:3 normal
001=4:3 letter box
010=16:9

B. REPRODUCING

The reproducing processing of the present invention will now be discussed. The discussion will begin with a description of a digital VCR and end with a description of reproducing processors for each of the embodiments.

1. Digital Signal Reproducing VCR

When a recorded video signal is reproduced, a digital signal reproducing VCR first reads the digital signal from the recording medium. Two different digital signal reproducing VCRs will now be discussed, which are applicable to both the PAL plus and the EDTV-2 systems.

a. Discussion of a First Digital Reproducing VCR

Next, with reference to FIGS. 57A, 57B and 58, the construction of a first reproduction side of a digital VCR according to the present invention will be described. In FIGS. 57A, B, output signals of heads 500*a* and 500*b* are amplified by head amplifiers 502*a* and 502*b*, respectively. One of the output signals of the head amplifiers 502*a* and 502*b* is selected by a switch 504 and output to an equalizer circuit 506. The equalizer circuit 506 compensates various losses that take place in the magnetic recording/reproducing operations.

The output signal of the equalizer circuit 506 is supplied to an A/D converter 510 and a clock extracting circuit 508. The clock extracting circuit 508 extracts a clock component and the A/D converter 510 digitizes the output signal of the equalizer circuit 506 corresponding to the extracted clock component. The A/D converter 510 outputs one-bit data to a FIFO 512 memory.

The output signal of the FIFO memory 512 is supplied to a sync pattern detecting circuit 514. The sync pattern detecting circuit 514 receives sync patterns of various areas through a switch 516. The switch 526 is controlled corresponding to the output signal of a timing circuit 524. The sync pattern detecting circuit 514 has a so-called flywheel structure, wherein, when a sync pattern is detected, it is determined whether or not the same sync pattern is received after an interval of a predetermined sync block length. When the same sync pattern is received, for example, more than three times, it is determined that the received sync pattern is correct so as to maintain the integrity of the sync block.

When a sync pattern is detected, the shift amount of the FIFO memory 512 necessary for extracting one sync block from each stage thereof is determined. Corresponding to the output signal of the sync pattern detecting circuit 514, required bits are supplied from the switch 518 to a sync block fixing latch 520. Thus, the latched sync number is extracted by a sync number extracting circuit 522 and output to the timing circuit 524. Corresponding to the received sync number, the track position of the selected head is obtained. Thus, corresponding to the sync number, the switches 516 and 526 are controlled.

When the ITI sector is detected, the switch 526 is placed in the lower position. A separating circuit 528 separates the ITI sync pattern from the signal received from the switch 526. The ITI sync pattern is supplied to an ITI decoder 530. Since the ITI area has been encoded, when it is decoded, each data of APT, SP/LP, and PF can be obtained. The obtained data is supplied to a mode processing microcomputer 532 that is connected to an external operation key pad 534. The mode processing microcomputer 532 designates the operation mode and so forth of the entire apparatus and controls the entire apparatus in association with the mechanical controlling microcomputer 548 and the signal processing microcomputer 570 (FIG. 58).

When an A/V sector or a sub-code sector is detected, the switch 526 is placed in the upper position. In this case, after sync patterns of individual sectors are extracted by a separating circuit 536, the resultant signal is supplied to a "24 to 25" deconverting circuit 538 and a derandomizing circuit 540. The resultant data signal has the original data sequence of the original PAL plus signal and is supplied to an error correcting circuit 542.

The error correcting circuit 542 detects and corrects an error of the data received from the derandomizing circuit 540 and adds an error flag to data that cannot be corrected. The corrected data is the output to a switch 544.

An "AV ID pre-sync/post-sync" circuit 546 processes the ID portions of the A/V sectors, a pre-sync, and a post-sync. The circuit 546 extracts a sync number, a track number, and an SP/LP signal stored in the pre-sync and the post-sync. These signals are supplied to the timing circuit 524. Corresponding to the output signals of the circuit 546, the timing circuit 524 generates various timings.

In addition, the circuit 546 extracts application IDs AP1 and AP2 and outputs them to the mode processing microcomputer 532. Corresponding to the extracted AP1 and AP2, the mode processing microcomputer 532 determines the format of the received video signal. When AP1 and AP2= 000, the mode processing microcomputer 532 determines that the area 2 is an image data area. In this case, the digital VCR 106 is operated in "normal" mode. Otherwise, a warning operation such as an alarming process is performed.

The mode processing microcomputer 532 compares the received SP/LP data with that obtained from the ITI sector. In a TIA area of the ITI area, the SP/LP information is written three times in each sync so that it is correctly detected corresponding to detecting scheme, such as "rule of majority" scheme. The SP/LP information is also written into four syncs of the audio sector and the video sector, and the determination of the SP/LP information is again made corresponding to the "rule of majority". Thus, the reliability of the SP/LP information is improved. When there is an inconsistency, the data stored in the ITI area is used with a higher precedence.

A switch 550 shown in FIG. 58 separates the reproduced data of the video sector into video data and VAUX data. The video data, along with the error flag, is supplied to a deframing circuit 552, which deframes the segmented frames.

The image data is supplied to a data compression code decoding portion. In other words, the image data is restored to the original data by a dequantizing circuit 544 and a decompressing circuit 556. Thereafter, the resultant data is restored in the original image temporal arrangement by a deshuffling circuit 558 and a deblocking circuit 560.

After the deshuffling circuit 558, the luminance signal (Y) and the color difference signals (CR and CB) are separately processed. These signals are restored to analog signals by D/A converters 562a, 562b, and 562c, respectively. The resultant signals are output from terminals 564a, 564b, and 564c.

A switch 572 separates the reproduced data of an audio sector into audio data and AAUX data. The audio data is deframed by a deframing circuit 574 and a deshuffling circuit 576 restores the audio data to the original time axis. At this point, if necessary, the audio data is interpolated corresponding to the error flag. The resultant signal is supplied to a D/A converter 578, which restores an analog audio signal. The resultant signal is output from an output terminal 580 corresponding to timings of the image data and the lip sync.

The VAUX data and the AAUX data separated by the switches 550 and 572 are supplied to a VAUX circuit 564 and an AAUX circuit 568, respectively. The VAUX circuit 564 and the AAUX circuit 568 perform per-processes corresponding to, for example, a "rule of majority" process for reproducing data with reference to the error flag. The ID portion and the data portion of the sub-code sector are supplied to a sub-code circuit 566. Likewise, the sub-code circuit 566 performs a pre-process corresponding to such as "rule of majority" with reference to the error flag. The output signals of the sub-code circuit 566 are supplied to a signal processing microcomputer 570. The signal processing microcomputer 570 performs a final reading operation.

With the above digital reproducing VCR, the video components, i.e., the luminance signal Y and the color difference signals R–Y and B–Y, are supplied to a PAL plus reproducing processor for reconstructing a PAL plus signal.

b. Discussion of a Second Digital Reproducing VCR

Next, a reproducing operation for a signal that has been recorded on a magnetic tape corresponding to the second digital reproducing VCR will be described. FIG. 59 is a block diagram showing an example of the construction of a reproducing digital VCR 106. In FIG. 59, a reproduced signal of a head 600 is supplied to a channel decoder 602 through a reproducing amplifier (not shown). The channel decoder 602 demodulates the reproduced signal. The output signal of the channel decoder 602 is supplied to an error correcting circuit 604. The error correcting circuit 604 performs an error correcting process for the signal supplied from the channel decoder 602. The output signal of the error correcting circuit 604 is supplied to a demultiplexer 606.

The demultiplexer 606 demultiplexes the signal supplied from the error correcting circuit 606 into reproduction data in the audio area, reproduction data in the video area, and reproduction data in the sub-code area.

The reproduction data in the audio area is supplied to an audio processing circuit 616. AAUX data of the reproduction data in the audio area is detected by an AAUX decoding circuit 612. The AAUX data is supplied to a controller 622. The audio processing circuit 616 performs time axis converting process, interpolating process, and so forth. The output signal of the audio processing circuit 616 is supplied to a D/A converter 618. The output signal of the D/A converter 618 is output from an output terminal 620.

The reproduction data in the video area is supplied to a deframing circuit 608. The VAUX data of the reproduction data in the video area is detected by a VAUX decoding circuit 610 and is supplied to the controller 622.

Figure 60:
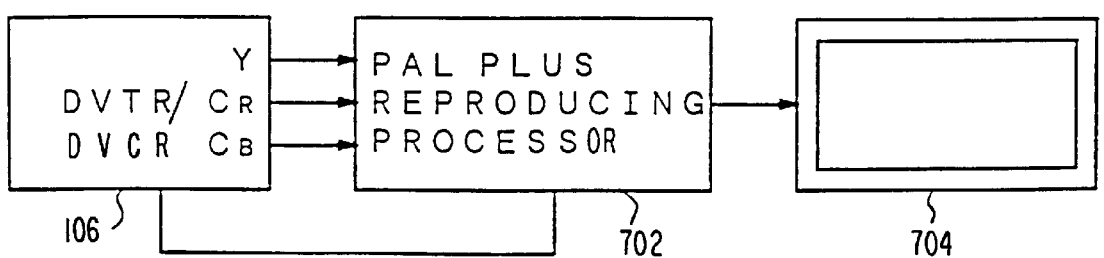
FIG. 60 is a block diagram for a PAL plus reproducing system.
Figure 64:
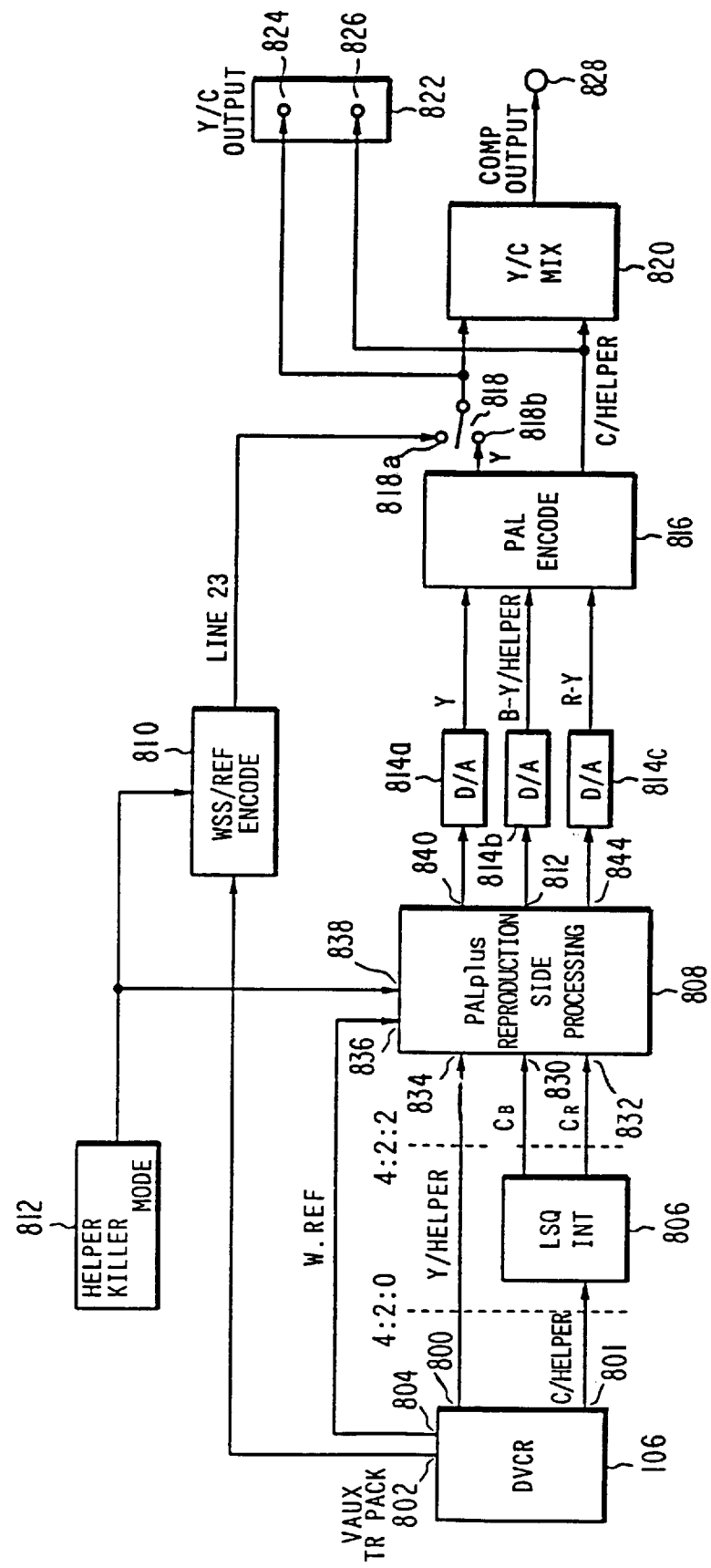
FIG. 64 shows a block diagram of a PAL plus reproducing processor according to the fourth embodiment.

The WSS data is obtained from PC1 to PC3 of the TR pack of the VAUX data. Likewise, the white 100% reference data is obtained from PC4. The WSS data is output from a data output terminal 624 and then supplied to a WSS signal encoder 810 (FIG. 64). The 100% reference data is output from a data output terminal 625 and then supplied to a PAL plus reproduction side processing circuit 702 (FIG. 60).

The reproduction data in the sub-code area is detected by a sub-code decoding circuit 614. The sub-code data is supplied to the controller 622.

The output signal of the deframing circuit 608 is supplied to an expanding circuit 628. The expanding circuit 628 converts the compressed video signal into original video signal in the time region corresponding to the variable length code decoding process and the inverse DCT process. The output signal of the expanding circuit 628 is supplied to a deshuffling and deblocking circuit 630. The deshuffling and deblocking circuit 630 outputs the reproduced component color video signals Y and C. The signal C is obtained by line-sequencing the color difference signals CB and CR. In addition, the helper signal has been inserted into the signal C.

The reproduced component color video signals Y and C are supplied to an information adding circuit 632. The information adding circuit 632 adds a horizontal synchronous signal, a vertical synchronous signal, and so forth to the reproduced component color video signals Y and C. The reproduced luminance signal Y and the reproduced color signal C are output from output terminals 634 and 636, respectively. In this case, as described above, when a video signal is recorded, in the interval of the invalid screen portions, the helper signal is inserted into the reproduced luminance signal Y. Thus, in the interval of the invalid screen portions, the reproduced luminance signal Y contains the helper signal.

2. PAL plus Reproducing Processor a. First Embodiment

Figure 61:
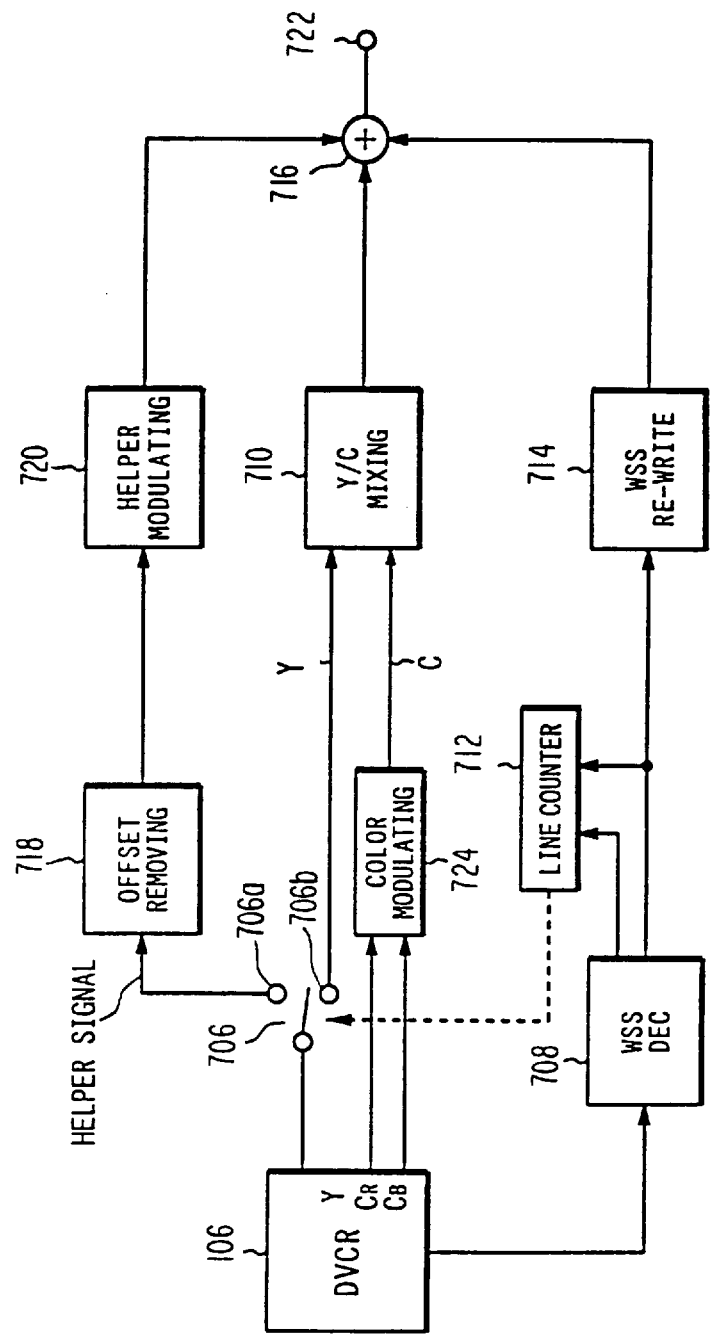
FIG. 61 shows a block diagram of a PAL plus reproducing processor according to the first embodiment.

Next, the reproducing process of the record signal (PAL plus signal) recorded by the digital VCR 106 will be described. FIG. 61 is a block diagram showing an example of the construction of a reproduction side according to the first embodiment of the present invention. A luminance signal Y that is output from a reproduction luminance signal output terminal of a digital VCR 106 is supplied to a switch circuit 706, which is controlled by a line counter 712. The reproduction luminance signal Y received from the switch circuit 706 is supplied from an output terminal 706b of the switch circuit 706 to a Y/C mixing circuit 710. Color difference signals CR and CB that are received from reproduction color difference signal output terminals of the digital VCR 106 are supplied to a color modulating circuit 724. The color modulating circuit 724 converts the color difference signals CR and CB into a color signal C. The color signal C is supplied to a Y/C mixing circuit 710. The output signal of the Y/C mixing circuit 710 is supplied to one input terminal of an addition device 716.

The WSS signal and the synchronous signal that are output from the digital VCR 106 are supplied to a WSS detecting circuit 708. The digital VCR 106 reads the WSS signal from the TR pack. The WSS detecting circuit 708 detects the WSS signal and supplies the detected WSS signal to a WSS rewriting circuit 714. The output signal of the WSS rewriting circuit 714 is supplied to another input terminal of the addition device 716.

An output terminal 706a of the switch circuit 706 is connected a helper signal modulating circuit 720 through an offset removing circuit 718. The helper signal modulating circuit 720 modulates the chrominance subcarrier signal with the helper signal. The output signal of the helper signal modulating circuit 720 is supplied to a further input terminal of the addition device 716.

Another output signal of the WSS detecting circuit 708 is supplied to the line counter 712. The line counter 712 detects a horizontal synchronous signal and a vertical synchronous signal from the output signal of the digital VCR 106 and counts a line number of the input video signal. The switch circuit 706b is controlled corresponding to the counted line number. When the luminance signal is reproduced and output by the digital VCR 106 in the interval of the invalid screen portions, the luminance signal is output as the helper signal. When the luminance signal is reproduced and output by the digital VCR 106 in the interval of the main screen portions, the luminance signal is output as the luminance signal YL.

The line counter 712 generates a control signal that distinguishes the main screen portions and the invalid screen portions corresponding to the received line number. In other words, in the interval of the upper and lower invalid screen portions, the output terminal 706a of the switch circuit 706 is selected. In the interval of the main screen portions, the output terminal 706b of the switch circuit 706 is selected. In such a manner, the switch circuit 706 is controlled.

When the luminance signal is received from the digital VCR 106 in the interval of the invalid screen portions, the luminance signal is selected by the switch circuit 706 and supplied as the helper signal to the offset removing circuit 718. The offset removing circuit 718 removes the offset level from the signal so that the digital VCR 106 records the signal. The resultant signal is supplied to the helper signal modulating circuit 720, which modulates the signal that is output from the offset removing circuit 718. The resultant signal is supplied to one input terminal of the addition device 716.

When the luminance signal is supplied from the digital VCR 106 in the interval of the main screen portions, the luminance signal is selected as the luminance signal Y by the switch circuit 706. The resultant signal is supplied to the Y/C mixing circuit 71, which mixes the luminance signal Y with the color signal C. The resultant signal is supplied to another input terminal of the addition device 716.

The addition circuit 716 adds the signal received from the helper signal modulating circuit 720, the signal received from the WSS rewriting circuit 714, and the signal received from the Y/C mixing circuit 710. The resultant signal is output from an output terminal 722 so that the signal is output to a PAL plus monitor unit or the like. Thus, the PAL plus signal recorded in the format of the digital VCR can be reproduced and output as the original PAL plus signal.

b. Second Embodiment

Figure 62:
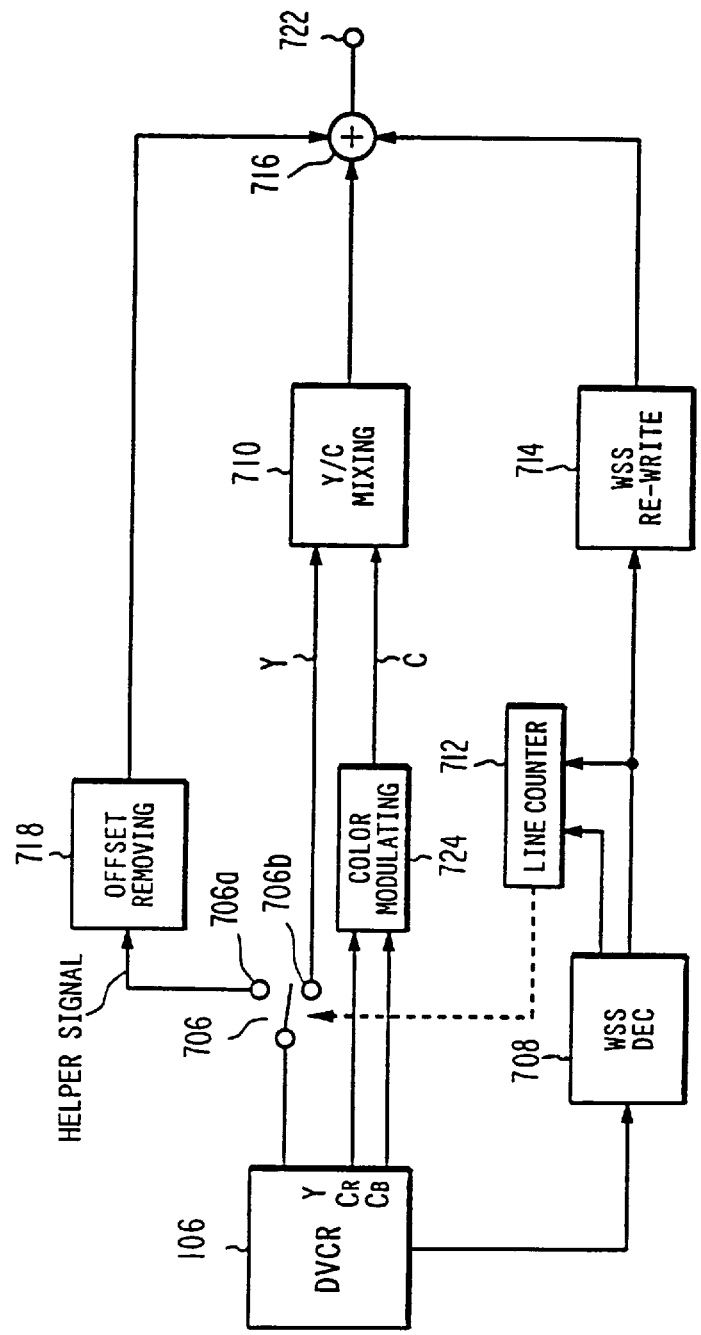
FIG. 62 shows a block diagram of a PAL plus reproducing processor according to the second embodiment.

The PAL plus reproducing processor of the second embodiment is shown in FIG. 62 and is similar to the processor of the first embodiment. A detailed discussion of this aspect of the second embodiment is essentially discussed in regard to the first embodiment and will not be repeated. The difference between the reproducing processors in the first and second embodiments is that the second embodiment does not have a helper modulator 720. Since the helper signal was not demodulated on the recording side (FIG. 13), the helper signal is not modulated on the reproducing side.

c. Third Embodiment

Figure 63:
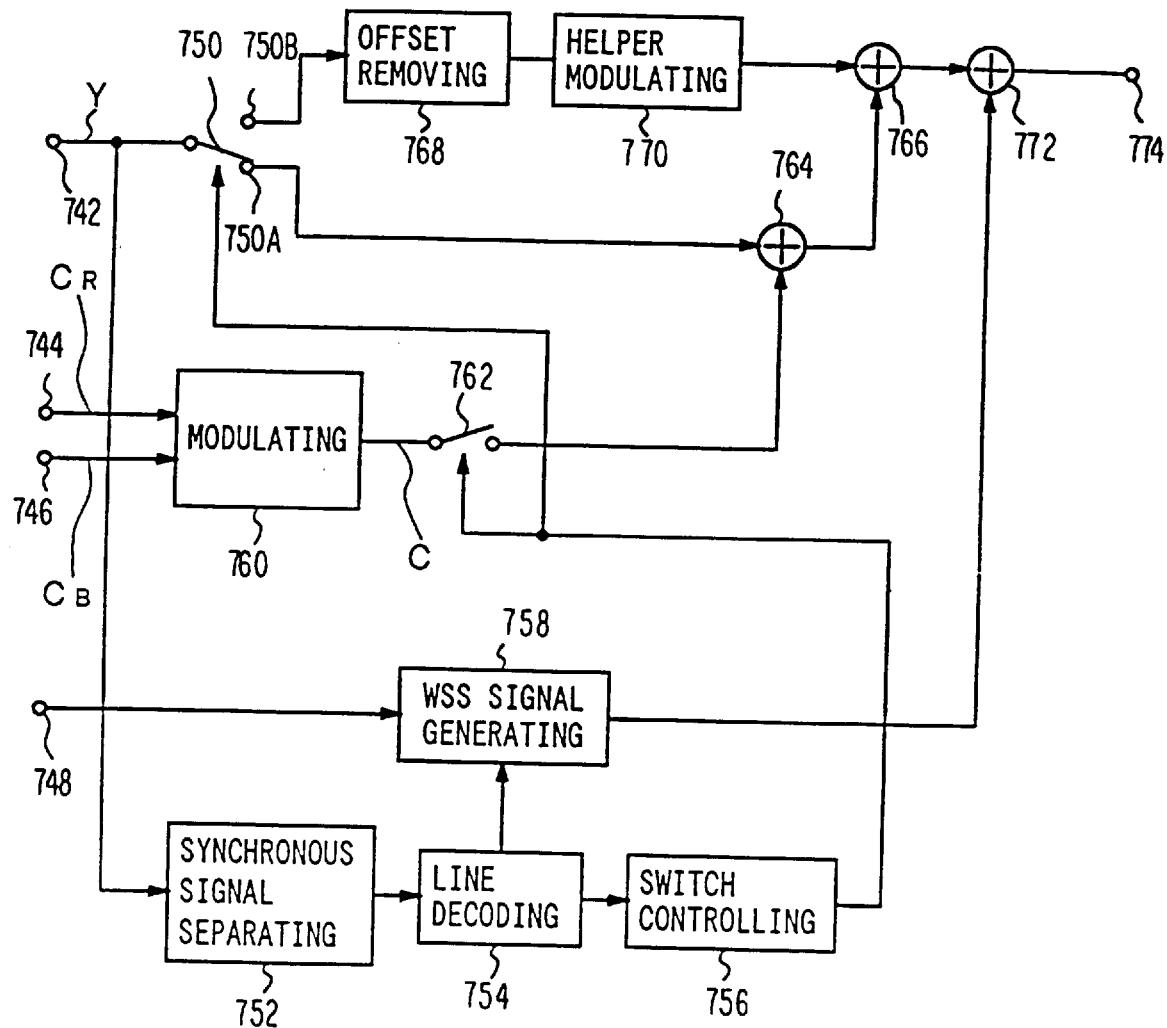
FIG. 63 shows a block diagram of a PAL plus reproducing processor according to the third embodiment.

FIG. 63 is a block diagram showing the construction of the PAL plus reproduction processing circuit 106 according to the third embodiment. In FIG. 63, a reproduced luminance signal Y is supplied to an input terminal 742. In addition, reproduced color difference signals CR and CB are supplied to input terminals 744 and 746, respectively. Moreover, aspect ratio information and data that represents whether or not the helper signal is present are supplied to a data input terminal 748.

The reproduced luminance signal received from the input terminal 742 is supplied to a switch circuit 750. In addition, a synchronous signal of the Y input signal is detected by a synchronous signal separating circuit 752. The reproduced color difference signals CR and CB, which are respectively received from the input terminals 744 and 746, are supplied to a modulating circuit 760, which generates a chroma signal C from the color difference signals CR and CB. The output signal of the modulating circuit 760 is supplied to a switch circuit 762.

The output signal of the synchronous signal separating circuit 752 is supplied to a line decoder 754, which decodes the number of lines. The output signal of the line decoder 754 is supplied to a switch controlling circuit and a WSS signal generating circuit 758. The switch controlling circuit 756 generates a switch control signal for selecting one of the main screen portion and the invalid screen portions. The switch control signal is supplied to switch circuits 750 and 762. The switch circuits 750 and 762 select one of the main screen portion and the invalid screen portions corresponding to the switch control signal. When the main screen portion at the center of the screen is selected, the switch circuit 750 is placed in the terminal 750A position and the switch circuit 762 is turned on. When the upper and lower invalid screen portions are selected, the switch circuit 750 is placed in the terminal 750B position and the switch circuit 762 is turned off.

When the main screen portion is selected, the switch circuit 750 is placed in the terminal 750A position and the signal of the input terminal 742 is supplied to an addition circuit 764 through the switch circuit 750. When the main screen portion is selected, the switch circuit 762 is turned on. Thus, the chroma signal C is supplied from the modulating circuit 760 to the addition circuit 764. The addition circuit 764 adds the luminance signal and the chroma signal. The output signal of the addition circuit 764 is supplied to an addition circuit 766.

When the invalid screen portions are selected, the helper signal is supplied to the input terminal 742. The helper signal is supplied to an offset removing circuit 768 through the switch circuit 750. The offset removing circuit 768 removes offsets. The output signal of the offset removing circuit 768 is supplied to a modulating circuit 770. The modulating circuit 770 modulates the helper signal and outputs the modulated signal to an addition circuit 766.

The data received from a data input terminal 748 is supplied to the WSS signal generating circuit 758. The WSS signal generating circuit 758 receives the output signal of the line decoder 754. The WSS signal generating circuit 758 generates the WSS signal for the line 23. The output signal of the WSS signal generating circuit 758 is supplied to an addition circuit 772.

The addition circuit 772 adds the WSS signal to the line 23. When the WSS signal is added to the line 23, since the reproduced signal on the line 23 is placed in the pedestal level, the data can be correctly added. The output signal of the addition circuit 774 is output from an output terminal 774. The output signal of the output terminal 774 is a PAL plus video signal. Thus, when the signal is supplied to a PAL plus TV receiver 704 (FIG. 60), a reproduced image can be displayed on the wide screen with a high quality.

d. Fourth Embodiment i. PAL plus Reproduction Processor

FIG. 64 is a block diagram showing the overall construction of an embodiment for processing a reproduced PAL plus signal that is output from the above-described digital VCR 106. An output terminal 116 of the digital VCR 106 is connected to a line sequence interpolating circuit 806. A CB/helper signal output terminal and a CR output terminal of the line sequence interpolating circuit 806 are connected to input terminals 830 and 832 of a PAL plus reproduction side processing circuit 808, respectively. An output terminal 115 of the digital VCR 106 is connected to an input terminal 834 of the PAL plus reproduction side processing circuit 808. A data output terminal 804 of the digital VCR 106 is connected to a data input terminal 836 of the PAL plus reproduction side processing circuit 808. A data output terminal 802 of the digital VCR 106 is connected to a WSS encoder 810. The WSS encoder 810 is connected to one of input terminals of an addition device 818.

A helper killer mode control circuit 812 is connected to the WSS signal encoder 810 and an input terminal 838 of the PAL plus reproduction side processing circuit 808. Output terminals 840, 842, and 844 of the PAL plus reproduction side processing circuit 808 are connected to D/A converters 814a, 814b, and 814c, respectively. The D/A converter 814a is connected to a Y signal input terminal of a PAL encoder 816. The D/A converter 814b is connected to a B−Y/helper signal input terminal of the PAL encoder 816. The D/A converter 814c is connected to an R−Y input terminal of the PAL encoder 816.

A Y signal output terminal of the PAL encoder 816 is connected to the other input terminal of the addition device 818. A C/helper signal output terminal of the PAL encoder 816 is connected to a C/helper signal input terminal of a Y/C mixing circuit 820 and a C output terminal 826 of a Y/C separating output terminal 822. The addition device 818 is connected to a Y signal input terminal of the Y/C mixing circuit 820 and an output terminal 824 of the Y/C separating output terminal 822. A composite signal output terminal of the Y/C mixing circuit 820 is connected to an output terminal 828.

The reproduced luminance signal Y that is output from the output terminal 800 of the digital VCR 106 is supplied to the input terminal 834 of the PAL plus reproduction side processing circuit 808. The reproduced luminance signal Y supplied from the output terminal 800 is also supplied to a synchronous signal separating circuit (not shown). The synchronous signal separating circuit separately extracts a vertical synchronous signal and a horizontal synchronous signal from the reproduced luminance signal Y. The extracted synchronous signals are supplied to a line counter that controls the entire apparatus. The line counter counts the number of lines.

The reproduced color signal C that is output from the output terminal 801 of the digital VCR 106 is supplied to the line sequence compensating circuit 806. The resultant color signal C is controlled and separated into a color difference signal CB and a color difference signal CR by the line sequence interpolating circuit 806 corresponding to the count value that is output from the above-described line counter. The color difference signal CB is supplied to the input terminal 830 of the PAL plus reproduction side processing circuit 808. The color difference signal CR is supplied to the input terminal 832.

White 100% reference data is output from the data output terminal 804 of the digital VCR 106. The white 100% reference data is eight-bit digital data written to PC4 of the TR pack (shown in FIG. 23) and supplied to the data input terminal 836 of the PAL plus reproduction side processing circuit 808.

The WSS data is output from the data output terminal 802 of the digital VCR 106. The WSS data is 14-bit digital data written as b0 to b13 in PC1 to PC3 of the TR pack shown in FIG. 23. The WSS data is extracted and supplied to the WSS encoder 810, which encodes the WSS data so that it can be recognized by a television receiver corresponding to the PAL plus system or the like. The WSS encoder 810 generates a reference signal of the helper signal. The WSS signal and the reference signal are output at a position corresponding to line 23 and are supplied to the input terminal 818a of the switch circuit 818.

The helper killer signal received from the helper killer mode control circuit 812 is supplied to the WSS encoder 810 and the input terminal 838 of the PAL plus reproduction side processing circuit 808. As with the helper killer mode control circuit 206 of the record side construction shown in FIG. 15, the helper killer mode control circuit 812 turns off the helper function corresponding to an external input signal (in other words, it disables the function of the vertical resolution compensation corresponding to the PAL plus system).

This function is especially important when a PAL plus video signal is displayed by a PAL television receiver that does not correspond to the PAL plus system. The aspect ratio of the PAL television receiver is 12:9 (4:3), whereas PAL plus has an aspect ratio of 16:9. When this video signal is displayed by the PAL plus television receiver, as shown in FIG. 29A, the video signal is displayed as a letter box shape screen in which the upper and lower invalid screen portions are disposed. The helper signal is inserted into the upper and lower invalid screen portions. The helper signal is displayed as an image fault, such as color flickering on the invalid screen portions.

In this case, the helper function is turned off by the helper killer mode control circuit 812. Thus, the PAL plus reproduction side processing circuit 808 changes the level of the reproduced luminance signal Y in the interval of the invalid screen portions to the digital value "16" (namely, the pedestal level) and the levels of the reproduced color difference signals CB and CR into which the helper signal has been inserted to the digital value "128" (namely, the achromatic level). In addition, the WSS encoder 810 mutes the signal on line 23, into which the WSS signal has been inserted, to the level of the digital value "16". Thus, the helper killer function prevents the screen fault in the upper and lower invalid screen portions.

In addition, the helper killer function can be also used in the case that the function of the vertical resolution compensation corresponding to the helper signal does not effectively work due to a particular cause, such as a bad quality of a recorded signal that is reproduced by a PAL plus television receiver.

ii. PAL plus Reproduction Side Processing Circuit

Figure 65:
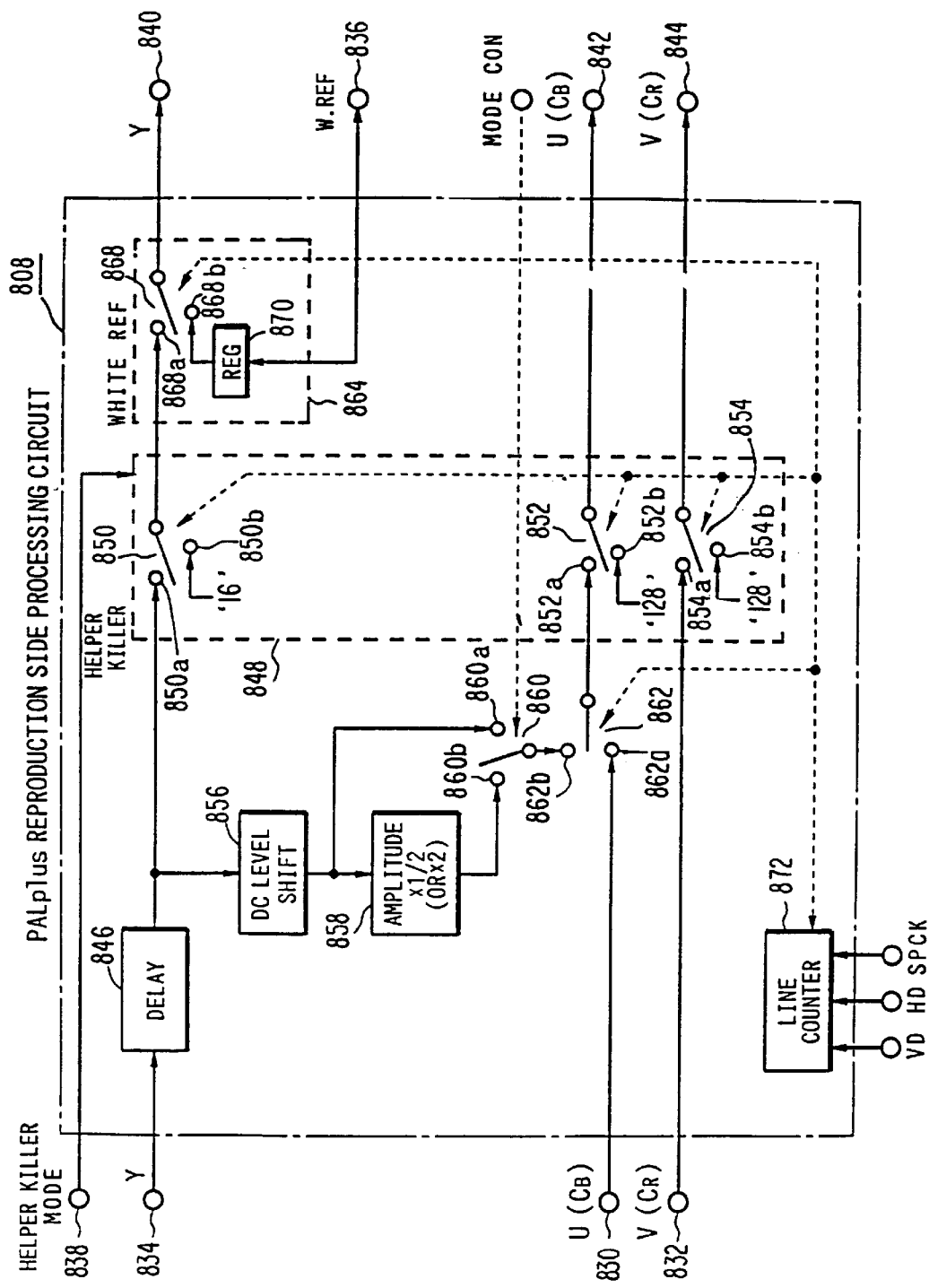
FIG. 65 shows a PAL plus reproduction side processing circuit according to the fourth embodiment.

FIG. 65 is a block diagram showing an example of the construction of the above-described PAL plus reproduction side processing circuit 808. This circuit accomplishes the helper killer function, inserts the white 100% reference signal into the line 623, and inserts the helper signal that has been inserted into the luminance signal Y (when a video signal has been recorded) into the reproduced color difference signal CB. In addition, this circuit removes the DC setup value added to the helper signal.

An input terminal 834 is connected to a delay circuit 846, which is connected to both an input terminal 850a of a switch circuit 850 included in a helper killer circuit 848 and a DC level shift circuit 856. The DC level shift circuit 856 is connected to an amplitude amplifying circuit 858 and an input terminal 860a of a switch circuit 860. The amplitude amplifying circuit 858 is connected to an input terminal 860b of the switch circuit 860, and a common output terminal of the switch circuit 860 is connected to an input terminal 862b of a switch circuit 862.

An input terminal 830 is connected to an input terminal 862a of the switch circuit 862. A common output terminal of the switch circuit 862 is connected to an input terminal 852a of a switch circuit 852 included in the helper killer circuit 848. An input terminal 832 is connected to an input terminal 854a of a switch circuit 854 included in the helper killer circuit 848.

The helper killer circuit 848 comprises switch circuits 850, 852, and 854. Input terminals 850b, 852b, and 854b of the switch circuits 850, 852, and 854 are connected to respective digital level sources. The input terminal 850b is connected to a digital level source "16", and the input terminals 852b and 854b are connected to a digital level source "128".

A common output terminal of the switch circuit 850 included in the helper killer circuit 848 is connected to an input terminal 868a of a switch circuit 868, which is included in a white level reference circuit 864. A common output terminal of the switch circuit 868 is connected to an output terminal 840. An input terminal 868b of the switch circuit 868 is connected to a register 870, and a data input terminal 836 is connected to the register 870. A common output terminal of the switch circuit 852 is connected to an output terminal 842, and a common output terminal of the switch circuit 854 is connected to an output terminal 844.

The PAL plus reproduction side processing circuit 808 includes a line counter 872. The line counter 872 counts the number of lines of the video signal corresponding to the vertical synchronous signal, the horizontal synchronous signal (which are supplied from the above-described synchronous signal separating circuit (not shown)), and the system clock (which controls the entire apparatus) and outputs the count value to the following circuits, which are controlled corresponding to the count value:

Switch circuits 850, 852, and 854 included in the helper killer circuit 848

Switch circuit 862

Switch circuit 868 included in the white level reference circuit 864

Instead of the line counter 872, a line counter (not shown) that controls the entire apparatus may be used.

The reproduced luminance signal Y is supplied to the delay circuit 846 through the input terminal 834. The delay circuit 846 has a half clock accuracy (namely, an accuracy of the half timing of the system clock). The delay circuit 846 corrects the deviations of timings of the reproduced luminance signal Y and the reproduced color difference signals CB and CR, which are generated by the PAL plus reproduction side processing circuit 808. The reproduced luminance signal Y that is output from the delay circuit 846 is supplied to the input terminal 850a of the switch circuit 850 included in the helper killer circuit 848.

The reproduced luminance signal Y that is output from the delay circuit 846 is also supplied to the DC level shift circuit 856. The above-described recording apparatus inserts a helper signal along with a predetermined DC setup value into the reproduced luminance signal Y during the interval of the invalid screen portions. The DC level shift circuit 856 removes the DC setup value, added during recording. In this case, the switch circuit 862 (that will be described later) disposed on the output side of the DC level shift circuit 856 selectively supplies the signal to the later stage in the interval of the invalid screen portions. Thus, in the DC level shift circuit 856, even if the DC level of the reproduced luminance signal Y is entirely shifted, no problem takes place.

The reproduced luminance signal Y, from which the DC setup value has been removed, is supplied to the input terminal 860a of the switch circuit 860 and the amplitude amplifying circuit 858. The amplitude amplifying circuit 858 amplifies the amplitude of the reproduced luminance signal Y so that the amplitude thereof becomes the same as the original amplifies thereof. For example, if the luminance signal Y is amplified with an amplification factor of ½ when a video signal is recorded, the amplitude amplifying circuit 858 amplifies the reproduced luminance signal Y with an amplification factor of 2. The output signal of the amplitude amplifying circuit 858 is supplied to the input terminal 860 of the switch circuit 860.

As described above, when a video signal is recorded, the DC setup value is designated corresponding to the amplification factor of the amplitude amplifying circuit 858. Thus, by detecting the level of the helper signal sent to the line 23, the DC setup value and the amplification factor can be obtained.

The switch circuit 860 is externally controlled corresponding to a mode control input signal supplied from an external source. When the input terminal 860a is selected, the reproduced luminance signal Y is directly supplied from the DC level shift circuit 858 to the common output terminal of the switch circuit 860 (namely, the reproduced luminance signal Y is not amplified). On the other hand, when the input terminal 860b is selected, the reproduced luminance signal Y that has been amplified is supplied to the common output terminal of the switch circuit 860 through the amplitude amplifying circuit 858.

The reproduced luminance signal Y in which the DC setup value has been removed and has been amplified is supplied from the common output terminal of the switch circuit 860 to the input terminal 862b of the switch circuit 862. The reproduced color difference signal CB is supplied to the input terminal 862a of the switch circuit 862 through the input terminal 832. The switch circuit 862 is controlled corresponding to the count value of the line counter 872. In the interval of the invalid screen portions, the input terminal 862b is selected, and in the interval of the main screen portion, the input terminal 862a is selected.

In other words, with reference to FIG. 2, in the interval of the upper invalid screen portion on lines 24 to 59, the output terminal 862b is selected. In the interval of the main screen portion on lines 60 to 274, the output terminal 862a is selected. In the interval of the lower invalid screen portion on lines 275 to 310, the output terminal 862b is selected. In the interval of the upper invalid screen portion on lines 336 to 371, the output terminal 862b is selected. In the interval of the main screen portion on lines 372 to 586, the output terminal 862a is selected. In the interval of the lower invalid screen portion on lines 587 to 682, the output terminal 862b is selected.

When the switch circuit 862 is controlled in the intervals of the main screen portions and the invalid screen portions, the helper signal that has been inserted into the reproduced luminance signal Y in the interval of the invalid screen portions is inserted into the reproduced color difference signal CB in the interval of the invalid screen portions. The reproduced color difference signal CB into which the helper signal has been inserted in the interval of the invalid screen portions is supplied from the output terminal of the switch circuit 862 to the input terminal 852a of the switch circuit 852 included in the helper killer circuit.

The reproduced color difference signal CR is supplied to the input terminal 854a of the switch circuit 854 of the helper killer circuit 848 through the input terminal 832.

As described above, the reproduced luminance signal Y and the reproduced color difference signals CB and CR into which the helper signal has been inserted in the interval of the invalid screen portions are supplied to the input terminals 850a, 852a, and 854a of the switch circuits 850, 852, and 854 included in the helper killer circuit 848, respectively. A digital value "16" is supplied to the input terminal 850b of the switch circuit 850, and a digital value "128" is supplied to the input terminals 852b and 854b of the switch circuits 852 and 854.

The helper killer signal is supplied from the helper killer control circuit 812 to the helper killer circuit 848 through the input terminal 838. The helper killer function is turned on and off corresponding to the helper killer signal. The switch circuits 850, 852, and 854 are controlled corresponding to both the helper killer signal and the count value of the line counter 872.

When the helper killer function is tuned on, the switch circuits 850, 852, and 854 are controlled corresponding to the count value of the line counter 872. In the interval of the invalid screen portions, the input terminals 850b, 852b, and 854b of the switch circuits 850, 852, and 854 are selected, respectively. In the interval of the main screen portions, the input terminals 850a, 852a, and 854a of the switch circuits 850, 852, and 854 are selected, respectively.

In other words, when the helper killer function is on and with reference to FIG. 2, in the interval of the upper invalid screen portion on the lines 24 to 59, the input terminals 850b, 852b, and 854b of the switch circuits 850, 852, and 854 are selected. In the interval of the main screen portion on the lines 60 to 274, the input terminals 850a, 852a, and 854a are selected. In the interval of the lower invalid screen portion on the lines 275 to 310, the input terminals 850b, 852b, and 854b are selected. In the interval of the upper invalid screen portion on the lines 336 to 371, the input terminals 850b, 852b, and 854b are selected. In the interval of the main screen portion on the lines 372 to 586, the input terminals 850a, 852a, and 854a are selected. In the interval of the lower invalid screen portion on the lines 587 to 622, the input terminals 850b, 852b, and 854b are selected.

Thus, in the interval of the invalid screen portions, the level of the reproduced luminance signal Y is changed to the level of the digital value "16" supplied to the input terminal 850b of the switch circuit 850. The resultant signal is output from the output terminal of the switch circuit 850. The level of the reproduced color difference signal CB into which the helper signal has been inserted is changed to the level of the digital value "128". The level of the reproduced color difference signal CR is changed to the level of the digital value "128" supplied to the input terminal 854b of the switch circuit 854. The resultant signals are output from the output terminals of the switch circuits 852 and 854, respectively.

In the interval of the main screen portions, the reproduced luminance signal Y and the reproduced color difference signals CB and CR supplied to the input terminals 850a, 852a, and 854a of the switch circuits 850, 852, and 854 are directly output from the output terminals thereof.

On the other hand, when the helper killer function is turned off, the switch circuits 850, 852, and 854 are controlled corresponding to the count value of the line counter 872. The input terminals 850a, 852a, and 854a are always selected. Thus, the reproduced luminance signal Y supplied to each switch circuit and the reproduced color difference signals CB and CR into which the helper signal has been inserted in the interval of the invalid screen portions, are output directly to the corresponding common output terminals of the respective switch circuits.

The reproduced color difference signal CB that is output to the common output terminal of the switch circuit 852 included in the helper killer circuit 848 is supplied to the output terminal 842. The reproduced color difference signal CR that is output to the common output terminal of the switch circuit 854 is supplied to the output terminal 844.

The reproduced luminance signal Y is output from the common output terminal of the switch circuit 850 included in the helper killer circuit 848. The resultant reproduced luminance signal Y is supplied to the switch circuit 868 included in the white level reference circuit 864. The white level reference circuit 864 comprises the switch circuit 868 (which is controlled corresponding to the count value of the line counter 872) and the register 870.

White 100% level reference data is supplied from the data output terminal 804 of the digital VCR 106 to the register 870 through the data input terminal 838. As described above, the white 100% level reference data is eight-bit data written to PC4 of the TR pack shown in FIG. 23 when the video signal is recorded. The white 100% level reference signal represents the value of the white 100% level detected when the video signal is recorded and is written to the register 870.

The switch circuit 868 included in the white level reference circuit 864 selects the input terminal 862b in the interval of the line 623 corresponding to the count value of the line counter 872. On the other hand, the switch circuit 868 selects the input terminal 868a in the interval of other lines. By controlling the switch circuit 868 in such a manner, the level of the reproduced luminance signal Y is changed to the white 100% level reference data on the line 623.

In the case that the value of PC4 of the TR pack data, which is the white 100% reference data, is (FFh) (namely, all bits of PC4 are "1s") when the video signal was recorded, the reference data was not written. In this case, a digital value "213" that represents the white 100% level is written to the register 864. In the digital VCR 106, since the reliability of the reproduced data is very high, even if the white 100% level cannot be precisely restored, a high quality image can be reproduced to some extent.

An external mode control signal can be supplied to the register 870 through a mode control input terminal to control the white 100% level. When the mode control signal is supplied to the register 870, for example, a digital value "235" is forcedly written to the register 870.

The reproduced luminance signal Y that is output from the output terminal 840 of the PAL plus reproduction side processing circuit 808, the reproduced color difference signal CB into which the helper signal has been inserted in the interval of the invalid screen portions and that is output from the output terminal 842, and the reproduced color difference signal CR that is output from the output terminal 844 are supplied to the D/A converters 814a, 814b, and 814c, respectively. These signals are converted into analog signals and are supplied to the PAL encoder 818.

The PAL encoder 818 includes a line sequencing circuit, which line-sequences the reproduced color difference signals B−Y and R−Y. The line sequenced signal is modulated and output as a chrominance signal C. In the interval of the line 23, a helper reference burst signal is inserted into the chrominance signal C. In addition, in the interval of the invalid screen portions, the helper signal is inserted into the chrominance signal C. The chrominance signal C is then supplied to the Y/C mixing circuit 820 and the output terminal 826 of the Y/C separating output terminal 822.

The reproduced luminance signal Y is output from the PAL encoder 818 to the input terminal 818b of the switch circuit 818. In addition, the WSS signal and the reference signal that are output from the WSS encoder 810 disposed at the predetermined position as the line 23 are supplied to the input terminal 818a of the switch circuit 818.

The switch circuit 818 is controlled corresponding to the count value of the line counter (not shown), which controls the entire apparatus. In the interval of the line 23, the input terminal 818a is selected. In the interval of other lines, the input terminal 818b is selected. Thus, the reproduced luminance signal Y supplied from the PAL encoder 818 is changed to the WSS signal and the reference signal supplied from the WSS encoder 810 in the interval of the line 23. Thus, the reproduced luminance signal Y is restored to the PAL plus signal into which the WSS signal has been inserted into the line 23.

The reproduced luminance signal Y, into which the WSS signal has been inserted, is supplied from the common output terminal of the switch circuit 818 to the Y/C mixing circuit 820. The reproduced luminance signal Y is supplied to the output terminal 824 of the Y/C separating output terminal 822.

The reproduced luminance signal Y and the color signal C supplied to the Y/C mixing circuit 820 are mixed as a PAL plus composite video signal to the output terminal 828 and reproducing is complete.

3. Fifth Embodiment; EDTV-2 Reproducing Processor

Figure 66:
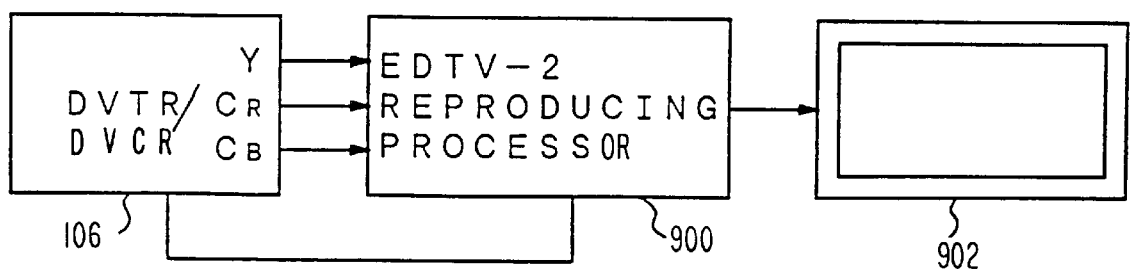
FIG. 66 is a block diagram of a digital video reproducing system for an EDTV-2 system.

FIG. 66 is a block diagram showing the construction of a reproducing system for an EDTV-2 system. A digital VCR 106 outputs video components (i.e., luminance signal Y, and color signals CR, CB) to an EDTV-2 Reproducing Processor 900. The processor reproduces an EDTV-2 signal from the video components and outputs the reconstructed signal to an EDTV-2 TV screen 902.

a. EDTV-2 Digital Reproducing VCR

FIG. 67 is a block diagram showing an example of the construction of a reproducing system 900 of a digital VCR 106. A reproduced signal of a head 904 is supplied to a channel decoder 906 through a reproducing amplifier (not shown). The construction of the digital reproducing VCR for the EDTV-2 system is the same for the PAL plus reproducing digital VCR shown by FIG. 59, and only a brief discussion of the digital VCR will be repeated here.

The channel decoder 906 demodulates the reproduced signal and outputs the demodulated signal to an error correcting circuit 908. The error correcting circuit 908 performs an error correcting process and outputs the corrected signal to a demultiplexer 910.

The demultiplexer 910 demultiplexes the signal supplied from the error correcting circuit 908 into reproduction data in the audio area, reproduction data in the video area, and reproduction data in the sub-code area.

The reproduction data in the audio area is supplied to an audio processing circuit 916. AAUX data of the reproduction data in the audio area is detected by an AAUX decoding circuit 918 and is supplied to a controller 903. The audio processing circuit 916 performs time axis converting process, interpolating process, and so forth and outputs the processed audio signal to a D/A converter 922. The output signal of the D/A converter 922 is then output from an output terminal 924.

The reproduction data in the video area is supplied to a deframing circuit 912. The VAUX data of the reproduction data in the video area is detected by a VAUX decoding circuit 914 and is supplied to the controller 903.

The data of the ID signals on the lines 22 and 285 is obtained from the TR pack of the VAUX data. The color phase information is obtained from the source pack of the VAUX data. The aspect ratio information is obtained from the source control pack of the VAUX data. These types of information are output from a data output terminal 940 to the EDTV-2 reproduction processing circuit 900.

The reproduction data in the sub-code area is detected by a sub-code decoding circuit 920 and is supplied to the controller 903.

The output signal of the deframing circuit 912 is supplied to an expanding circuit 926, which converts the compressed video signal into the original video signal in the time region according to the variable length code/decoding process and the inverse DCT process. The output signal of the expanding circuit 926 is supplied to a deshuffling and deblocking circuit 928, which outputs the reproduction component color video signals Y, CR, and CB. The reproduction component color video signals Y, CR, and CB are supplied to an information adding circuit 930, which adds a horizontal synchronous signal, a vertical synchronous signal, and so forth to the reproduction component color video signals Y, CR, and CB. The output signal of the information adding circuit 930 is supplied to a D/A converter 932 which converts the digital signals to their analog counterparts and outputs the converted signals to output terminals 934, 936, and 938, respectively.

When the EDTV-2 video signal is reproduced, in this embodiment, a luminance signal at a frequency of up to 4.2 MHz and a high band luminance component in a frequency band from 4.2 MHz to 6 MHz are added to the reproduced luminance signal Y at the main screen portion. The reproduced luminance signal Y at the invalid screen portions is composed of VT and VH signals to which offsets have been added. The aspect ratio information, the color phase information, and the data (that represents whether or not signal components of VT, VH, and VH are present) are output to a data output terminal 940. Since line 22, in which the ID signal and so forth are disposed is outside the valid screen area, the signal on line 22 is placed in the pedestal level. On the other hand, although line 285 is in the valid screen area, the signal on the line 285 is placed in the pedestal level by the masking circuit 458 (FIG. 29) of the recording system of the VCR. Thus, the video components are ready to be reproduced into an EDTV-2 signal.

ii. EDTV-2 Reproducing Processor

Figure 68:
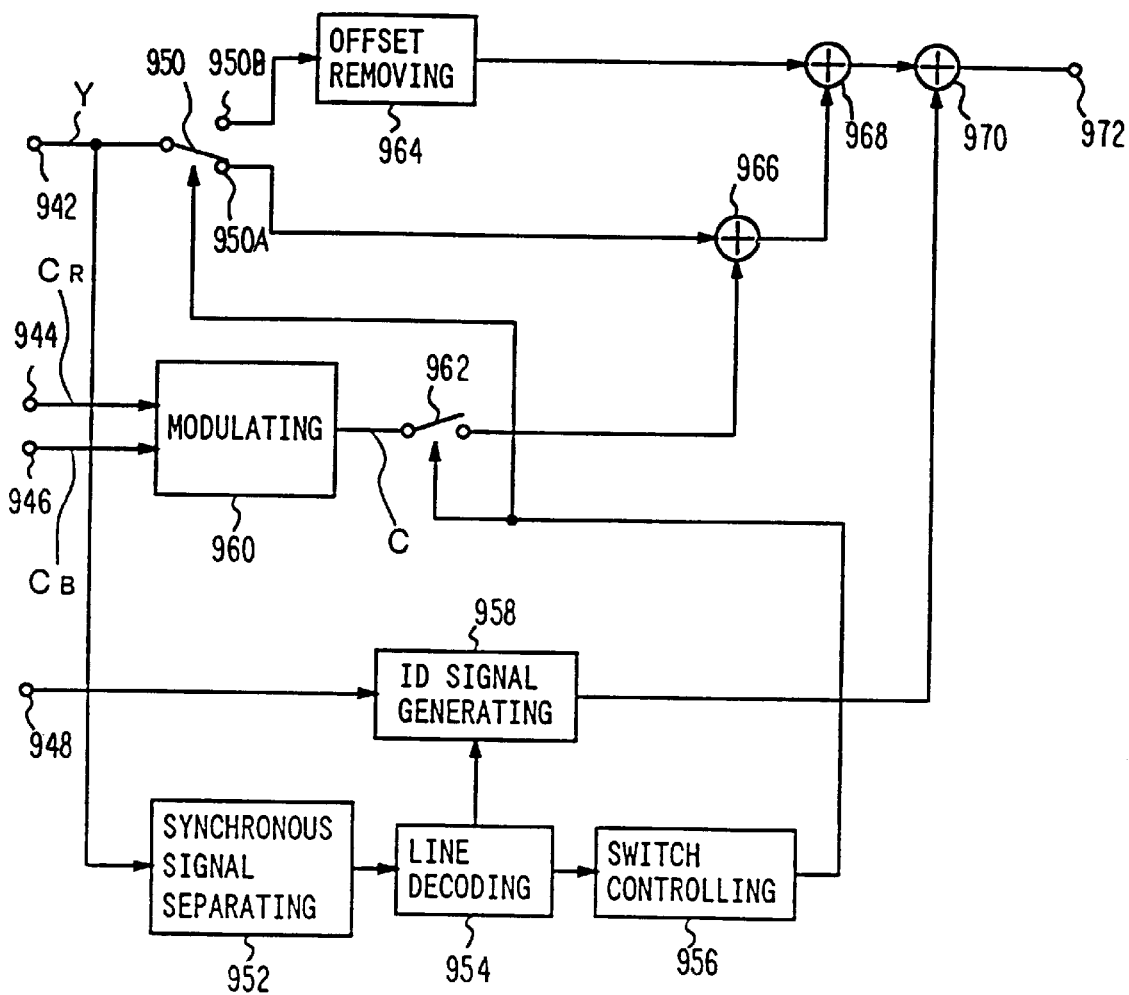
FIG. 68 is a block diagram of an EDTV-2 reproducing processor.

FIG. 68 is a block diagram showing the construction of an EDTV-2 reproducing processor 900. In FIG. 68, a reproduced luminance signal Y is supplied to an input terminal 942. Reproduced color difference signals CR and CB are supplied to input terminals 944 and 946, respectively. Aspect ratio information, color phase information, and data that represents whether or not signal components of VT, VH, and HH are present are supplied to a data input terminal 948.

The reproduced luminance signal received from the input terminal 942 is supplied to a switch circuit 950. A synchronous signal of the input signal is detected by a synchronous signal separating circuit 952. The reproduced color difference signals CR and CB received from the input terminals 944 and 946 are supplied to a modulating circuit 960. The modulating circuit 960 generates a chroma signal C from the color difference signals CR and CB and outputs the modulated signal to a switch circuit 962.

The output signal of the synchronous signal separating circuit 952 is supplied to a line decoder 954. The line decoder 954 decodes the number of lines. The output signal of the line decoder 954 is supplied to a switch controlling circuit 956 and an ID signal generating circuit 958. The switch controlling circuit 956 generates a switch control signal for selecting one of the main screen portion and the invalid screen portions by controlling the switch circuits 950 and 962. When the main screen portion at the center of the screen is selected, the switch circuit 950 is placed in the terminal 950A position and the switch circuit 962 is turned on. On the other hand, when the upper and lower invalid screen portions are selected, the switch circuit 950 is placed in the terminal 950B position and the switch circuit 962 is turned off.

When the main screen portion is selected, the switch circuit 950 is placed in the terminal 950A position. The input signal of the input terminal 942 is supplied to an addition circuit 966 through the switch circuit 950. In addition, the switch circuit 962 is turned on. Thus, the chroma signal C received from the modulating circuit 960 is supplied to the addition circuit 966, which adds the luminance signal Y and the chroma signal C. The output signal of the addition circuit 966 is then supplied to an addition circuit 968.

When the invalid screen portions are selected, the switch circuit 950 is placed in the terminal 950B position. The input signal of the input terminal 942 is supplied to an offset removing circuit 964. The offset removing circuit 964 removes the offsets and supplies the modified signal to the addition circuit 968. The output signal of the addition circuit 968 is then supplied to an addition circuit 970.

The input data of the data input terminal 948 is supplied to an ID signal generating circuit 958 which receives the output signal of a line decoder 954. The ID signal generating circuit 958 generates signals for the lines 22 and 285. In other words, the ID signal generating circuit 958 generates an NRZ signal that represents the aspect ratio, an ID signal that represents whether or not signal components of VT, VH, and HH are present, and a 2.04 MHz confirmation signal that identifying whether or not the received video signal is an EDTV-2 video signal for the lines 22 and 285. The output signals of the ID signal generating circuit 958 are supplied to an addition circuit 970.

The adding circuit 970 adds the NRZ signal that represents the aspect ratio, the ID signal that represents whether or not signal components of VT, VH, and HH are present, and the 2.04 MHz identification signal that identifies whether or not the received video signal is an EDTV-2 video signal for the lines 22 and 285. At this point, since the reproduced signals on the lines 22 and 285 are placed in the pedestal level, these types of data can be correctly added. The output signal of the addition circuit 970 is obtained from an output terminal 972.

The output signal of the output terminal 972 is an EDTV-2 video signal. Thus, when this signal is supplied to a TV set corresponding to the EDTV-2 system, the reproduced image can be displayed on a wide screen with a high quality.

Obviously, numerous modifications and variations of the present invention are possible in light of the above teachings. It is therefore to be understood that within the scope of the appended claims, the invention may be practiced otherwise than as specifically described herein.

We claim:

1. A television signal recording/reproducing method for recording and reproducing a composite signal that is composed of a luminance signal, a chrominance signal, and a resolution compensation signal included in a predetermined line, comprising the steps of:

separating the luminance signal and the chrominance signal from a received composite signal;

combining the resolution compensation signal with the separated luminance signal;

demodulating the chrominance signal and outputting a color difference signal;

inputting a component signal comprised of a luminance signal including the resolution compensation signal and two color difference signals;

killing said resolution compensation signal in response to a predetermined condition;

processing the component signal so as to generate a record signal; and recording the record signal on a record medium.

2. A television signal recording/reproducing method according to claim 1, further comprising the steps of:

reproducing the record signal to recover said component signal from the record medium;

separating the recovered resolution compensation signal from the luminance signal; and combining the recovered color difference signals and the separated resolution compensation signal.

3. The television signal recording reproducing method of claim 1, wherein the composite signal is a PAL plus signal and the resolution compensation signal is a helper signal disposed in an invalid portion of the composite signal.

4. The television signal recording/reproducing method of claim 1, wherein the composite signal is an EDTV-2 signal and the resolution compensation signal includes VT and VH signals disposed in an invalid portion of the composite signal, wherein the VT signal is a vertical time high band component that is lost in an interlace process and the VH signal is a vertical luminance high band component that is lost when video signals are formed by decimation.

* * * * *